(12) United States Patent
Abotabl et al.

(10) Patent No.: US 12,144,022 B2
(45) Date of Patent: Nov. 12, 2024

(54) LISTEN-BEFORE-TALK TECHNIQUES FOR FULL-DUPLEX COMMUNICATIONS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 267 days.

(21) Appl. No.: 17/200,586

(22) Filed: Mar. 12, 2021

(65) Prior Publication Data

US 2022/0295549 A1 Sep. 15, 2022

(51) Int. Cl.
*H04W 74/0808* (2024.01)
*H04L 5/14* (2006.01)
*H04W 72/044* (2023.01)
*H04W 72/23* (2023.01)

(52) U.S. Cl.
CPC .......... *H04W 74/0808* (2013.01); *H04L 5/14* (2013.01); *H04W 72/044* (2013.01); *H04W 72/23* (2023.01)

(58) Field of Classification Search
None
See application file for complete search history.

(56) References Cited

U.S. PATENT DOCUMENTS

2014/0198699 A1* 7/2014 Makharia ............. H04W 72/04
370/311
2016/0286545 A1* 9/2016 Luo ........................ H04L 1/1812
(Continued)

FOREIGN PATENT DOCUMENTS

CN 113176887 A * 7/2021 ............... G06F 8/65
EP 3886515 A1 9/2021
(Continued)

OTHER PUBLICATIONS

LG Electronics, "MAC impacts of multiple CCAs in wideband operation," 3GPP TSG-RAN WG2 Meeting #109, Obania, Feb. 24, 2020, R2-2001451.*
(Continued)

*Primary Examiner* — Andrew C Oh
(74) *Attorney, Agent, or Firm* — Holland & Hart / QUALCOMM Incorporated

(57) ABSTRACT

Methods, systems, and devices for wireless communications are described. A communication device, which may be known as user equipment (UE), may be capable of full-duplex communications. The UE may determine that at least a portion of a downlink transmission that the UE may receive while concurrently scheduled to transmit an uplink transmission, may overlap with a clear channel assessment (CCA) procedure (e.g., a listen-before-talk (LBT) operation) in a shared radio frequency spectrum band. The UE may determine that at least a portion of the downlink transmission that overlaps with the LBT resources may be canceled or the downlink transmission may be rate matched and allocated to resources outside of the LBT resources. As a result, the UE may perform an LBT procedure without interference caused by the UE receiving the downlink transmission.

28 Claims, 25 Drawing Sheets

(56) References Cited

U.S. PATENT DOCUMENTS

| | | | |
|---|---|---|---|
| 2017/0019919 A1* | 1/2017 | Liang | H04W 72/23 |
| 2017/0171817 A1* | 6/2017 | Zhao | H04W 72/21 |
| 2017/0237592 A1* | 8/2017 | Yang | H04W 72/21 375/260 |
| 2017/0245263 A1* | 8/2017 | Li | H04L 5/0094 |
| 2017/0289972 A1* | 10/2017 | Lei | H04W 72/0453 |
| 2018/0027580 A1* | 1/2018 | Yoo | H04W 72/046 370/230 |
| 2019/0149269 A1* | 5/2019 | Chatterjee | H04L 5/0094 370/329 |
| 2019/0191315 A1* | 6/2019 | Mukherjee | H04W 16/14 |
| 2019/0335504 A1* | 10/2019 | Chakraborty | H04W 16/14 |
| 2019/0349180 A1* | 11/2019 | Lu | H04L 27/2607 |
| 2020/0053754 A1* | 2/2020 | Manolakos | H04L 5/0091 |
| 2020/0145965 A1* | 5/2020 | Luo | H04W 76/36 |
| 2020/0275408 A1* | 8/2020 | Radulescu | H04W 68/02 |
| 2020/0305199 A1* | 9/2020 | Harada | H04W 74/0875 |
| 2020/0344719 A1* | 10/2020 | Luo | H04W 68/005 |
| 2020/0344819 A1* | 10/2020 | Myung | H04W 74/0841 |
| 2021/0144762 A1* | 5/2021 | Tsai | H04W 74/0833 |
| 2021/0274544 A1* | 9/2021 | Yang | H04L 1/1887 |
| 2022/0232545 A1* | 7/2022 | Mukherjee | H04L 5/0048 |
| 2022/0312483 A1* | 9/2022 | Bae | H04L 1/189 |

FOREIGN PATENT DOCUMENTS

| | | | | |
|---|---|---|---|---|
| WO | WO-2017080572 A1 * | 5/2017 | | H04L 5/14 |
| WO | WO-2020033623 A1 * | 2/2020 | | H04L 1/1614 |
| WO | WO-2020091049 A1 * | 5/2020 | | H04L 5/0057 |
| WO | WO-2020105180 A1 * | 5/2020 | | H04L 5/14 |
| WO | WO-2021029708 A1 * | 2/2021 | | H04L 1/08 |
| WO | WO-2021030731 A1 * | 2/2021 | | H04L 5/001 |

OTHER PUBLICATIONS

International Search Report and Written Opinion—PCT/US2022/070530—ISA/EPO—Jul. 19, 2022.

Moderator (LG Electronics): "Summary#2 on Maintenance of Other Aspects for URLLC/IIOT", 3GPP TSG RAN WG1 #100bis, R1-2002721, 3rd Generation Partnership Project, Mobile Competence Centre, 650, Route Des Lucioles, F-06921 Sophia-Antipolis Cedex, France, vol. RAN WG1, No. e-Meeting, Apr. 20, 2020-Apr. 30, 2020, Apr. 18, 2020, XP051876676, 30 Pages.

Intel Corporation: "Common PDCCH Design", 3GPP Draft, 3GPP TSG RAN WG1 Meeting #86, R1-167692, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 22, 2016-Aug. 26, 2016, Aug. 21, 2016 (Aug. 21, 2016), XP051140786, 3 Pages, Retrieved from the Internet: URL: http://www.3gpp.org/ftp/Meetings_3GPP_SYNC/RAN1/Docs/ [Retrieved on Aug. 21, 2016] Section 2.1.

LG Electronics Inc: "MAC Impacts of Multiple CCAs in Wideband Operation", 3GPP Draft, 3GPP TSG-RAN WG2 Meeting #109 electronic, R2-2001451, 3rd Generation Partnership Project (3GPP), Mobile Competence Centre, 650, Route Des Lucioles, F-06921 Sophia-Antipolis Cedex, France, vol. RAN WG2, No. Elbonia, Feb. 24, 2020-Mar. 6, 2020, Feb. 14, 2020 (Feb. 14, 2020), XP051849753, 5 Pages, Retrieved from the Internet: URL: https://ftp.3gpp.org/tsg_ran/WG2_RL2/TSGR2_109_e/Docs/R2-2001451.zip R2- 2001451 MAC Impacts of Multiple CC as in wide Band Operation.docx [Retrieved on Feb. 14, 2020] The Whole Document.

Moderator (LG Electronics): "Summary #2 on Maintenance of Other Aspects for URLLC/IIOT", 3GPP Draft, 3GPP TSG RAN WG1 #100bis, R1-2002721, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20, 2020-Apr. 30, 2020, Apr. 18, 2020 (Apr. 18, 2020), XP051876676, 31 Pages, Retrieved from the Internet: URL: https://ftp.3gpp.org/tsg_ran/WG1_RL1/TSGR1_100b_e/Docs/R1-2002721.zip R1-2002721 Summary#2 of 7.2.5.7 Others.docx [Retrieved on Apr. 18, 2020] Section 3.2.1.

Partial International Search Report—PCT/US2022/070530—ISA/EPO—May 27, 2022.

* cited by examiner

LISTEN-BEFORE-TALK TECHNIQUES FOR FULL-DUPLEX COMMUNICATIONS

FIELD OF TECHNOLOGY

The following relates to wireless communications, including listen-before-talk techniques for full-duplex communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support listen-before-talk techniques for full-duplex communications. Generally, the described techniques provide for a user equipment (UE) operating in a full-duplex mode to perform a clear channel assessment (CCA), such as a listen-before-talk (LBT) procedure, for an uplink transmission while scheduled to receive a downlink transmission, either by cancelling at least part of the downlink transmission or rate matching the downlink transmission around resources of the CCA. The UE may be scheduled to perform the CCA for the uplink transmission while receiving the downlink transmission from the base station. To prevent the energy from the downlink transmission affecting the CCA for the uplink transmission, the base station may modify the downlink transmission. For example, the base station may cancel at least a portion of the downlink transmission that overlaps with resources used for the CCA. In some other examples, the base station may rate match the downlink transmission around the CCA resources, such that the downlink transmission is not transmitted during the CCA resources. As a result, the UE may not receive the downlink transmission during the CCA resources, and the CCA may provide a more accurate determination whether the channel is available for transmission.

A method for wireless communications at a user equipment (UE) is described. The method may include receiving, from a base station, a first control message scheduling a downlink transmission to the UE in a shared radio frequency spectrum band, receiving a second control message from the base station scheduling an uplink transmission in the shared radio frequency spectrum band, the second control message indicating that at least a portion of the downlink transmission scheduled for transmission during clear channel assessment resources associated with the uplink transmission is cancelled, performing, in the shared radio frequency spectrum band, a clear channel assessment procedure within the clear channel assessment resources, and transmitting, in the shared radio frequency spectrum band, the uplink transmission based on the clear channel assessment procedure.

An apparatus for wireless communications at a UE is described. The apparatus may include a processor, memory coupled with the processor, and instructions stored in the memory. The instructions may be executable by the processor to cause the apparatus to receive, from a base station, a first control message scheduling a downlink transmission to the UE in a shared radio frequency spectrum band, receive a second control message from the base station scheduling an uplink transmission in the shared radio frequency spectrum band, the second control message indicating that at least a portion of the downlink transmission scheduled for transmission during clear channel assessment resources associated with the uplink transmission is cancelled, perform, in the shared radio frequency spectrum band, a clear channel assessment procedure within the clear channel assessment resources, and transmit, in the shared radio frequency spectrum band, the uplink transmission based on the clear channel assessment procedure.

Another apparatus for wireless communications at a UE is described. The apparatus may include means for receiving, from a base station, a first control message scheduling a downlink transmission to the UE in a shared radio frequency spectrum band, means for receiving a second control message from the base station scheduling an uplink transmission in the shared radio frequency spectrum band, the second control message indicating that at least a portion of the downlink transmission scheduled for transmission during CCA resources associated with the uplink transmission is cancelled, means for performing, in the shared radio frequency spectrum band, a CCA procedure within the CCA resources, and means for transmitting, in the shared radio frequency spectrum band, the uplink transmission based on the CCA procedure.

A non-transitory computer-readable medium storing code for wireless communications at a UE is described. The code may include instructions executable by a processor to receive, from a base station, a first control message scheduling a downlink transmission to the UE in a shared radio frequency spectrum band, receive a second control message from the base station scheduling an uplink transmission in the shared radio frequency spectrum band, the second control message indicating that at least a portion of the downlink transmission scheduled for transmission during CCA resources associated with the uplink transmission is cancelled, perform, in the shared radio frequency spectrum band, a CCA procedure within the CCA resources, and transmit, in the shared radio frequency spectrum band, the uplink transmission based on the CCA procedure.

Some examples of the method, apparatuses, and non-transitory computer-readable medium described herein may further include operations, features, means, or instructions for receiving a Radio Resource Control (RRC) message indicating one or more downlink transmission cancellation configurations, where the second control message implicitly indicates a first configuration from the one or more downlink transmission cancellation configurations that indicates the at least the portion of the downlink transmission that may be cancelled.

Some examples of the method, apparatuses, and non-transitory computer-readable medium described herein may further include operations, features, means, or instructions for receiving an RRC message including one or more downlink transmission cancellation configurations and receiving the second control message indicating a first configuration from the one or more downlink transmission cancellation configurations that indicates the at least the portion of the downlink transmission that may be cancelled.

In some examples of the method, apparatuses, and non-transitory computer-readable medium described herein, receiving the second control message may include operations, features, means, or instructions for receiving the second control message that indicates a type of the CCA procedure, where the downlink transmission may be cancelled during at least a portion of the CCA resources based on the indicated type of the CCA procedure.

In some examples of the method, apparatuses, and non-transitory computer-readable medium described herein, receiving the second control message may include operations, features, means, or instructions for receiving the second control message indicating that the downlink transmission may be at least partially cancelled on time resources overlapping with the CCA resources, partially cancelled in frequency resources overlapping with the CCA resources, or both.

In some examples of the method, apparatuses, and non-transitory computer-readable medium described herein, receiving the second control message may include operations, features, means, or instructions for receiving the second control message indicating that the downlink transmission may be fully cancelled starting from a first symbol overlapping the CCA resources or fully cancelled.

Some examples of the method, apparatuses, and non-transitory computer-readable medium described herein may further include operations, features, means, or instructions for receiving a remaining portion of the downlink transmission in the shared radio frequency spectrum band concurrent to transmitting at least a portion of the uplink transmission.

In some examples of the method, apparatuses, and non-transitory computer-readable medium described herein, the portion of the downlink transmission overlaps a set of multiple CCA resources for a group of spatially proximate UEs, and the portion of the downlink transmission may be cancelled based on overlapping the set of multiple CCA resources.

A method for wireless communications at a UE is described. The method may include receiving a control message indicating a rate matching resource corresponding to CCA resources for a shared radio frequency spectrum band, performing a CCA procedure within the CCA resources, and receiving, in the shared radio frequency spectrum band, a downlink transmission that is rate matched around the rate matching resource concurrent with transmitting, in the shared radio frequency spectrum band, an uplink transmission based on the CCA procedure.

An apparatus for wireless communications at a UE is described. The apparatus may include a processor, memory coupled with the processor, and instructions stored in the memory. The instructions may be executable by the processor to cause the apparatus to receive a control message indicating a rate matching resource corresponding to CCA resources for a shared radio frequency spectrum band, perform a CCA procedure within the CCA resources, and receive, in the shared radio frequency spectrum band, a downlink transmission that is rate matched around the rate matching resource concurrent with transmitting, in the shared radio frequency spectrum band, an uplink transmission based on the CCA procedure.

Another apparatus for wireless communications at a UE is described. The apparatus may include means for receiving a control message indicating a rate matching resource corresponding to CCA resources for a shared radio frequency spectrum band, means for performing a CCA procedure within the CCA resources, and means for receiving, in the shared radio frequency spectrum band, a downlink transmission that is rate matched around the rate matching resource concurrent with transmitting, in the shared radio frequency spectrum band, an uplink transmission based on the CCA procedure.

A non-transitory computer-readable medium storing code for wireless communications at a UE is described. The code may include instructions executable by a processor to receive a control message indicating a rate matching resource corresponding to CCA resources for a shared radio frequency spectrum band, perform a CCA procedure within the CCA resources, and receive, in the shared radio frequency spectrum band, a downlink transmission that is rate matched around the rate matching resource concurrent with transmitting, in the shared radio frequency spectrum band, an uplink transmission based on the CCA procedure.

In some examples of the method, apparatuses, and non-transitory computer-readable medium described herein, receiving the control message may include operations, features, means, or instructions for receiving the control message indicating the rate matching resource via RRC signaling.

In some examples of the method, apparatuses, and non-transitory computer-readable medium described herein, receiving the control message may include operations, features, means, or instructions for receiving the control message via the RRC that semi-statically configures a set of multiple CCA resources including the CCA resources, where the downlink transmission that may be rate matched around the rate matching resource that corresponds to the set of multiple CCA resources.

In some examples of the method, apparatuses, and non-transitory computer-readable medium described herein, receiving the control message may include operations, features, means, or instructions for receiving the control message indicating the rate matching resource via downlink control information.

In some examples of the method, apparatuses, and non-transitory computer-readable medium described herein, receiving the control message may include operations, features, means, or instructions for receiving the control message via the downlink control information that indicates an uplink grant for the uplink transmission.

In some examples of the method, apparatuses, and non-transitory computer-readable medium described herein, receiving the control message may include operations, features, means, or instructions for receiving the control message indicating a time domain resource allocation indication for the rate matching resource, a frequency domain resource allocation indication for the rate matching resource, or both.

In some examples of the method, apparatuses, and non-transitory computer-readable medium described herein, receiving the control message may include operations, features, means, or instructions for receiving the control message indicating a start and length indicator value for the rate matching resource, an index to a table of rate matching resource configurations, or both.

In some examples of the method, apparatuses, and non-transitory computer-readable medium described herein, receiving the control message may include operations, features, means, or instructions for receiving the control message via the downlink control information that may be a group common downlink control information.

In some examples of the method, apparatuses, and non-transitory computer-readable medium described herein, receiving the control message may include operations, features, means, or instructions for receiving the control message indicating the rate matching resource that corresponds to a set of multiple CCA resources for a group of spatially proximate UEs.

Some examples of the method, apparatuses, and non-transitory computer-readable medium described herein may further include operations, features, means, or instructions for receiving the downlink transmission having a transport block size that may be calculated based on a set of resources for the downlink transmission excluding the rate matching resource.

A method for wireless communications at a base station is described. The method may include transmitting, to a UE, a first control message scheduling a downlink transmission to the UE in a shared radio frequency spectrum band, transmitting a second control message to the UE scheduling an uplink transmission in the shared radio frequency spectrum band, the second control message indicating that at least a portion of the downlink transmission scheduled for transmission during CCA resources associated with the uplink transmission is cancelled, cancelling at least the portion of the downlink transmission in the shared radio frequency spectrum band scheduled during the CCA resources, and receiving, in the shared radio frequency spectrum band, the uplink transmission.

An apparatus for wireless communications at a base station is described. The apparatus may include a processor, memory coupled with the processor, and instructions stored in the memory. The instructions may be executable by the processor to cause the apparatus to transmit, to a UE, a first control message scheduling a downlink transmission to the UE in a shared radio frequency spectrum band, transmit a second control message to the UE scheduling an uplink transmission in the shared radio frequency spectrum band, the second control message indicating that at least a portion of the downlink transmission scheduled for transmission during CCA resources associated with the uplink transmission is cancelled, cancel at least the portion of the downlink transmission in the shared radio frequency spectrum band scheduled during the CCA resources, and receive, in the shared radio frequency spectrum band, the uplink transmission.

Another apparatus for wireless communications at a base station is described. The apparatus may include means for transmitting, to a UE, a first control message scheduling a downlink transmission to the UE in a shared radio frequency spectrum band, means for transmitting a second control message to the UE scheduling an uplink transmission in the shared radio frequency spectrum band, the second control message indicating that at least a portion of the downlink transmission scheduled for transmission during CCA resources associated with the uplink transmission is cancelled, means for cancelling at least the portion of the downlink transmission in the shared radio frequency spectrum band scheduled during the CCA resources, and means for receiving, in the shared radio frequency spectrum band, the uplink transmission.

A non-transitory computer-readable medium storing code for wireless communications at a base station is described. The code may include instructions executable by a processor to transmit, to a UE, a first control message scheduling a downlink transmission to the UE in a shared radio frequency spectrum band, transmit a second control message to the UE scheduling an uplink transmission in the shared radio frequency spectrum band, the second control message indicating that at least a portion of the downlink transmission scheduled for transmission during CCA resources associated with the uplink transmission is cancelled, cancel at least the portion of the downlink transmission in the shared radio frequency spectrum band scheduled during the CCA resources, and receive, in the shared radio frequency spectrum band, the uplink transmission.

Some examples of the method, apparatuses, and non-transitory computer-readable medium described herein may further include operations, features, means, or instructions for transmitting an RRC message indicating one or more downlink transmission cancellation configurations, where the second control message implicitly indicates a first configuration from the one or more downlink transmission cancellation configurations that indicates the at least the portion of the downlink transmission that may be cancelled.

Some examples of the method, apparatuses, and non-transitory computer-readable medium described herein may further include operations, features, means, or instructions for transmitting an RRC message including one or more downlink transmission cancellation configurations and transmitting the second control message indicating a first configuration from the one or more downlink transmission cancellation configurations that indicates the at least the portion of the downlink transmission that may be cancelled.

In some examples of the method, apparatuses, and non-transitory computer-readable medium described herein, transmitting the second control message may include operations, features, means, or instructions for transmitting the second control message that indicates a type of the CCA procedure, where the downlink transmission may be cancelled during at least a portion of the CCA resources based on the indicated type of the CCA procedure.

In some examples of the method, apparatuses, and non-transitory computer-readable medium described herein, transmitting the second control message may include operations, features, means, or instructions for transmitting the second control message indicating that the downlink transmission may be at least partially cancelled on time resources overlapping with the CCA resources, partially cancelled in frequency resources overlapping with the CCA resources, or both.

In some examples of the method, apparatuses, and non-transitory computer-readable medium described herein, transmitting the second control message may include operations, features, means, or instructions for transmitting the second control message indicating that the downlink transmission may be fully cancelled starting from a first symbol overlapping the CCA resources or fully cancelled.

A method for wireless communications at a base station is described. The method may include transmitting a control message to a UE indicating a rate matching resource corresponding to CCA resources for a shared radio frequency spectrum band and transmitting, in the shared radio frequency spectrum band, a downlink transmission that is rate matched around the rate matching resource concurrent with receiving, in the shared radio frequency spectrum band, an uplink transmission from the UE.

An apparatus for wireless communications at a base station is described. The apparatus may include a processor, memory coupled with the processor, and instructions stored in the memory. The instructions may be executable by the processor to cause the apparatus to transmit a control message to a UE indicating a rate matching resource corresponding to CCA resources for a shared radio frequency spectrum band and transmit, in the shared radio frequency spectrum band, a downlink transmission that is rate matched around the rate matching resource concurrent with receiving, in the shared radio frequency spectrum band, an uplink transmission from the UE.

Another apparatus for wireless communications at a base station is described. The apparatus may include means for transmitting a control message to a UE indicating a rate matching resource corresponding to CCA resources for a shared radio frequency spectrum band and means for transmitting, in the shared radio frequency spectrum band, a downlink transmission that is rate matched around the rate matching resource concurrent with receiving, in the shared radio frequency spectrum band, an uplink transmission from the UE.

A non-transitory computer-readable medium storing code for wireless communications at a base station is described. The code may include instructions executable by a processor to transmit a control message to a UE indicating a rate matching resource corresponding to CCA resources for a shared radio frequency spectrum band and transmit, in the shared radio frequency spectrum band, a downlink transmission that is rate matched around the rate matching resource concurrent with receiving, in the shared radio frequency spectrum band, an uplink transmission from the UE.

In some examples of the method, apparatuses, and non-transitory computer-readable medium described herein, transmitting the control message may include operations, features, means, or instructions for transmitting the control message indicating the rate matching resource via RRC signaling.

In some examples of the method, apparatuses, and non-transitory computer-readable medium described herein, transmitting the control message may include operations, features, means, or instructions for transmitting the control message indicating the rate matching resource via downlink control information.

In some examples of the method, apparatuses, and non-transitory computer-readable medium described herein, transmitting the control message may include operations, features, means, or instructions for transmitting the control message via the downlink control information that indicates an uplink grant for the uplink transmission.

In some examples of the method, apparatuses, and non-transitory computer-readable medium described herein, transmitting the control message may include operations, features, means, or instructions for transmitting the control message indicating a time domain resource allocation indication for the rate matching resource, a frequency domain resource allocation indication for the rate matching resource, or both.

In some examples of the method, apparatuses, and non-transitory computer-readable medium described herein, receiving the control message may include operations, features, means, or instructions for transmitting the control message indicating a start and length indicator value for the rate matching resource, an index to a table of rate matching resource configurations, or both.

DETAILED DESCRIPTION

Figure 1:
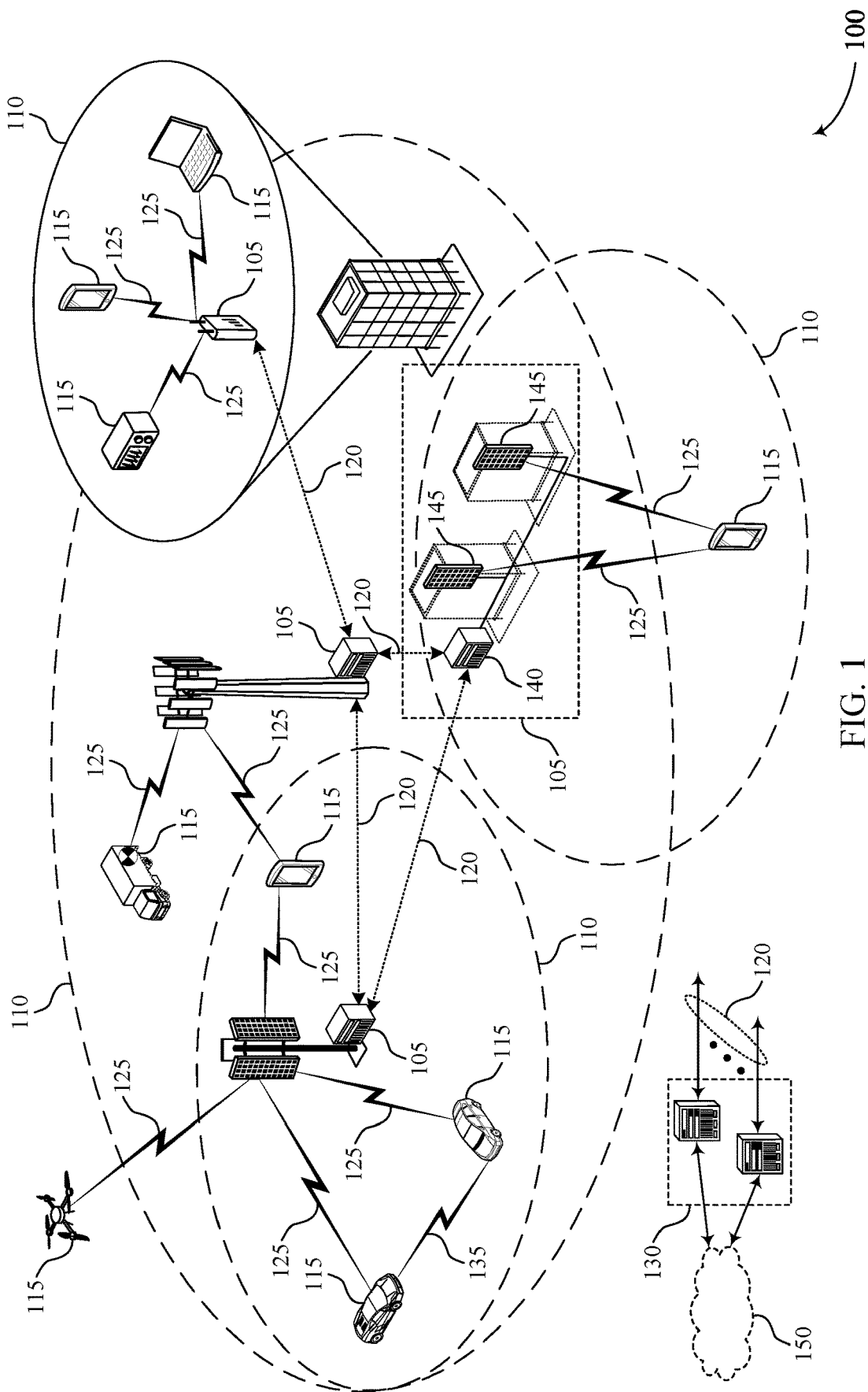
FIG. 1 illustrates an example of a wireless communications system that supports listen-before-talk (LBT) techniques for full-duplex communications in accordance with aspects of the present disclosure.

A wireless communications system may include various communication devices, such as a user equipment (UE) and a base station, which may provide wireless communication services to the UE. For example, the base station may be a next-generation NodeB (which may be referred to as a gNB) that may support multiple radio access technologies including 4G systems, such as 4G LTE, as well as 5G systems (which may be referred to as 5G NR). In the wireless communications system, a UE may operate in a full-duplex mode, where the UE may transmit on an uplink and receive on a downlink concurrently, either on the same frequency resource or on different frequency resources separated by a guard band. In some cases, the channel may be part of an unlicensed or shared radio frequency spectrum band and may be shared with other communication devices in the wireless communications system, such as other UEs.

The UE may perform a clear channel assessment (CCA), such as a listen-before-talk (LBT) procedure, to determine the availability of the channel. For example, the UE may determine whether the channel is available (e.g., not currently used by other communication devices) or unavailable (e.g., in use by other communication devices). In some cases, the UE may be scheduled to transmit an uplink transmission while concurrently scheduled to receive a downlink transmission. In some cases, the downlink transmission may overlap with LBT resources for an LBT procedure to determine whether the channel is available to transmit the uplink transmission. In some wireless communications systems, energy from the downlink transmission may be detected during the LBT procedure, which may cause the UE to determine that the channel is unavailable for the uplink transmission. Therefore, the result of the channel access procedure may lead to a busy channel and unused resources even though the channel might be available for uplink transmission by the full-duplex capable UE.

Various aspects of the present disclosure relate to configuring a UE to perform an LBT procedure while operating in a full-duplex mode. A base station may modify the downlink transmission to avoid impacting the LBT procedure performed by the UE. In some cases, the base station may cancel at least a portion of the downlink transmission that overlaps with LBT resources. In some examples, the downlink transmission may be fully canceled, partially canceled, or a combination thereof. For example, the base station may partially or fully cancel the downlink transmission on time domain resources, frequency domain resources, or both. The cancellation may be implicitly or explicitly indicated to the UE. For example, the UE may assume the downlink transmission is cancelled on overlapping resources based on receiving the control signaling (e.g. uplink grant), the resources used for the LBT operation, or both, or the UE may receive control signaling from the base station including an explicit indication that at least a portion of the downlink transmission is canceled. As a result, the downlink transmission may not interfere with the LBT procedure, and the UE may make a more reliable determination for whether the channel is available for the uplink transmission.

Some additional aspects of the present disclosure relate to rate matching the downlink transmission around resources which overlap with the LBT resources. The base station may apply rate matching on the downlink resources that overlap with the LBT resources, such that the downlink transmission is transmitted on resources around the LBT resources. The base station may semi-statically configure rate matching resources via Radio Resource Control (RRC) signaling or dynamically indicate rate matching resources via downlink control information (DCI). For example, the rate matching resources may be indicated in a DCI scheduling the uplink transmission.

Operations performed by the UE may provide improvements to wireless communications by increasing the reliability and reducing the latency of wireless communications over an unlicensed radio frequency spectrum band. Additionally, the UE may experience power saving, for example, by providing efficient LBT procedures in the wireless communications system.

Aspects of the disclosure are initially described in the context of wireless communications systems. Aspects of the disclosure are further illustrated by and described with reference to apparatus diagrams, system diagrams, and flowcharts that relate to listen-before-talk techniques for full-duplex communications.

FIG. 1 illustrates an example of a wireless communications system 100 that supports listen-before-talk techniques for full-duplex communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The wireless communications system 100 may include one or more UEs 115 configured to operate in a full-duplex mode. The UE 115 configured to operate in the full-duplex mode may be able to transmit and receive signals within a same frame or subframe. A UE 115 that operates in the full-duplex mode may use in-band full-duplex (IBFD), sub-band full-duplex (SBFD), or a combination thereof. A UE 115 that supports IBFD may transmit and receive on a same time and frequency resource. Alternatively, a UE 115 that supports SBFD may transmit and receive on the same time resource but on different frequency resources.

The wireless communications system 100 may also include one or more base stations 105 configured to operate in a full-duplex mode. In some examples, the base station 105 configured to operate in the full-duplex mode may include at least two panels, where one panel may be used for transmitting and the other may be used for receiving, which may allow for simultaneous transmitting and receiving operations.

In some cases, the UE may operate in an unlicensed radio frequency spectrum band, and may be shared with other communication devices (e.g., other UEs) in the wireless communications system. For example, in unlicensed radio frequency spectrum band, NR may coexist with, for example, Wi-Fi or any other wireless communications network. In the case of Wi-Fi, NR and Wi-Fi may coexist in the 5 GHz and 6 GHz band. The other communications network may perform channel access at a specific frequency units, for example, Wi-Fi channel access may be in 20 MHz units.

To gain access to a channel on an unlicensed radio frequency spectrum band, a device may perform a CCA procedure, such as an LBT procedure, before transmission. The CCA procedure may occur over a set of CCA resources. In some cases, the resources in time and frequency at which the UE 115 performs energy measurements for a CCA may be referred to as a CCA window. For an LBT procedure, a device or a node may sense the channel by detecting the energy in a given frequency band. If the detected energy is below a given threshold, the device may determine that the channel is available, and the device can use the channel for transmission. In some examples, the LBT procedure may be performed within a portion of the LBT resources. Upon performing a successful LBT procedure (e.g., the channel is available), the device may be granted a channel occupancy time (COT) to transmit on the channel. If the detected energy is above the threshold, the device may determine that the channel is occupied, and the device may back off and perform another LBT until the channel is determined to be available.

In order to perform LBT procedures in the frequency domain, the network may determine units of basic channel access, such as LBT bandwidth. Each LBT bandwidth may include an available set of RBs (e.g., an RB set). The RB set may be derived from intra-cell guard band signaling, which may be configured separately for downlink and uplink (e.g., intraCellGuardBandDL and intraCellGuardBandUL). It may be that the guard band size is zero when a base station 105 or UE 115 may perform an all or nothing transmission.

Therefore, in the frequency domain, the LBT resources are determined based on RB sets.

A channel access LBT mechanism may be one of multiple different types of LBT procedure, which may be referred to as different categories of LBT procedure. Load based equipment (LBE) may use a Category 4 (Cat 4) LBT to contend for a COT and use a Category 2 (Cat 2) LBT procedure for inside the COT. Cat 2 may be used for discovery reference signal (DRS) transmission under some constraints, such as if the device does not have unicast data, a length of the transmission is 1 ms or shorter, and a duty cycle does not exceed 1/20. A Cat 4 LBT procedure may have a contention window and in some cases be referred to as a Type 1. A Type 2A Cat 2 LBT procedure may have a 25 microsecond gap, and a Type 2B Cat 4 LBT procedure may have a 16 microsecond gap. A Cat 1 LBT procedure (Type 2B) may have no more than a 16 microsecond gap without channel sensing, and a transmission burst length of, for example, 0.584 milliseconds may be applied when using the Cat 1 LBT procedure.

A full-duplex UE 115 may receive downlink signaling and transmit uplink signaling at the same time. For IBFD, the UE 115 may transmit and receive on the same time and frequency resource. For sub-band FDD (e.g., flexible duplex), the UE 115 may transmit and receive at the same time but on different frequency resources. Flexible duplex may be referred to as SBFD. The frequency resources for uplink and downlink may be separated by a guard band in the frequency domain. However, in some cases, downlink signaling received at the UE 115 may affect a CCA procedure performed prior to transmitting uplink signaling (e.g., downlink signal energy may cause the CCA outcome to fail preventing uplink transmission). The wireless communications system 100, and wireless communications systems described herein, support techniques to prevent downlink signaling from interfering with a CCA performed to transmit uplink signaling at a UE 115, such as a full-duplex capable UE 115.

For example, the wireless communications system 100 may support downlink transmission cancellation configurations and rate matching configurations that enable a UE 115 to decode a downlink transmission where at least a portion of the downlink transmission may have been canceled, or the downlink transmission may have been rate matched around the LBT resources. This may allow the UE 115 to perform an LBT procedure more reliably, since the UE may not receive downlink transmission during the LBT resources.

Figure 2:
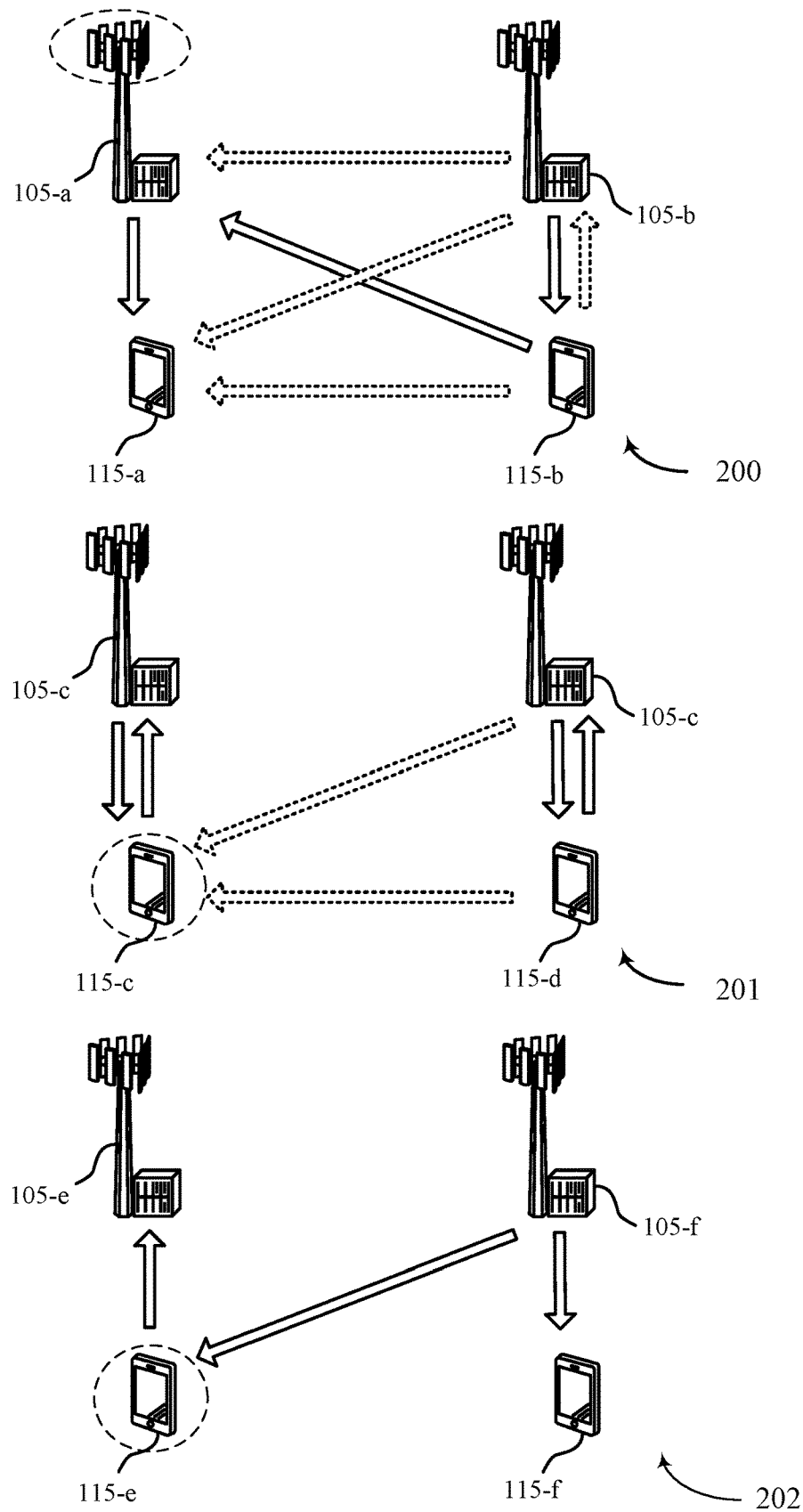
FIG. 2 illustrates examples of wireless communications systems in accordance with aspects of the present disclosure.

FIG. 2 illustrates examples of wireless communications systems 200, 201, and 202 that support listen-before-talk techniques for full-duplex communications in accordance with aspects of the present disclosure. The wireless communications systems 200, 201, and 202 may implement aspects of the wireless communications system 100 or may be implemented by aspects of the wireless communications system 100 as described with reference to FIG. 1. The wireless communications systems 200, 201, and 202 may each include one or more UEs 115 and one or more base stations 105, which may be examples of UEs 115 and base stations 105 described with reference to FIG. 1. The wireless communications systems 200, 201, and 202 may support half-duplex communications or full-duplex communications, or both.

The wireless communications systems 200, 201, and 202 may each show an example of self-interference either at a UE 115 or at a base station 105. In self-interference, a full-duplex device may experience interference from a signal which is communicated by the full-duplex device. For example, a transmission by a full-duplex device may interfere with reception at the full-duplex device, as energy propagated by antennas used for the transmission may reach antennas used for reception. In some cases, a full-duplex device may experience interference which may impact an LBT procedure performed at the full-duplex device. Although the full-duplex device may be capable of transmission and reception simultaneously, a first signal received by the full-duplex device may prevent the full-duplex device from gaining access to a channel to transmit a second signal.

In the example of wireless communications system 200, the base station 105-a may experience self-interference from downlink communications to uplink communications. In the example of the wireless communications system 200, the base stations 105 may be configured for full-duplex communications, and the UEs 115 may be configured for half-duplex communications. In an example, the base station 105-a may transmit downlink signaling to the UE 115-a using at least one antenna panel and receive uplink signaling from the UE 115-b using another antenna panel. This may cause self-interference at the base station 105-a, as energy propagated from the transmitting antennas may interfere with the receiving antennas. Additionally, or alternatively, the base station 105-a may experience some interference from transmissions by the base station 105-b, such as base station-to-base station signaling or downlink signaling to a UE 115 (e.g., the UE 115-a or the UE 115-b). In some cases, signaling from the UE 115-b (e.g., to the base stations 105 or to the UE 115-a directly) may cause interference to the downlink reception at the UE 115-a.

In the example of wireless communications system 201, the base stations 105 and the UEs 115 may be configured for full-duplex communications. The wireless communications system 201 may show an example of uplink-to-downlink self-interference at UE 115-c. For example, the base station 105-c may transmit downlink signaling to the UE 115-c, which the UE 115-c may receive via at least one antenna panel of the UE 115-c. The UE 115-c may also transmit uplink communications to the base station 105-c via another antenna panel of the UE 115-c. This may cause self-interference at the UE 115-c, as energy propagated from the transmitting antennas of the UE 115-c may affect the antennas receiving the downlink signaling. Additionally, or alternatively, downlink signaling from the base station 105-c or transmission from the UE 115-d may cause interference at UE 115-c (e.g., interfering with receiving the downlink signaling from the base station 105-c).

In the example of the wireless communications system 202, UE 115-e may be configured for full-duplex communications. The UE 115-e may experience uplink-to-downlink self-interference. For example, the UE 115-e may transmit uplink communications to the base station 105-e, as well as receive downlink communications from the base station 105-f. The base station 105-f may transmit downlink signaling to both the UE 115-e and the UE 115-f. The simultaneous transmission and reception may cause self-interference at the UE 115-e. For example, simultaneously transmitting the uplink signaling to base station 105-e and receiving the downlink signaling from base station 105-f may result in energy from the transmitting antennas interfering with the receiving antennas.

Some wireless communications systems may implement techniques to prevent self-interference. For example, a full-duplex device may use separate panels for transmission and reception, which may be located at different places on the device to mitigate interference. To prevent signaling from disrupting an LBT procedure at a full-duplex device, the full-duplex device may implement techniques described herein. For example, a UE 115 and a base station 105 as described with reference to FIG. 2 may implement techniques to prevent downlink signaling from being detected by an LBT procedure performed by a UE 115 to transmit uplink signaling. These techniques may include downlink transmission cancellation or downlink rate matching, or both, as described in further detail with reference to FIGS. 4A, 4B, 5A, and 5B. The UEs 115 may utilize these techniques in order to determine that either at least a portion of the downlink transmission has been canceled or the downlink transmission has been rate matched around LBT resources. As a result, a UE 115 may perform an LBT procedure that may make a more reliable determination as to whether a channel is available since the downlink transmission is not transmitted during the LBT resources, mitigating energy sensed at the UE 115 during an LBT procedure.

Figure 3:
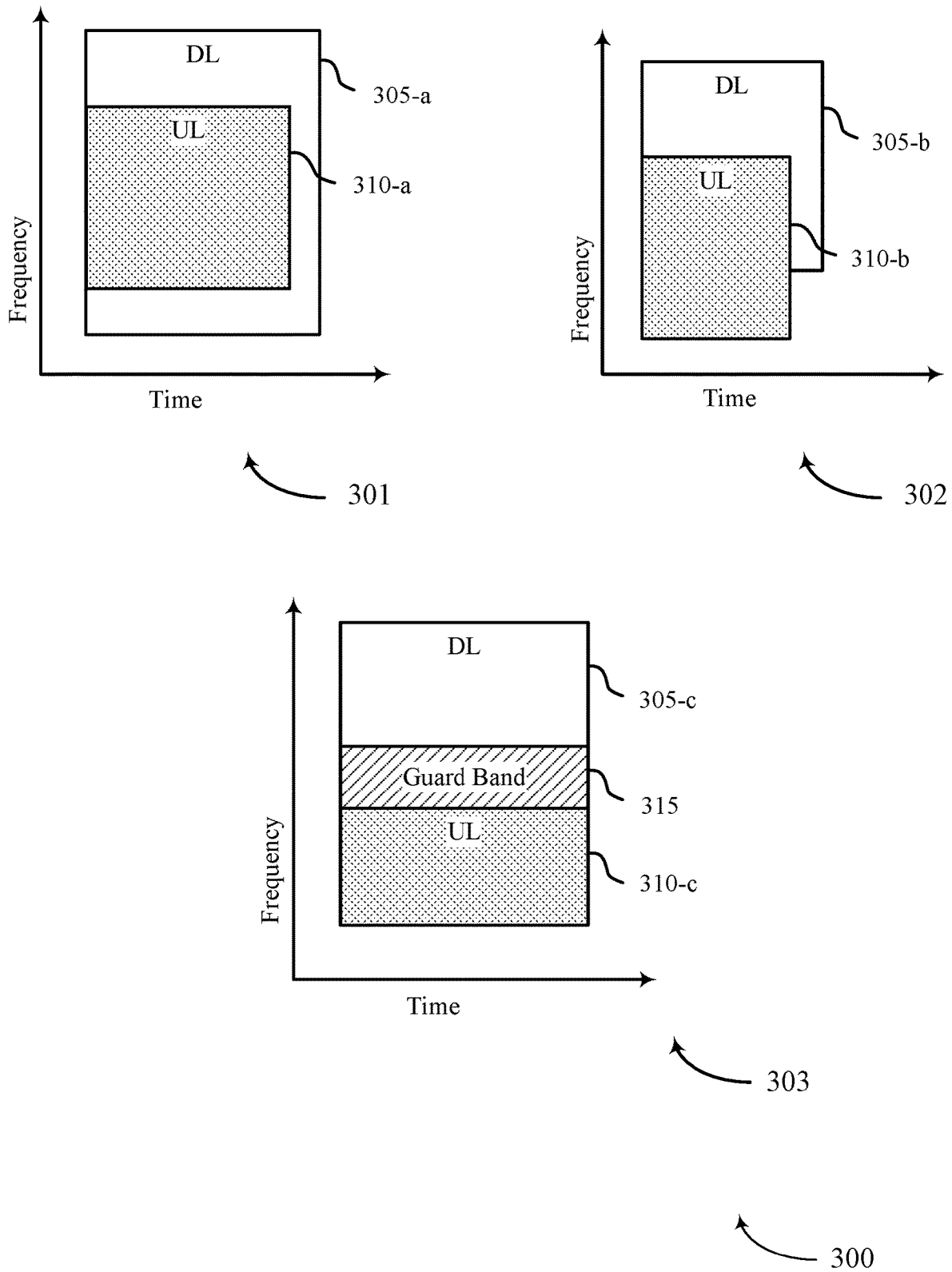
FIG. 3 illustrates an example of resource configurations in accordance with aspects of the present disclosure.

FIG. 3 illustrates an example of resource configurations 300 that support listen-before-talk techniques for full-duplex communications in accordance with aspects of the present disclosure. The resource configurations 300 may implement aspects of the wireless communications systems 100 or may be implemented by aspects of the wireless communications systems 100 as described with reference to FIG. 1.

The resource configurations 300 may illustrate resource allocations for wireless communications between a base station 105 and a UE 115. The resource configurations 300 may include a resource configuration 301, a resource configuration 302, and a resource configuration 303. The resource configurations 300, including the resource configuration 301, the resource configuration 302, and the resource configuration 303 may be examples of resource configurations configured by the base station 105 according to a full-duplex capability of a UE 115.

The resource configuration 301 may be an example of a fully overlapping IBFD resource allocation. For example, a base station 105 may allocate downlink resources 305-*a* and uplink resources 310-*a* for a UE 115 in overlapping frequency resources (e.g., the uplink resources 310-*a* are fully contained within the downlink resources 305-*a*). For example, the downlink resources 305-*a* and the uplink resources 310-*a* may overlap such that a UE 115 transmits and receives on the same time and frequency resources. In some cases, a UE 115 may receive an indication that the downlink resources 305-*a* carry a downlink transmission that overlaps in time with an uplink transmission on the uplink resources 310-*a* to the base station. Accordingly, the UE 115 may determine that the downlink transmission are to be received in a high-interference environment and may decode the downlink transmission accordingly.

The resource configuration 302 may be an example of a partially overlapping IBFD resource allocation. For example, a base station 105 may allocate downlink resources 305-*b* and uplink resources 310-*b* for a UE 115 in partially overlapping time and frequency resources, such that the UE 115 and the base station 105 may transmit and receive on at least an overlapping portion of time and frequency resources. In some cases, other portions of the downlink resources 305-*b* and the uplink resources 310-*b* may not overlap in time or frequency, or both.

The resource configuration 303 may be an example of an SBFD resource allocation. For example, a base station 105 may allocate downlink resources 305-*c* and uplink resources 310-*c* for a UE 115 in separate frequency resources that occur during a same time period, such that the UE 115 and the base station 105 may transmit and receive over overlapping time resources and different frequency resources on the same radio frequency spectrum band. In some examples, the downlink resources 305-*c* and the uplink resources 310-*c* may be separated in frequency by a guard band 315. The guard band 315 may be, for example, one or a few RBs (e.g., five RBs) separating the downlink resources 305-*c* and the uplink resource 310-*c* in the frequency domain.

A UE 115 and a base station 105 may use techniques described herein while communicating using an IBFD resource allocation or an SBFD resource allocation. For example, a UE 115 may be scheduled for a downlink transmission on the downlink resources 305-*a* and an uplink transmission on the uplink resources 310-*a*. In some cases, the downlink resources 305-*a* may span a greater duration on a least the time domain, such as being scheduled to start before the uplink resources 310-*a*. CCA resources for a CCA procedure to transmit the uplink transmission on the uplink resources 310-*a* may at least partially overlap with the scheduled downlink transmission. The UE 115 and the base station 105 may employ techniques described herein to either cancel a portion of the downlink transmission which overlaps with the CCA resources or to rate match the downlink transmission around the CCA resources. In some cases, the downlink transmission may be cancelled for or rate matched around a portion of the CCA resources where the UE 115 performs a CCA procedure. This may prevent energy from the downlink transmission from affecting the CCA procedure, ensuring that the UE 115 does not fail the CCA procedure by detecting energy from the downlink transmission.

Figure 4A:
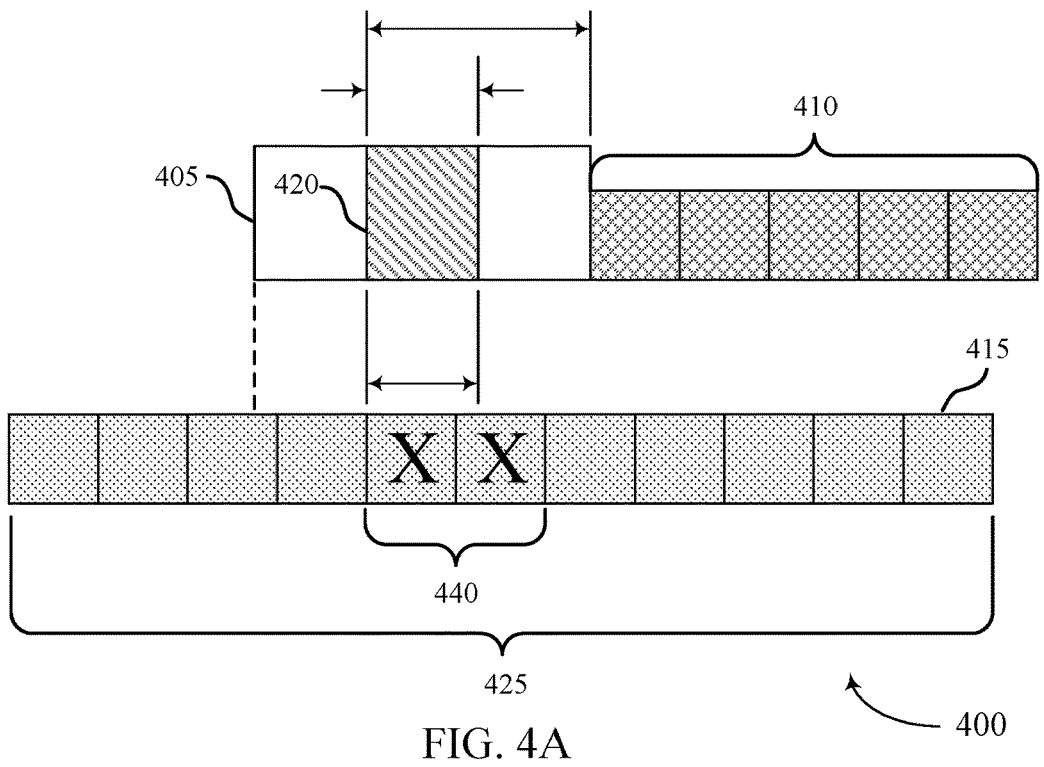
FIGS. 4A and 4B illustrate an example of a time domain resource configuration and a frequency domain resource configuration in accordance with aspects of the present disclosure.
Figure 4B:
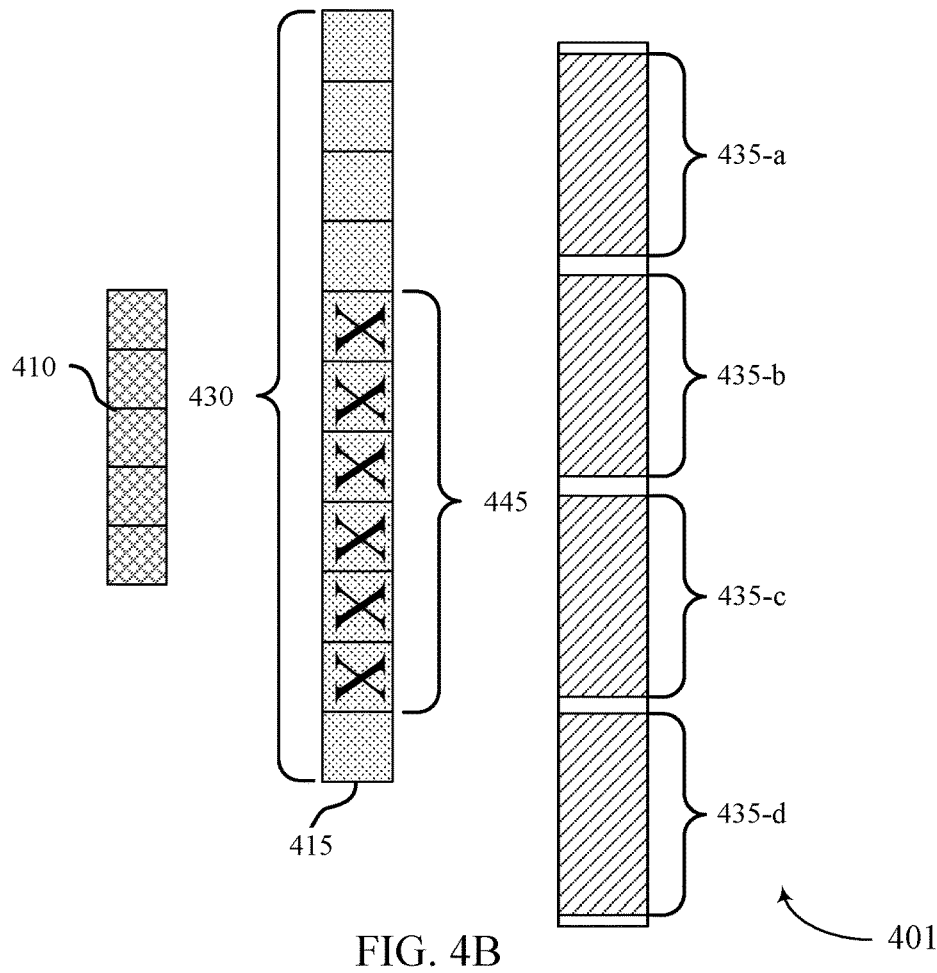

FIGS. 4A and 4B illustrate an example of a time domain resource configuration 400 and a frequency domain resource configuration 401 that supports LBT techniques for full-duplex communications in accordance with aspects of the present disclosure. The time domain resource configuration 400 and the frequency domain resource configuration 401 may implement aspects of the wireless communications systems 100 or may be implemented by aspects of the wireless communications system 100 as described with reference to FIG. 1.

The time domain resource configuration 400 and frequency domain resource configuration 401 may illustrate resource allocations for full-duplex wireless communications between a base station 105 and a UE 115, which may be examples of corresponding devices as described herein. The time domain resource configuration 400 and frequency domain resource configuration 401 may be an example of a resource configuration configured by a base station 105 according to a full or partial downlink cancellation technique during an LBT procedure for full-duplex communications.

A UE 115 may be capable of full-duplex communications to transmit and receive at the same time on a same frequency band. In some examples, the UE 115 may be capable of IBFD or SBFD, or both. The UE 115 may operate in a shared radio frequency spectrum band (e.g., an unlicensed frequency spectrum band) that shares a spectrum with other radio access technologies (e.g., an NR-U system, a Wi-Fi system) or between wireless communication systems, or both.

In some cases, the UE 115 may receive a control message (e.g., DCI), scheduling a downlink transmission 415 on a set of downlink time domain resources 425 and a set of downlink frequency domain resources 430. While receiving the downlink transmission 415, the UE 115 may receive a second control message including an uplink grant, scheduling an uplink transmission 410. In some cases, the uplink transmission 410 may be scheduled for the same time resources or frequency resources, or both, that the UE is scheduled to also receive the downlink transmission 415.

The downlink transmission 415 may overlap with CCA resources 405, which may in some cases be referred to as a CCA window, for the UE 115. The UE 115 may perform a CCA procedure 420 in the CCA resources 405 to check if the channel is available and the UE 115 can send the uplink transmission 410 without causing interference.

The UE 115 and the base station 105 may use techniques to cancel at least a portion of the downlink transmission 415 which overlaps with time or frequency resources of the CCA procedure 420 or the CCA resources 405. The downlink resources may have an impact on the LBT operation which is performed prior to the uplink transmission 410, as energy from the downlink transmission 415 could be detected by the LBT operation. Therefore, the UE 115 may assume cancellation of the downlink resources in the symbols that overlap with the LBT operation (e.g., downlink resources overlapping the LBT resources). In some cases, the resources for the LBT operation may be based on the type of LBT which is used for the uplink grant. For example, for a Type 2B LBT procedure, the UE 115 may assume cancellation of downlink resources overlapping the CCA procedure 420.

For example, the base station 105 may transmit the downlink transmission 415 on the set of downlink time domain resources 425 and the set of downlink frequency domain resources 430, but the base station 105 may cancel transmission on a cancelled set of time domain resources 440 and a cancelled set of frequency domain resources 445. During the cancelled set of time domain resources 440 and the cancelled set of frequency domain resources 445, the base station 105 may not transmit the downlink transmission 415. The cancelled set of time domain resources 440 may overlap in the time domain with the CCA procedure 420, and the cancelled set of frequency domain resources 445 may overlap with the CCA procedure 420 in the frequency domain. In some cases, the base station 105 may cancel the downlink transmission 415 on RB sets 435 which overlap with the CCA procedure 420. For example, the base station 105 may transmit the downlink transmission 415 on RB set 435-*a* and RB set 435-*d* and cancel transmission on RB set 435-*b* and RB set 435-*c* during the canceled set of time domain resources 440.

The downlink transmission 415 may be partially cancelled, fully cancelled, or partially cancelled in one domain and fully cancelled in the other domain. For a partial cancellation, the UE 115 may assume that resources which impact the LBT operation are cancelled. For example, the UE 115 may determine that the downlink resources may be partially canceled according to when, during the CCA resources 405, energy may be detected. In some cases, the CCA resources 405 may be 16 microseconds long. Energy may be detected during time period for the CCA procedure 420, which may be greater than or equal to 4 microseconds (e.g., 5 microseconds). The CCA procedure 420 may overlap with a portion of the downlink transmission 415 corresponding to the cancelled set of time domain resources 440. Therefore, the base station 105 may cancel the downlink transmission on symbols corresponding to the cancelled set of time domain resources 440.

The CCA procedure 420 may correspond be performed over units of RB sets, so the UE 115 may assume partial downlink cancellation in RBs that overlap with the RB sets used for the CCA operation. For example, the CCA procedure may be performed over RB sets 435-*b* and 435-*c*, which may overlap with some of the RBs used to transmit the downlink transmission 415. Therefore, the base station may not send the downlink transmission 415 on the cancelled set of frequency domain resources 445, corresponding to the RB set 435-*b* and RB set 435-*c*, during the cancelled set of time domain resources 440.

For the partial cancellation, the base station 105 may transmit the downlink transmission 415 on resources which are not cancelled. For example, the base station 105 may transmit a first portion of the downlink transmission 415 on the set of downlink frequency resources until a first symbol of the canceled set of time domain resources 445. The base station 105 may then not transmit the downlink transmission 415 on resources corresponding to the cancelled set of time domain resources 440 and the cancelled set of frequency domain resources 445. In some cases, the base station 105 may still send the downlink transmission 415 on resources of the set of downlink frequency domain resources 430 and downlink time domain resources 425 that do not overlap with the LBT procedure in time and frequency. In some cases, after the CCA procedure, the UE 115 may begin full-duplex communications by both transmitting the uplink transmission 410 and receiving the downlink transmission 415. The UE 115 may receive the rest of the downlink transmission 415 on the set of downlink time domain resources 425 and the set of downlink frequency domain resources 430 after the cancelled resources.

In some cases, the UE 115 may determine that the full downlink signal is canceled. For example, the downlink resources across both the time domain and frequency domain may be canceled for the full downlink transmission. In some examples, the UE 115 may consider full cancellation of the downlink signal, where the downlink transmission 415 is not sent by the base station 105. In some cases, the base station 105 may fully cancel the downlink transmission 415 due to a high priority uplink transmission (e.g., an ultra-reliable low latency communication (URLLC) uplink transmission).

In some other cases, the UE 115 may determine that the resources for the downlink transmission 415 are canceled starting from the first symbol overlapping the CCA resources 405. In this case, the downlink resources in both the time domain and frequency domain starting with a first symbol of the CCA resources 405 may be canceled. The duration of the CCA resources, and in some cases a starting symbol of the CCA resources 405, may be determined by the type of LBT indicated for the uplink grant. In this case, the base station 105 may transmit a portion of the downlink transmission 415 as scheduled until the first symbol of the CCA resources 405, then the base station 105 may cancel the rest of the downlink transmission 415 on the set of downlink time domain resources 425 and the set of downlink frequency domain resources 430 starting from the first symbol of the CCA resources 405. As a result, when the UE 115 performs the CCA procedure 420, the UE 115 may not be receiving the downlink transmission 415, and the CCA procedure 420 may more accurately determine whether the channel is available. If the UE 115 determines that the channel is available based on the CCA procedure 420, the UE 115 may transmit the uplink transmission 410 as scheduled. In some cases, the UE 115 may still experience interference from other devices and attempt an LBT procedure again.

In some cases, the downlink resources overlapping with the CCA procedure 420 may be fully canceled in one domain and partially canceled in the other domain. For example, the time domain resources that overlap with the CCA resources 405 or the CCA procedure 420 may be fully canceled, and the overlapping frequency domain resources may be partially canceled. Alternatively, or additionally, the overlapping downlink frequency domain resources may be fully canceled, and the overlapping downlink time domain resources may be partially canceled.

For example, due to phase continuity issues, the base station 105 may fully cancel the downlink time domain resources 425 and partially cancel the downlink frequency domain resources 430. The downlink transmission 415 may be sent using the set of downlink time domain resources 425 and the downlink frequency domain resources 430 until a first symbol of the CCA resources 405. The base station 105 may cancel resources which overlap in the time domain with the CCA resources 405 for the rest of the downlink transmission 415. The base station 105 may still send the downlink transmission 415 on resources which do not overlap with the CCA resources 405 for the rest of the downlink transmission 415. For example, during and after the CCA resources 405, the base station 105 may transmit the downlink transmission 415 on RB sets 435-a and 435-b, but the base station 105 may cancel the downlink transmission 415 on RB sets 435-b and 435-c for the rest of the set of downlink time domain resources 425.

By implementing any one or more of these techniques, the UE 115 may perform a more reliable LBT procedure. Because the UE 115 does not receive the downlink transmission 415 during the CCA procedure 420, the UE 115 may more accurately determine whether a chancel is available. If the UE determines the channel is clear, the UE may transmit the uplink transmission 410, as previously scheduled, according to full-duplex communications techniques.

The UE 115 may determine whether the overlapping downlink resources are canceled based on an explicit or implicit indication. In some cases, the UE 115 may implicitly determine the full or partial cancellation of a downlink transmission during an LBT procedure based on receiving control signaling (e.g. an uplink grant), the resources used for the LBT procedure, or both. For example, the base station may configure the UE 115 with a set of configurations for full or partial cancellation of a downlink signal. For example, when the UE 115 determines that resources for the downlink transmission 415 overlaps with resources for the CCA procedure 420 for the uplink transmission 410 as indicated in an uplink grant, the UE 115 may determine that resources for the downlink transmission 415 are partially cancelled, fully canceled, or partially canceled in one domain and fully canceled in the other. The configurations may be indicated to the UE 115 by RRC signaling. In some other examples, the configurations may be indicated or updated via a MAC-CE or DCI. When the UE 115 determines that resources for a CCA procedure 420 for the uplink transmission 410 overlap with resources scheduled to receive the downlink transmission 415, the UE 115 may determine which resources are canceled based on the previously received configuration.

Additionally, or alternatively, the UE 115 may receive an explicit cancellation indication from the base station 105. In some examples, the explicit cancellation indication may include some aspects of a downlink preemption indication. In some examples, the explicit indication may indicate which time resources or frequency resources, or both, are canceled for the downlink transmission 415. For example, the explicit indication may include a bitmap, frequency domain indicators, time domain indicators, or any combination thereof, to indicate the canceled resources. In some cases, the cancellation indication may include parameters to select from or further specify parameters of one or more semi-static configurations (e.g., RRC configured parameters).

In some cases, the base station may cancel downlink resources based on LBT resources of a group of UEs 115. For example, the UEs 115 may be grouped based on whether the LBT operations of the UEs 115 are affected by the transmission on a downlink beam used for the downlink transmission 415. For example, if a second, neighboring UE 115 has a CCA window near the CCA resources 405 of a first UE 115, the base station 105 may cancel downlink resources based on both LBT resources of the two UEs 115. If a beam is not directed towards a UE 115, the base station 105 may skip rate matching a downlink resource around this UE's LBT resources. In some examples, other downlink resources may be canceled, outside of the downlink resources that overlap with the LBT resources for a single UE 115. Considering the LBT resources for a group of UEs 115 may prevent interference to the group of UEs 115. In some cases, the base station 105 may indicate, via an explicit cancellation indication, any other downlink resources that may be canceled to avoid interfering with CCA window of a UE 115 in a group of UEs 115.

Figure 5A:
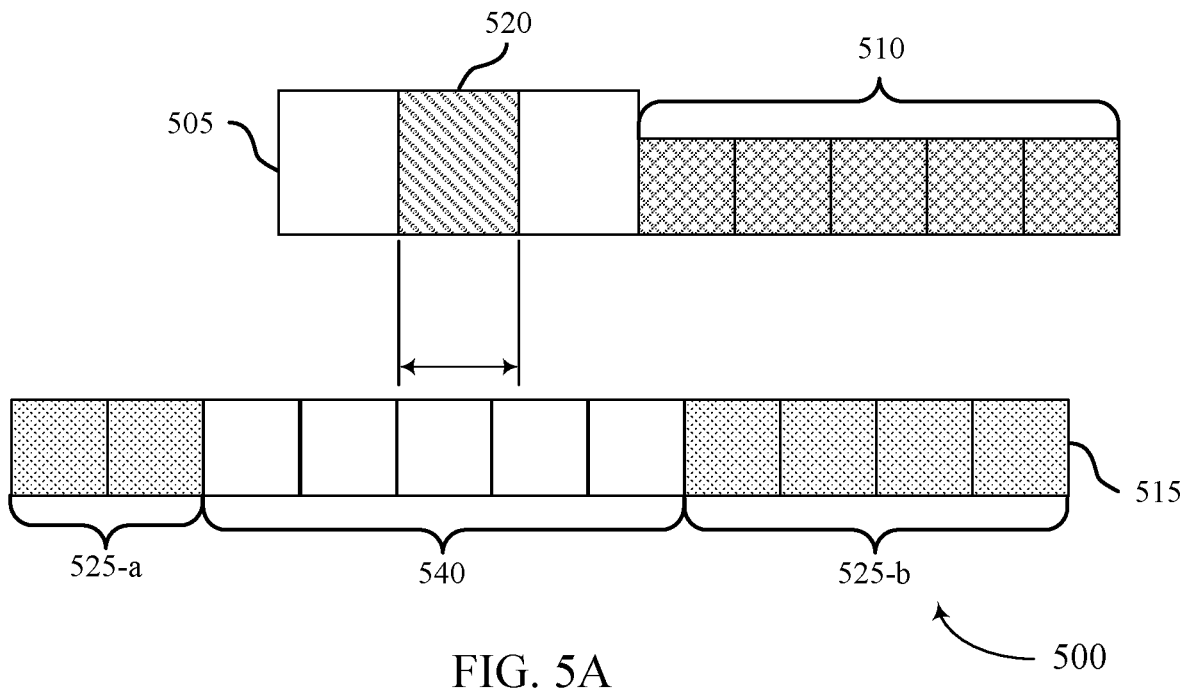
FIGS. 5A and 5B illustrate an example of a time domain resource configuration and a frequency domain resource configuration in accordance with aspects of the present disclosure.
Figure 5B:
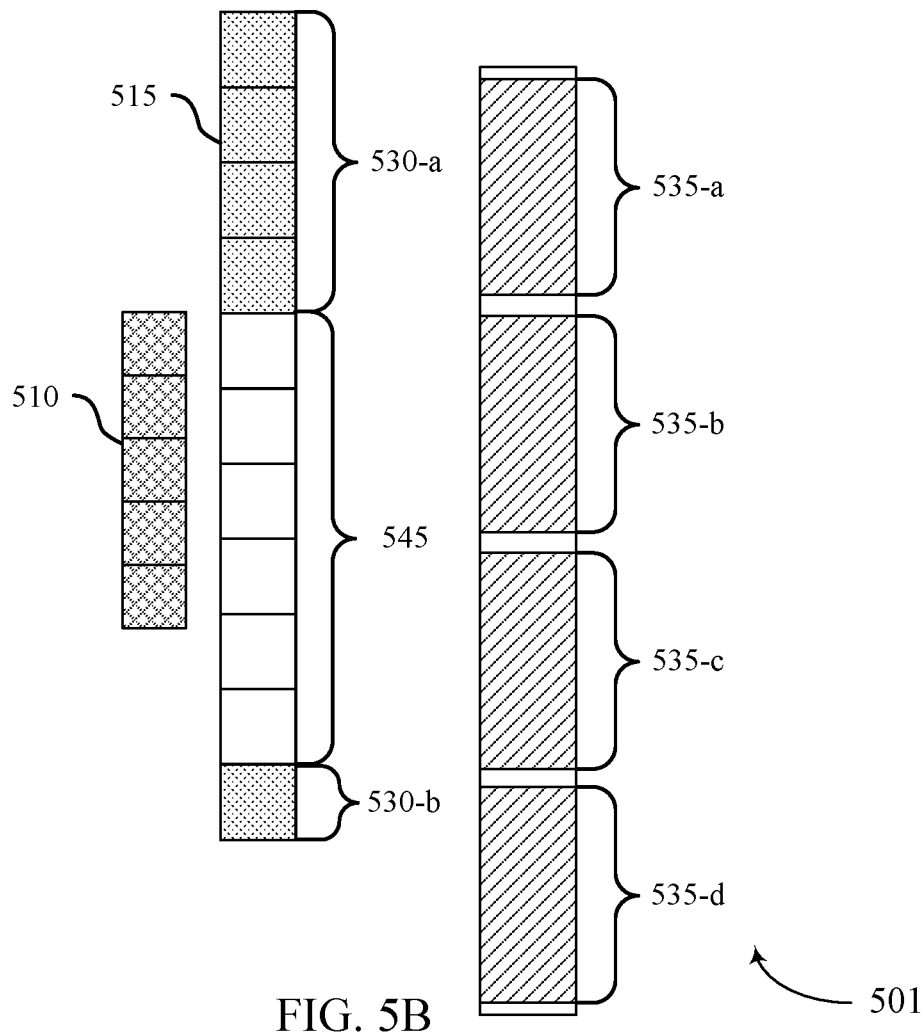

FIGS. 5A and 5B illustrate an example of a time domain resource configuration 500 and a frequency domain resource configuration 501 that supports rate matching during an LBT procedure for full-duplex communications in accordance with aspects of the present disclosure. The time domain resource configuration 500 and frequency domain resource configuration 501 may implement aspects of the wireless communications systems 100 or may be implemented by aspects of the wireless communications system 100 as described with reference to FIG. 1.

The time domain resource configuration 500 and frequency domain resource configuration 501 may illustrate resource allocations for full-duplex wireless communications between a base station 105 and a UE 115, which may be examples of corresponding devices as described herein. The time domain resource configuration 500 and frequency domain resource configuration 501 may be an example of a resource configuration configured by a base station 105 according to a rate matching technique during an LBT procedure for full-duplex communications.

A UE 115 may be capable of full-duplex communication and may be able to receive a downlink transmission and transmit an uplink transmission over a communication link over the same time and frequency resources. In some examples, the UE 115 may be capable of IBFD or SBFD, or both. The UE 115 may operate in a shared radio frequency spectrum band (e.g., an unlicensed frequency spectrum band) that shares a spectrum with other radio access technologies (e.g., an NR-U system, a Wi-Fi system) or between wireless communication systems, or both.

In some cases, the UE 115 may receive a control message (e.g., DCI), scheduling a downlink transmission 515. The UE 115 may receive a second control message including an uplink grant scheduling an uplink transmission 510. The UE 115 may perform a CCA procedure 520, such as an LBT procedure, before transmitting the uplink transmission 510. The scheduled downlink transmission 515 may at least partially overlap with CCA resources 505 or a CCA procedure 520 performed in the CCA resources 505. To prevent the energy from the downlink transmission 515 from affecting the CCA procedure 520, the UE 115 and base station 105 may implement techniques to rate match the downlink transmission 515 around resources that overlap with the CCA resources 505 or the CCA procedure 520.

For example, the base station 105 may rate match resources for the downlink transmission around the CCA resources 505, which may in some cases be referred to as a CCA window. For example, a portion of time domain resources may overlap with the CCA resources 505, and the base station 105 may configure time domain rate matching resources 540 during the overlapping time domain resources. In the frequency domain, the RB sets 535-b and 535-c may have been scheduled for the downlink transmission 515 and may overlap with the CCA resources 505. The base station 105 may configure a frequency domain rate matching resources 545 during the overlapping frequency resources. In this example, the downlink transmission 515 may be transmitted using during time domain downlink resources 525-a and 525-b using all the frequency domain downlink resources 530. During time domain rate matching resources 540, the downlink transmission 515 may be transmitted using frequency domain downlink resources 530-a and 530-b. Therefore, the base station 105 may not transmit on the frequency domain rate matching resources 545 during the time domain rate matching resources 540.

In some other examples, the resources for the downlink transmission 515 may be rate matched to a portion of the time domain downlink resources 525 or the frequency domain downlink resources 530, or both. For example, the downlink transmission 515 may transmitted using only time domain resources prior to the CCA resources 505, such as the time domain downlink resources 525-a. In another example, the resources for the downlink transmission 515 may be rate matched to a portion of the frequency domain downlink resources 530. For example, the downlink transmission 515 may be transmitted using RB sets 535 corresponding to frequency domain downlink resources 530-a or frequency domain downlink resources 530-b, or both, even during the time domain downlink resources 525-a or the time domain downlink resources 525-b.

The UE 115 may perform a CCA procedure 520 during the CCA resources 505. Since resources for the downlink transmission 515 are rate matched around CCA window 505, the LBT procedure may not be affected by the downlink transmission 515 and may more accurately determine whether the channel is available. If the CCA procedure 520 is successful, the UE 115 may determine the channel is available and transmit the uplink transmission 510 as scheduled. In some cases, the base station 105 may also transmit the rest of downlink transmission 515 over time domain downlink resources 525-b and frequency domain downlink resources 530-b, resulting in full-duplex communications.

The rate matching resources may be signaled to the UE 115. For example, the base station 105 may transmit control signaling indicating a configuration for the rate matching resources to the UE 115. For example, the rate matching resource configuration may be transmitted using control signaling such as RRC signaling. The base station 105 may use RRC configuration parameters (e.g., a ratematchingresources parameter) to indicate the rate matching resources to the UE 115. Semi-statically indicating the rate matching resource configuration may be advantageous for frame-based equipment (FBE) UEs 115 or FBE-based LBT procedures. For example, FBE-based LBT procedures may be periodic, so the base station 105 may configure rate matching resources around the periodic LBT resources.

In some cases, the base station 105 may dynamically indicate the rate matching resources to the UE 115. For example, the rate matching resources may be indicated to the UE 115 in DCI carrying the uplink grant to schedule the uplink transmission 510. This may provide some flexibility, since the rate matching resources may be configured according to LBT resources that occur based on the uplink grant.

In some cases, the time and frequency of the rate matching resources may be indicated in terms of a bitmap, a start and length indicator value (SLIV), an index to a pre-configured table, or a combination thereof. In some other examples, the rate matching resources may be indicated in separate control information (e.g., DCI), as opposed to the DCI scheduling the downlink transmission or the DCI scheduling the uplink transmission. The separate control information, such as group common DCI (GC-DCI), may indicate the rate matching resources for an LBT procedure. Dynamically indicating the rate matching resources may be advantageous for LBE-based LBT since the LBT resources may be based on the LBT type indicated in the uplink grant.

In some cases, the base station may configure rate matching resources based on LBT resources of a group of UEs 115. For example, the UEs 115 may be grouped based on whether the LBT operations of the UEs 115 are affected by the transmission on a downlink beam used for the downlink transmission 515. For example, if a second, neighboring UE 115 has CCA resources, or a CCA window, near the CCA resources 505 of a first UE 115, the base station 105 may configure rate matching resources based on both LBT resources of the two UEs 115. Considering the LBT resources for a group of UEs 115 may prevent interference to the group of UEs 115. In some other examples, the rate matching resources may be configured based on the UE 115 receiving the downlink transmission 515. This may prioritize the LBT operation of the UE 115 receiving the downlink transmission 515 with the pending uplink transmission 510 over the other UEs 115 that fall within the same downlink beam.

By implementing these techniques, the UE 115 determines the rate matching resources and receives the downlink transmission on resources around the rate matching resources. The UE 115 may calculate a transport block (TB) size for the downlink transmission 515 using by incorporating the rate matching resources into a set of resources that are not used for transmission. The UE 115 may properly receive and decode the downlink transmission according to the calculated TB size.

Figure 6:
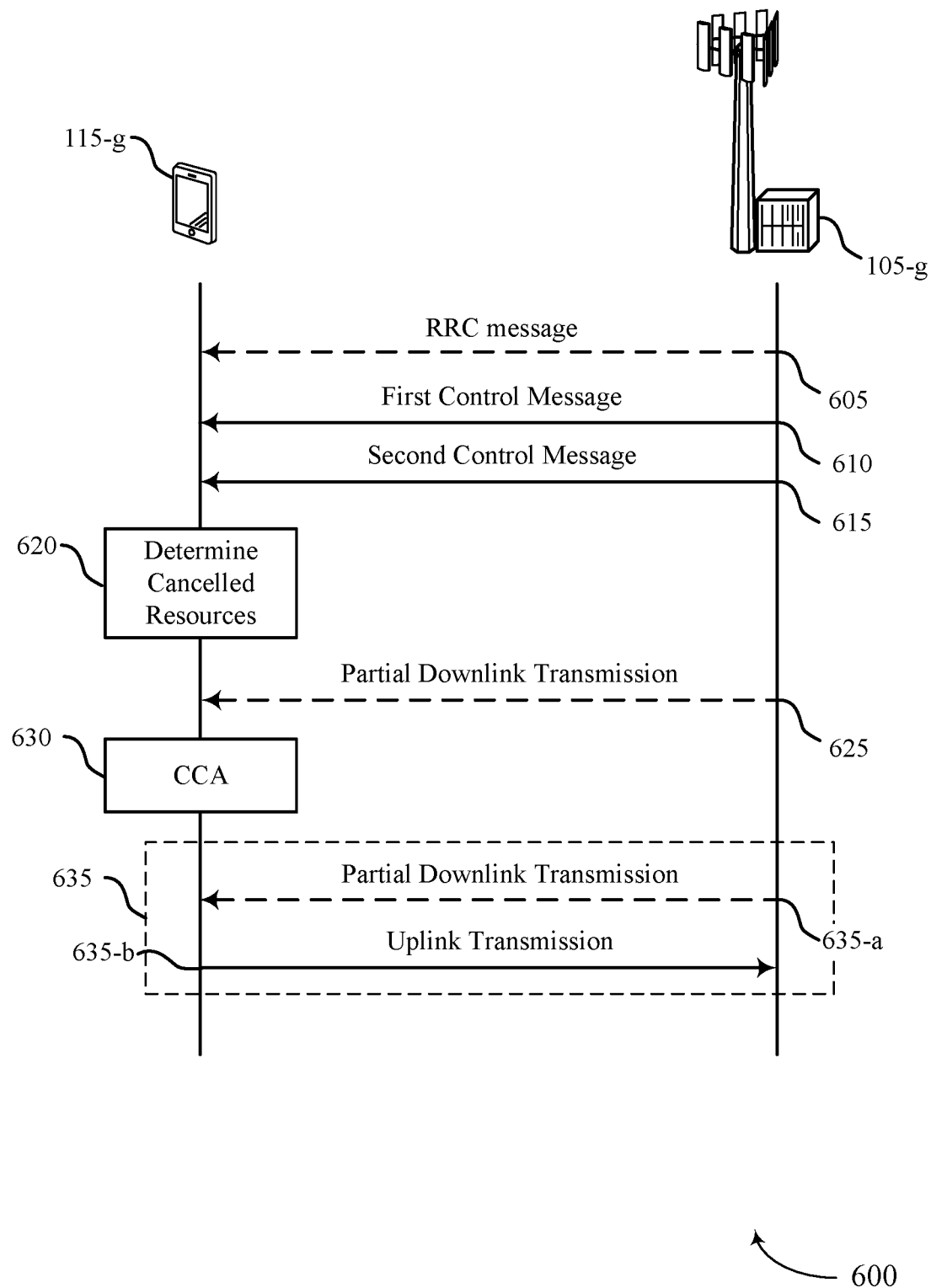
FIG. 6 illustrates an example of a process flow in accordance with aspects of the present disclosure.

FIG. 6 illustrates an example of a process flow 600 that supports listen-before-talk techniques for full-duplex communications in accordance with aspects of the present disclosure. The process flow 600 may implement aspects of the wireless communications systems 100 or may be implemented by aspects of the wireless communications system 100 as described with reference to FIG. 1. The process flow 600 may be implemented by base station 105-g and UE 115-g, which may be respective examples of a base station 105 and a UE 115 as described with reference to FIG. 1. In the following description of the process flow 600, the operations between the base station 105-g and the UE 115-g may be transmitted in a different order than the example order shown, or the operations performed by the base station 105-g and the UE 115-g may be performed in different orders or at different times.

Some operations may also be omitted from the process flow 600, and other operations may be added to the process flow 600.

The process flow 600 may illustrate an example of a downlink cancellation technique to provide a more reliable LBT procedure for a full-duplex device, such as the UE 115-g. In some cases, at 605, the UE 115-g may receive an RRC message indicating one or more downlink transmission cancellation configurations from the base station 105-g. The downlink transmission cancellation configurations may be semi-static configurations indicating how at least a portion of a downlink transmission which overlaps with an LBT procedure may be canceled. In some cases, the downlink transmission cancellation configurations may indicate the full downlink transmission may be canceled, a portion of a downlink transmission may be canceled (e.g., partial cancellation), or a combination thereof. Additionally, or alternatively, the downlink transmission cancellation configurations may indicate time domain resources that may be canceled, frequency domain resources that may be canceled, or both as described in further detail with reference to FIGS. 4A and 4B.

At 610, the UE 115-*g* may receive, from the base station 105-*g*, a first control message scheduling a downlink transmission to the UE 115-*g* in a shared radio frequency spectrum band. In some cases, the first control message may be transmitted via DCI.

At 615, the UE 115-*g* may receive a second control message from the base station 105-*g* scheduling an uplink transmission in the shared radio frequency spectrum band. For example, the second control message may be an uplink grant scheduling the uplink transmission. In some cases, the second message may indicate a CCA type (e.g., an LBT type) to be used prior to transmitting the uplink transmission. The second control message may indicate that at least a portion of the downlink transmission scheduled for transmission during a CCA associated with the uplink transmission is canceled. For example, the UE 115-*g* may determine CCA resources based on a CCA type for the CCA and determine that at least a portion of the downlink transmission overlapping with the CCA resources may be canceled.

In some examples, the second control message may implicitly indicate a configuration from the set of downlink transmission cancellation configurations configured by the RRC message. For example, the second control message may implicitly indicate the canceled resources based on the uplink grant, CCA resources corresponding to the CCA prior to the uplink transmission, or both. In other examples, the second control message may explicitly indicate a configuration from the set of downlink transmission cancellation configurations. For example, the second control message may include an explicit resource indication for the canceled resources.

At 620, the UE 115-*g* may determine at least a portion of the downlink transmission is canceled based on the second control message received from the base station 105-*g*. In some cases, the UE 115-*g* may determine that the downlink transmission may be partially canceled on time resources overlapping the CCA resources, partially canceled on frequency resources overlapping the CCA resources, or both, based on the second control message. In other cases, the UE 115-*g* may determine the downlink transmission may be fully canceled. For example, the downlink transmission may not be transmitted or may be cancelled starting from when the UE 115-*g* receives the second control signaling. In other examples, the downlink transmission may be canceled starting from a first symbol overlapping the CCA resources. In some cases, the downlink transmission may be partially canceled over one domain and fully canceled over the other domain. For example, the second control message may indicate that time resources overlapping with the CCA may be partially canceled and the frequency resources may be fully canceled, or vice versa.

In some cases, at 625, the base station 105-*g* may transmit at least a portion of the downlink transmission to UE 115-*g*. For example, the base station 105-*g* may transmit at least a portion of the downlink transmission that may begin before the CCA procedure is performed.

At 630, the UE 115-*g* may perform, in the shared radio frequency spectrum band, a CCA procedure within the CCA resources. For example, the UE 115-*g* may perform LBT procedure based on a type of LBT procedure, which may be indicated in the second control message. The base station 105-*g* may cancel at least a portion of the downlink transmission overlapping the CCA procedure or CCA resources. The UE 115-*g* may determine whether the channel is available to transmit the scheduled uplink transmission based on a result of the CCA procedure. Since the base station 105-*g* canceled at least a portion of the downlink transmission overlapping the CCA resources, the result of the CCA procedure may be more reliable. In some cases, the UE 115-*g* may determine the channel is available for uplink transmission.

At 635, the UE 115-*g* may transmit, in the shared radio frequency spectrum band, the uplink transmission based on the CCA procedure. In some cases, the UE 115-*g* may begin full-duplex communications with the base station 105-*g* at 635 by transmitting the uplink transmission and receiving the downlink transmission simultaneously. For example, in some cases, the base station 105-*g* may transmit the rest of the downlink transmission at 635-*a*. The UE 115-*g* may transmit the scheduled uplink transmission to the base station 105-*g* at 635-*b* if the CCA procedure determined the channel is available. In some cases, the UE 115-*g* may transmit the uplink transmission at 635-*a* concurrent to receiving the downlink transmission at 635-*b*.

Figure 7:
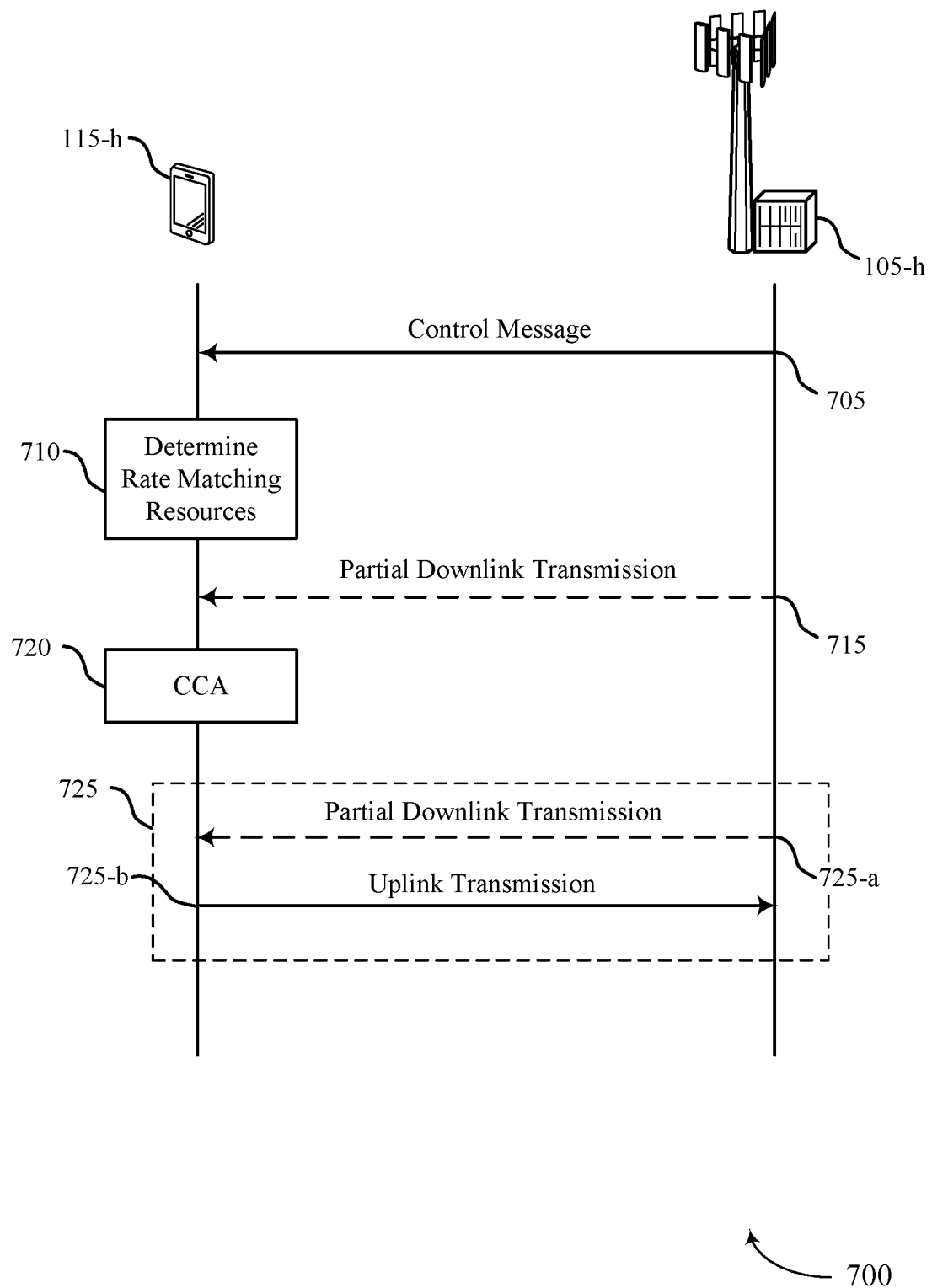
FIG. 7 illustrates an example of a process flow that supports LBT techniques for full-duplex communications in accordance with aspects of the present disclosure.

FIG. 7 illustrates an example of a process flow 700 that supports listen-before-talk techniques for full-duplex communications in accordance with aspects of the present disclosure. The process flow 700 may implement aspects of the wireless communications systems 100 or may be implemented by aspects of the wireless communications system 100 as described with reference to FIG. 1. The process flow 700 may be implemented by base station 105-*h* and the UE 115-*h*, which may be respective examples of a base station 105 and a UE 115 as described with reference to FIG. 1. In the following description of the process flow 700, the signaling between the base station 105-*h* and the UE 115-*h* may be transmitted in a different order than the example order shown, or the operations performed by the base station 105-*h* and the UE 115-*h* may be performed in different orders or at different times. Some operations may also be omitted from the process flow 700, and other operations may be added to the process flow 700.

The process flow 700 may illustrate an example of a downlink rate matching technique to provide a more reliable LBT procedure for a full-duplex device, such as the UE 115-*h*. At 705, the UE 115-*h* may receive a control message indicating a rate matching resource corresponding to CCA resources for a shared radio frequency spectrum band. The control message may be RRC signaling, DCI, or any other type of control message. In some cases, such as if the control message is sent via RRC signaling, the control message may semi-statically configure a set of multiple CCA resources. In some cases, the set of multiple CCA resources may be associated with a set of multiple UEs (e.g., a group of spatially proximate UEs, not shown), where the set of multiple UEs 115 may be impacted by a downlink beam used by the base station 105-*h* when performing CCA procedures. In some cases, the control signaling may be DCI including an uplink grant scheduling an uplink transmission. In some cases, the control message may be a GC-DCI.

The control message may indicate rate matching resources to the UE 115-g. For example, the control message may indicate a time domain resource allocation for the rate matching resources, a frequency domain resource allocation for rate matching resources, or both. The control message may indicate the rate matching resources based on an SLIV, an index to table of rate matching resource configurations stored at the UE 115-g, or both. In some examples, the table of rate matching resource configurations may be configured at the UE 115-g via RRC signaling.

At 710, the UE 115-h may determine the rate matching resources based on the received control message. In some cases, the UE 115-h may determine a TB size for the downlink transmission based on a set of resources for the downlink transmission that excludes the rate matching resources.

The base station 105-h may transmit the downlink transmission to the UE 115-h over time and frequency resources which are rate matched around the CCA resources. Some of these techniques are described in further detail with reference to FIGS. 5A and 5B. For example, in some cases, the base station 105-h may transmit at least a portion of the downlink transmission to the UE 115-h at 715. For example, a portion of the downlink transmission may be sent prior to the CCA resources.

At 720, the UE 115-h may perform a CCA procedure within the CCA resources. In some cases, the CCA procedure may be based on a type of CCA procedure indicated in the uplink grant. Since the downlink transmission may be rate matched such that the downlink transmission is not sent on resources that overlap with the CCA resources, the CCA procedure may more reliably determine whether the channel is available. The UE 115-h may determine the channel is available for transmission based on the CCA procedure.

At 725, the UE 115-h may begin full-duplex communications with the base station 105-h. For example, the UE 115-h may receive, in the shared radio frequency spectrum band, the downlink transmission that is rate matched around the rate matching resource concurrent with transmitting, in the shared radio frequency spectrum band, the uplink transmission based on the CCA procedure. For example, in some cases, the base station 105-h may transmit the rest of the downlink transmission at 725-a. The UE 115-h may transmit the scheduled uplink transmission at 725-b.

Figure 8:
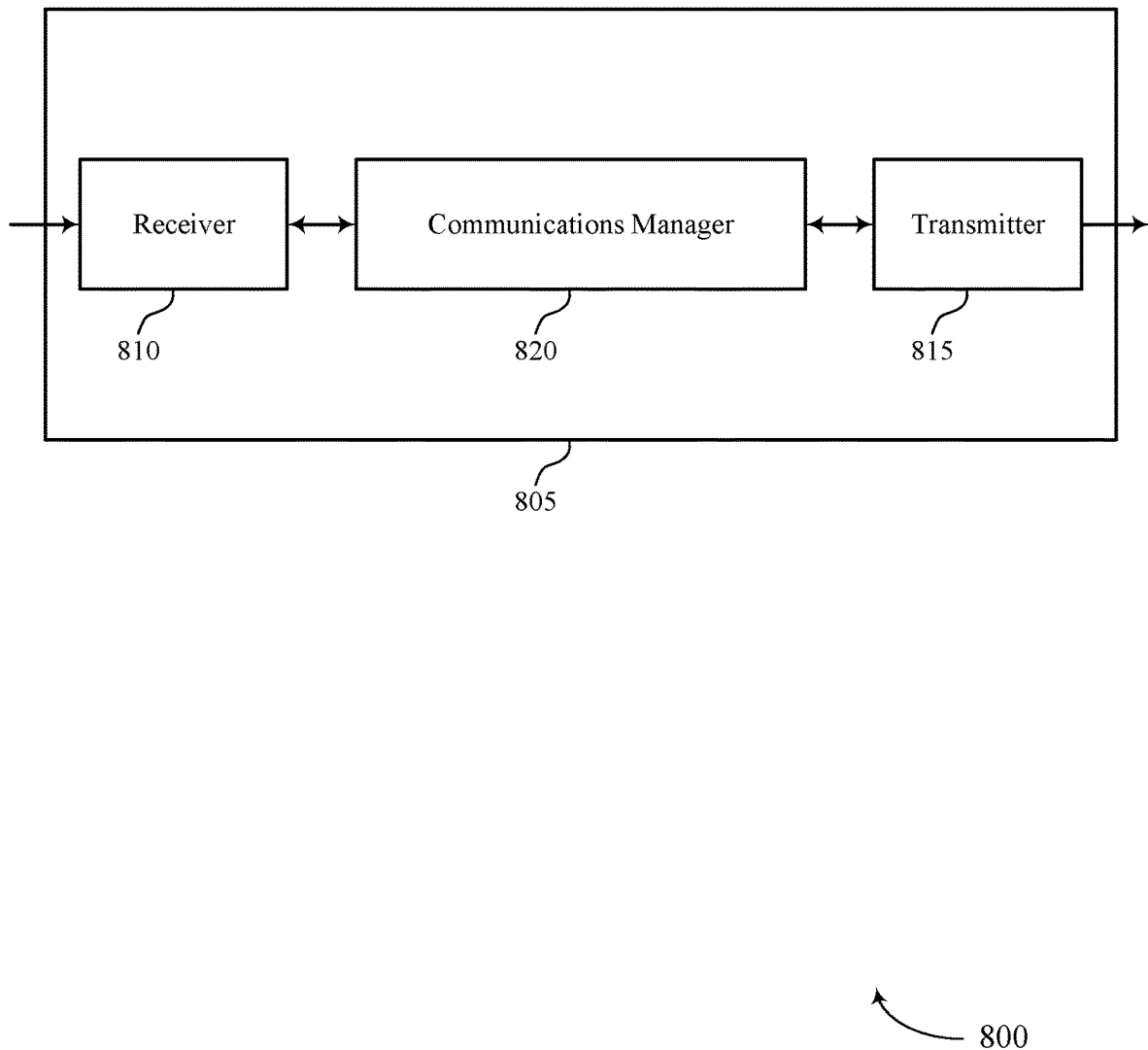
FIGS. 8 and 9 show block diagrams of devices in accordance with aspects of the present disclosure.

FIG. 8 shows a block diagram 800 of a device 805 that supports LBT techniques for full-duplex communications in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to LBT techniques for full-duplex communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to LBT techniques for full-duplex communications). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of LBT techniques for full-duplex communications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for receiving, from a base station, a first control message scheduling a downlink transmission to the UE in a shared radio frequency spectrum band. The communications manager 820 may be configured as or otherwise support a means for receiving a second control message from the base station scheduling an uplink transmission in the shared radio frequency spectrum band, the second control message indicating that at least a portion of the downlink transmission scheduled for transmission during CCA resources associated with the uplink transmission is canceled. The communications manager 820 may be configured as or otherwise support a means for performing, in the shared radio frequency spectrum band, a CCA procedure within the CCA resources. The communications manager 820 may be configured as or otherwise support a means for transmitting, in the shared radio frequency spectrum band, the uplink transmission based on the CCA procedure.

Additionally or alternatively, the communications manager 820 may support wireless communications at a UE in accordance with examples as disclosed herein. For example, the communications manager 820 may be configured as or otherwise support a means for receiving a control message indicating a rate matching resource corresponding to CCA resources for a shared radio frequency spectrum band. The communications manager 820 may be configured as or otherwise support a means for performing a CCA procedure within the CCA resources. The communications manager 820 may be configured as or otherwise support a means for receiving, in the shared radio frequency spectrum band, a downlink transmission that is rate matched around the rate matching resource concurrent with transmitting, in the shared radio frequency spectrum band, an uplink transmission based on the CCA procedure.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for more efficient utilization of communication resources.

Figure 9:
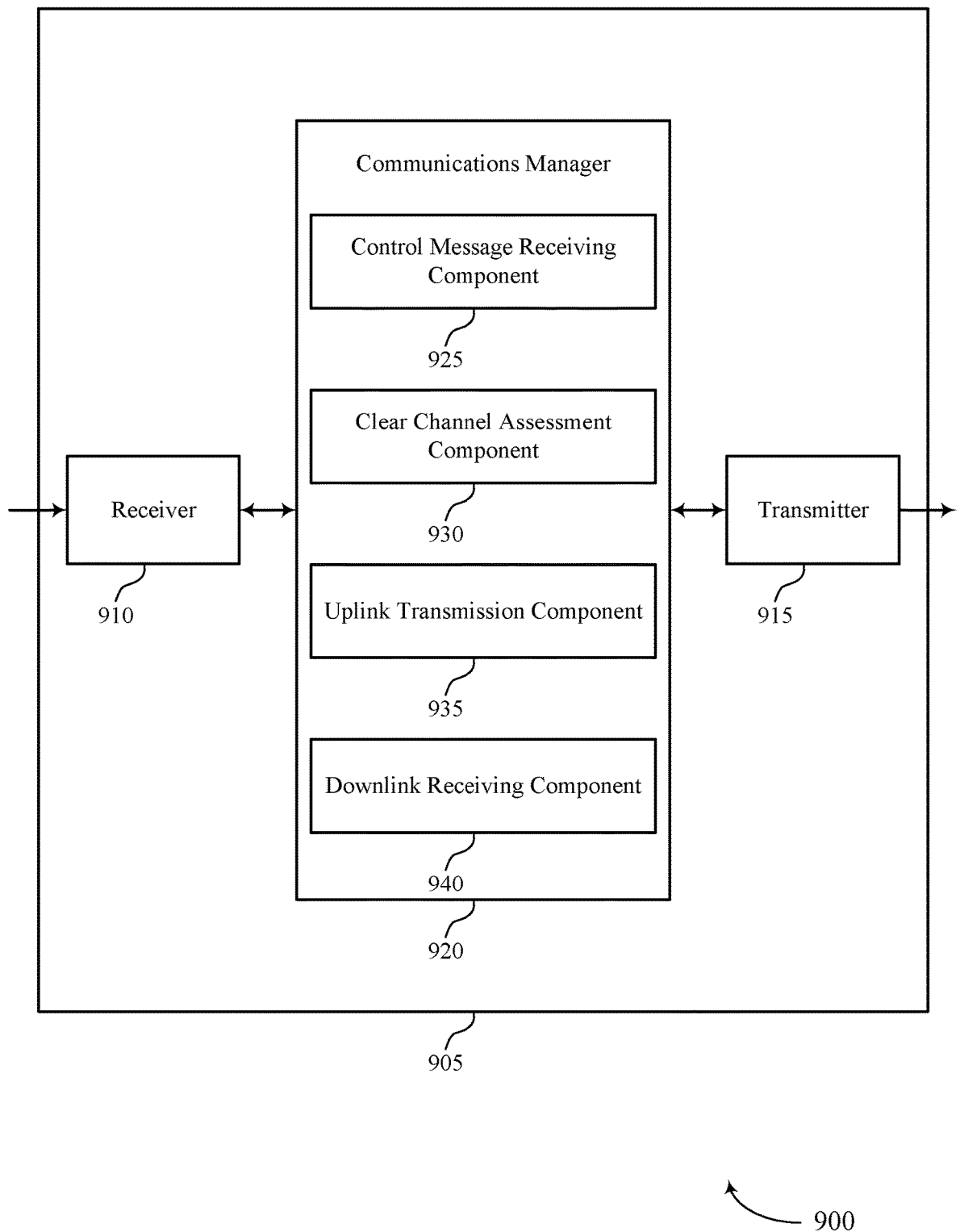

FIG. 9 shows a block diagram 900 of a device 905 that supports LBT techniques for full-duplex communications in accordance with aspects of the present disclosure. The device 905 may be an example of aspects of a device 805 or a UE 115 as described herein.

The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to LBT techniques for full-duplex communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to LBT techniques for full-duplex communications). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of LBT techniques for full-duplex communications as described herein. For example, the communications manager 920 may include a control message receiving component 925, a CCA component 930, an uplink transmission component 935, a downlink receiving component 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The control message receiving component 925 may be configured as or otherwise support a means for receiving, from a base station, a first control message scheduling a downlink transmission to the UE in a shared radio frequency spectrum band. The control message receiving component 925 may be configured as or otherwise support a means for receiving a second control message from the base station scheduling an uplink transmission in the shared radio frequency spectrum band, the second control message indicating that at least a portion of the downlink transmission scheduled for transmission during CCA resources associated with the uplink transmission is canceled. The CCA component 930 may be configured as or otherwise support a means for performing, in the shared radio frequency spectrum band, a CCA procedure within the CCA resources. The uplink transmission component 935 may be configured as or otherwise support a means for transmitting, in the shared radio frequency spectrum band, the uplink transmission based on the CCA procedure.

Additionally or alternatively, the communications manager 920 may support wireless communications at a UE in accordance with examples as disclosed herein. The control message receiving component 925 may be configured as or otherwise support a means for receiving a control message indicating a rate matching resource corresponding to CCA resources for a shared radio frequency spectrum band. The CCA component 930 may be configured as or otherwise support a means for performing a CCA procedure within the CCA resources. The downlink receiving component 940 may be configured as or otherwise support a means for receiving, in the shared radio frequency spectrum band, a downlink transmission that is rate matched around the rate matching resource concurrent with transmitting, in the shared radio frequency spectrum band, an uplink transmission based on the CCA procedure.

Figure 10:
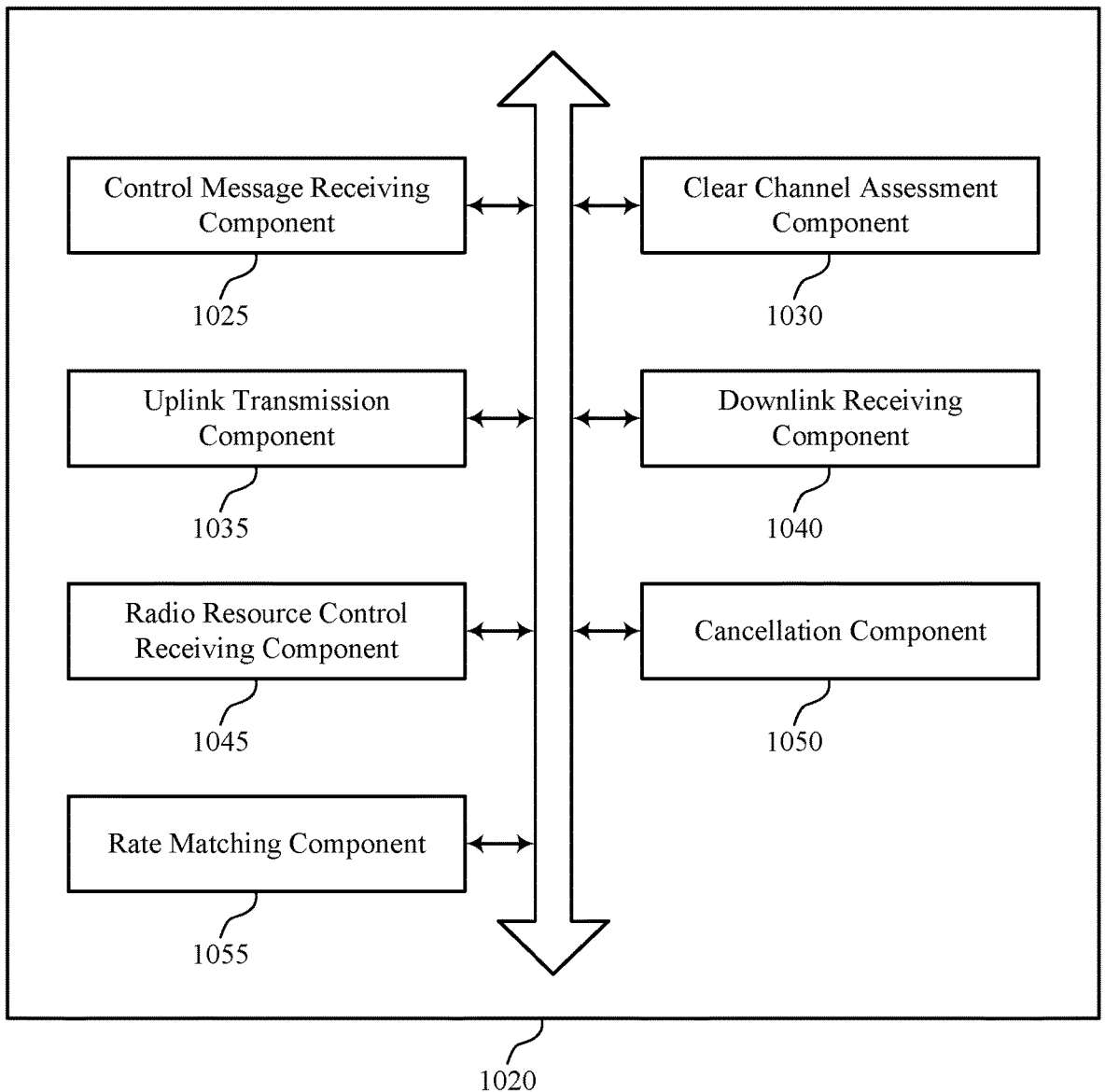
FIG. 10 shows a block diagram of a communications manager in accordance with aspects of the present disclosure.

FIG. 10 shows a block diagram 1000 of a communications manager 1020 that supports LBT techniques for full-duplex communications in accordance with aspects of the present disclosure. The communications manager 1020 may be an example of aspects of a communications manager 820, a communications manager 920, or both, as described herein. The communications manager 1020, or various components thereof, may be an example of means for performing various aspects of LBT techniques for full-duplex communications as described herein. For example, the communications manager 1020 may include a control message receiving component 1025, a CCA component 1030, an uplink transmission component 1035, a downlink receiving component 1040, an RRC receiving component 1045, a cancellation component 1050, a rate matching component 1055, or any combination thereof. Each of these components may communicate, directly or indirectly, with one another (e.g., via one or more buses).

The communications manager 1020 may support wireless communications at a UE in accordance with examples as disclosed herein. The control message receiving component 1025 may be configured as or otherwise support a means for receiving, from a base station, a first control message scheduling a downlink transmission to the UE in a shared radio frequency spectrum band. In some examples, the control message receiving component 1025 may be configured as or otherwise support a means for receiving a second control message from the base station scheduling an uplink transmission in the shared radio frequency spectrum band, the second control message indicating that at least a portion of the downlink transmission scheduled for transmission during CCA resources associated with the uplink transmission is canceled. The CCA component 1030 may be configured as or otherwise support a means for performing, in the shared radio frequency spectrum band, a CCA procedure within the CCA resources. The uplink transmission component 1035 may be configured as or otherwise support a means for transmitting, in the shared radio frequency spectrum band, the uplink transmission based on the CCA procedure.

In some examples, the RRC receiving component 1045 may be configured as or otherwise support a means for receiving an RRC message indicating one or more downlink transmission cancellation configurations, where the second control message implicitly indicates a first configuration from the one or more downlink transmission cancellation configurations that indicates the at least the portion of the downlink transmission that is canceled.

In some examples, the RRC receiving component 1045 may be configured as or otherwise support a means for receiving an RRC message including one or more downlink transmission cancellation configurations. In some examples, the cancellation component 1050 may be configured as or otherwise support a means for receiving the second control message indicating a first configuration from the one or more downlink transmission cancellation configurations that indicates the at least the portion of the downlink transmission that is canceled.

In some examples, to support receiving the second control message, the cancellation component 1050 may be configured as or otherwise support a means for receiving the second control message that indicates a type of the CCA procedure, where the downlink transmission is canceled during at least a portion of the CCA resources based on the indicated type of the CCA procedure.

In some examples, to support receiving the second control message, the cancellation component 1050 may be configured as or otherwise support a means for receiving the second control message indicating that the downlink transmission is at least partially canceled on time resources overlapping with the CCA resources, partially canceled in frequency resources overlapping with the CCA resources, or both.

In some examples, to support receiving the second control message, the cancellation component 1050 may be configured as or otherwise support a means for receiving the second control message indicating that the downlink transmission is fully canceled starting from a first symbol overlapping the CCA resources or fully canceled.

In some examples, the downlink receiving component 1040 may be configured as or otherwise support a means for receiving a remaining portion of the downlink transmission in the shared radio frequency spectrum band concurrent to transmitting at least a portion of the uplink transmission.

In some examples, the portion of the downlink transmission overlaps a set of multiple CCA resources for a group of spatially proximate UEs. In some examples, the portion of the downlink transmission is canceled based on overlapping the set of multiple CCA resources.

Additionally or alternatively, the communications manager 1020 may support wireless communications at a UE in accordance with examples as disclosed herein. In some examples, the control message receiving component 1025 may be configured as or otherwise support a means for receiving a control message indicating a rate matching resource corresponding to CCA resources for a shared radio frequency spectrum band. In some examples, the CCA component 1030 may be configured as or otherwise support a means for performing a CCA procedure within the CCA resources. The downlink receiving component 1040 may be configured as or otherwise support a means for receiving, in the shared radio frequency spectrum band, a downlink transmission that is rate matched around the rate matching resource concurrent with transmitting, in the shared radio frequency spectrum band, an uplink transmission based on the CCA procedure.

In some examples, to support receiving the control message, the rate matching component 1055 may be configured as or otherwise support a means for receiving the control message indicating the rate matching resource via RRC signaling.

In some examples, to support receiving the control message, the CCA component 1030 may be configured as or otherwise support a means for receiving the control message via the RRC that semi-statically configures a set of multiple CCA resources including the CCA resources, where the downlink transmission that is rate matched around the rate matching resource that corresponds to the set of multiple CCA resources.

In some examples, to support receiving the control message, the control message receiving component 1025 may be configured as or otherwise support a means for receiving the control message indicating the rate matching resource via downlink control information.

In some examples, to support receiving the control message, the control message receiving component 1025 may be configured as or otherwise support a means for receiving the control message via the downlink control information that indicates an uplink grant for the uplink transmission.

In some examples, to support receiving the control message, the rate matching component 1055 may be configured as or otherwise support a means for receiving the control message indicating a time domain resource allocation indication for the rate matching resource, a frequency domain resource allocation indication for the rate matching resource, or both.

In some examples, to support receiving the control message, the rate matching component 1055 may be configured as or otherwise support a means for receiving the control message indicating a start and length indicator value for the rate matching resource, an index to a table of rate matching resource configurations, or both.

In some examples, to support receiving the control message, the control message receiving component 1025 may be configured as or otherwise support a means for receiving the control message via the downlink control information that is a group common downlink control information.

In some examples, to support receiving the control message, the rate matching component 1055 may be configured as or otherwise support a means for receiving the control message indicating the rate matching resource that corresponds to a set of multiple CCA resources for a group of spatially proximate UEs.

In some examples, the downlink receiving component 1040 may be configured as or otherwise support a means for receiving the downlink transmission having a transport block size that is calculated based on a set of resources for the downlink transmission excluding the rate matching resource.

Figure 11:
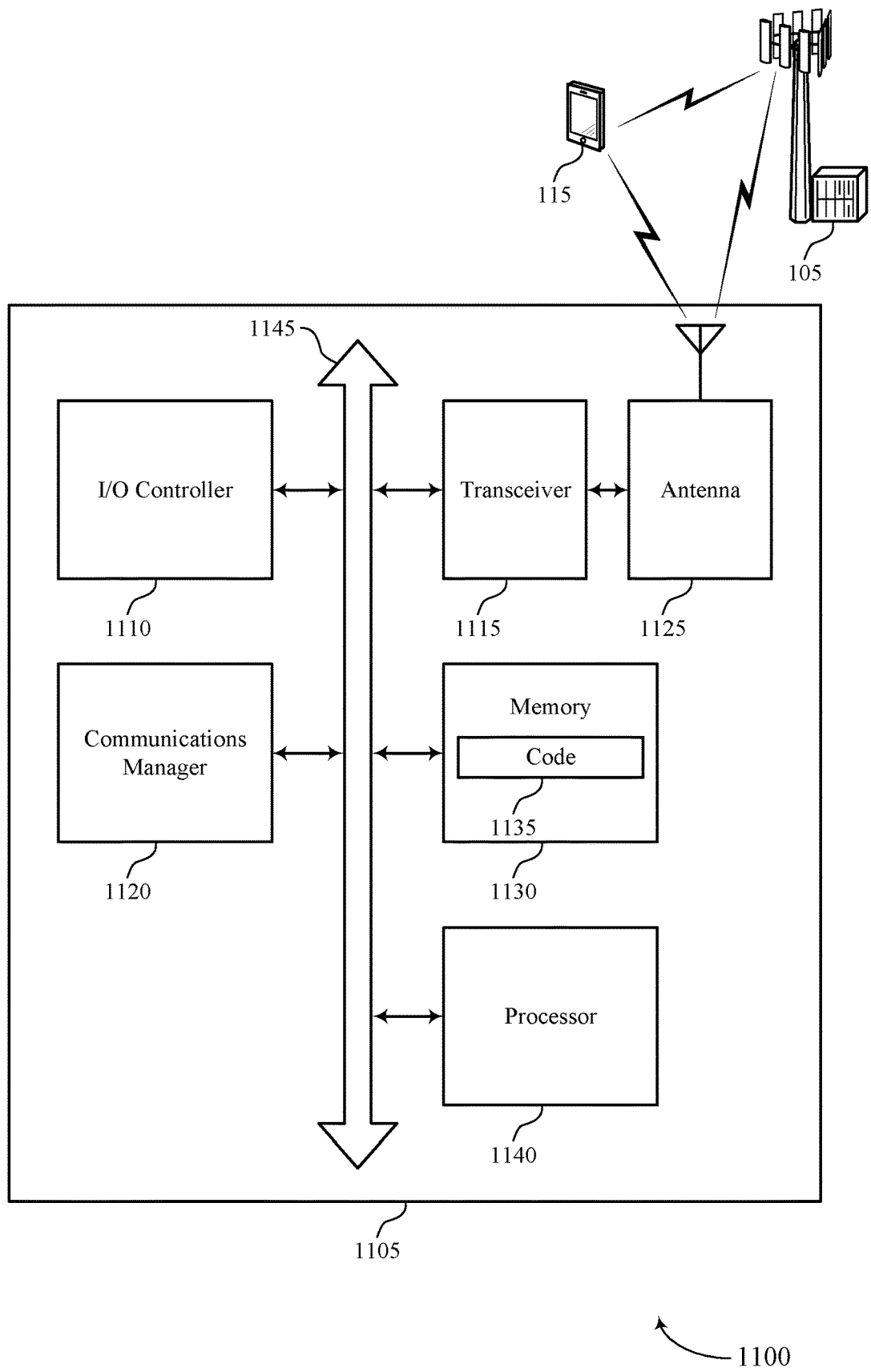
FIG. 11 shows a diagram of a system including a device in accordance with aspects of the present disclosure.

FIG. 11 shows a diagram of a system 1100 including a device 1105 that supports LBT techniques for full-duplex communications in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting LBT techniques for full-duplex communications). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving, from a base station, a first control message scheduling a downlink transmission to the UE in a shared radio frequency spectrum band. The communications manager 1120 may be configured as or otherwise support a means for a second control message from the base station scheduling an uplink transmission in the shared radio frequency spectrum band, the second control message indicating that at least a portion of the downlink transmission scheduled for transmission during CCA resources associated with the uplink transmission is canceled. The communications manager 1120 may be configured as or otherwise support a means for performing, in the shared radio frequency spectrum band, a CCA procedure within the CCA resources. The communications manager 1120 may be configured as or otherwise support a means for transmitting, in the shared radio frequency spectrum band, the uplink transmission based on the CCA procedure.

Additionally or alternatively, the communications manager 1120 may support wireless communications at a UE in accordance with examples as disclosed herein. For example, the communications manager 1120 may be configured as or otherwise support a means for receiving a control message indicating a rate matching resource corresponding to CCA resources for a shared radio frequency spectrum band. The communications manager 1120 may be configured as or otherwise support a means for performing a CCA procedure within the CCA resources. The communications manager 1120 may be configured as or otherwise support a means for receiving, in the shared radio frequency spectrum band, a downlink transmission that is rate matched around the rate matching resource concurrent with transmitting, in the shared radio frequency spectrum band, an uplink transmission based on the CCA procedure.

By including or configuring the communications manager 1120 in accordance with examples as described herein, the device 1105 may support techniques for improved communication reliability, reduced latency, more efficient utilization of communication resources, and improved coordination between devices.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of LBT techniques for full-duplex communications as described herein, or the processor 1140 and the memory 1130 may be otherwise configured to perform or support such operations.

Figure 12:
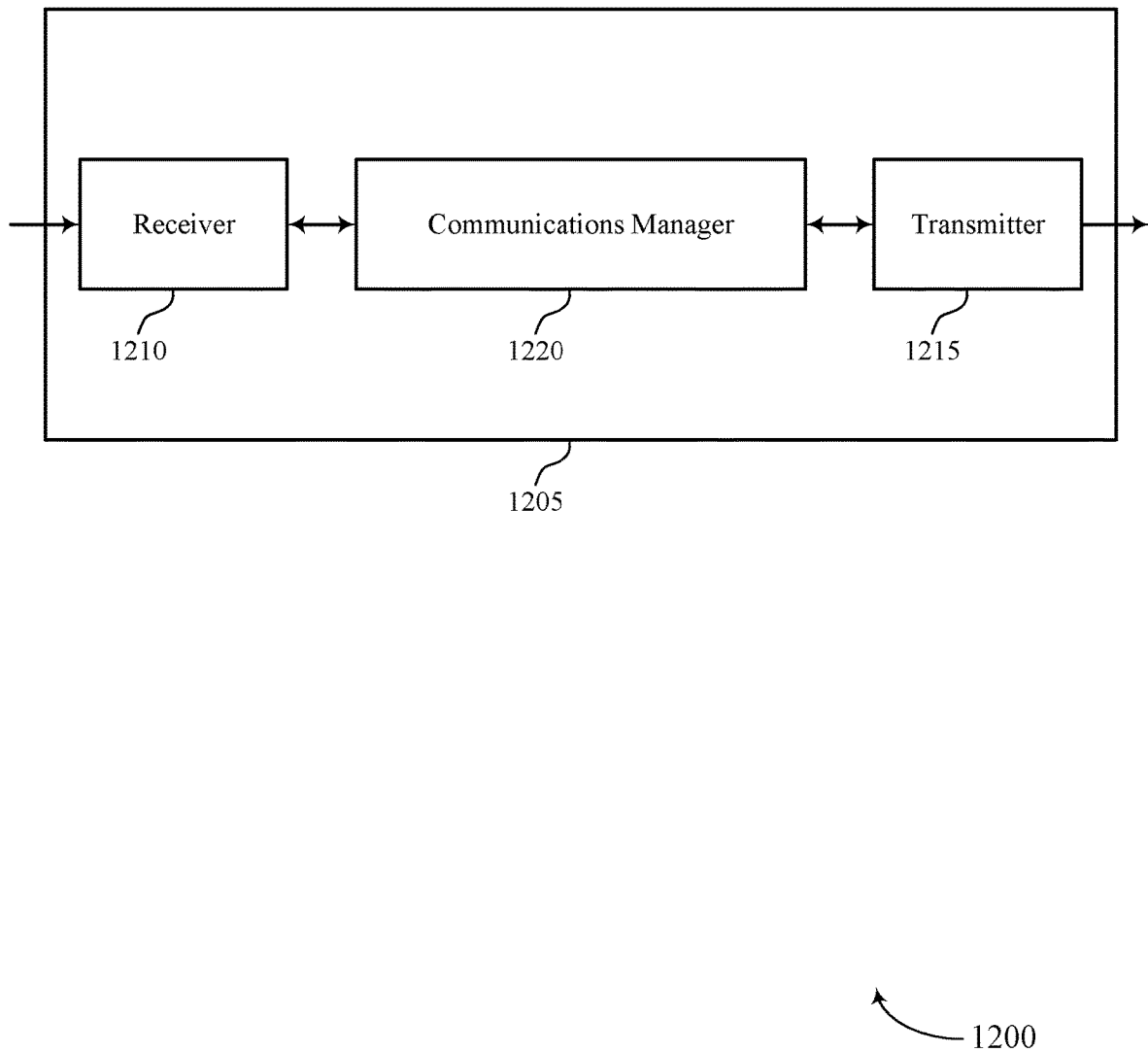
FIGS. 12 and 13 show block diagrams of devices in accordance with aspects of the present disclosure.

FIG. 12 shows a block diagram 1200 of a device 1205 that supports LBT techniques for full-duplex communications in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to LBT techniques for full-duplex communications). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to LBT techniques for full-duplex communications). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of LBT techniques for full-duplex communications as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. For example, the communications manager 1220 may be configured as or otherwise support a means for transmitting, to a UE, a first control message scheduling a downlink transmission to the UE in a shared radio frequency spectrum band. The communications manager 1220 may be configured as or otherwise support a means for transmitting a second control message from the base station scheduling an uplink transmission in the shared radio frequency spectrum band, the second control message indicating that at least a portion of the downlink transmission scheduled for transmission during CCA resources associated with the uplink transmission is canceled. The communications manager 1220 may be configured as or otherwise support a means for cancelling at least the portion of the downlink transmission in the shared radio frequency spectrum band scheduled during the CCA resources. The communications manager 1220 may be configured as or otherwise support a means for receiving, in the shared radio frequency spectrum band, the uplink transmission.

Additionally or alternatively, the communications manager 1220 may support wireless communications at a base station in accordance with examples as disclosed herein. For example, the communications manager 1220 may be configured as or otherwise support a means for transmitting a control message to a UE indicating a rate matching resource corresponding to CCA resources for a shared radio frequency spectrum band. The communications manager 1220 may be configured as or otherwise support a means for transmitting, in the shared radio frequency spectrum band, a downlink transmission that is rate matched around the rate matching resource concurrent with receiving, in the shared radio frequency spectrum band, an uplink transmission from the UE.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for more efficient utilization of communication resources.

Figure 13:
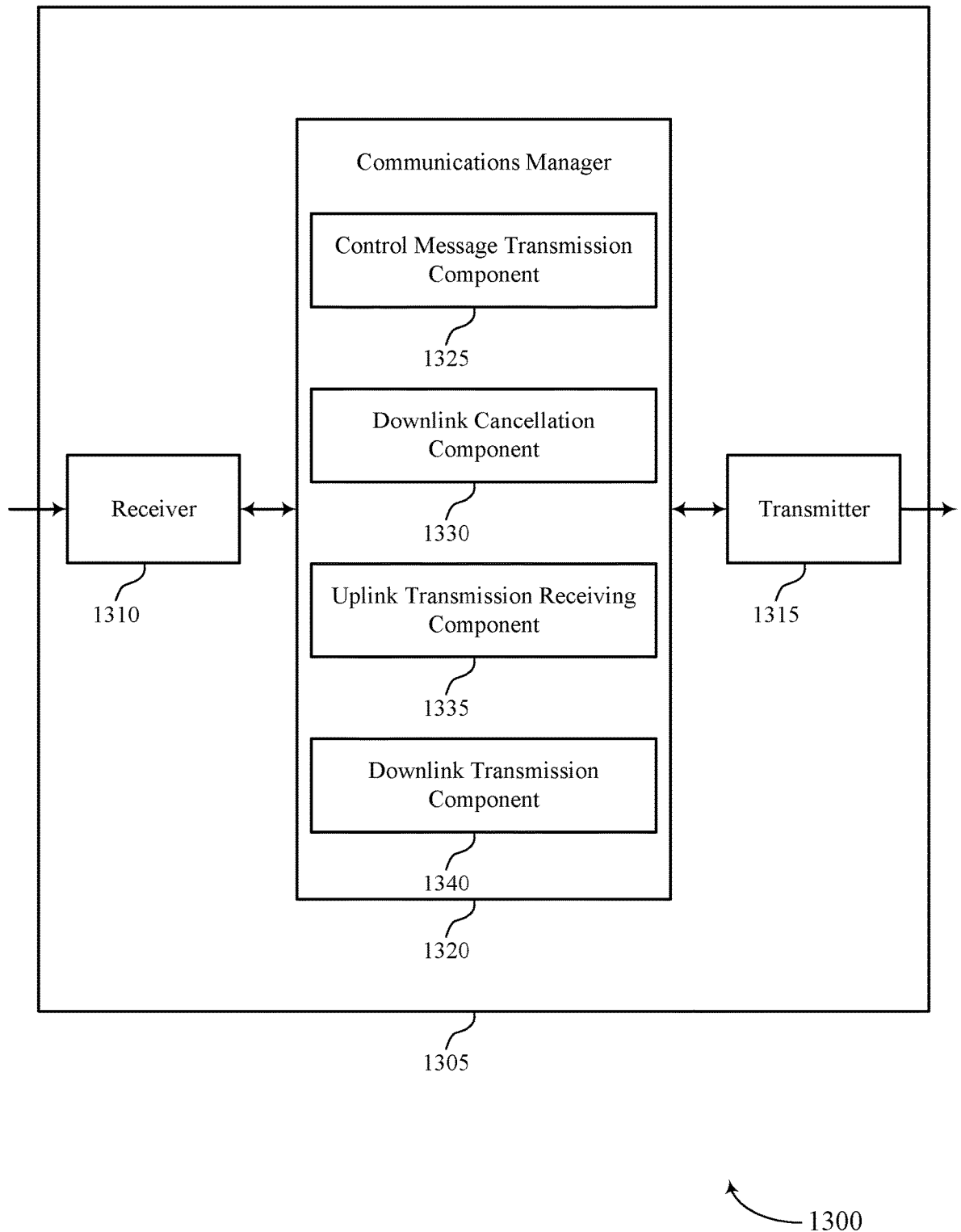

FIG. 13 shows a block diagram 1300 of a device 1305 that supports LBT techniques for full-duplex communications in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to LBT techniques for full-duplex communications). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to LBT techniques for full-duplex communications). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of LBT techniques for full-duplex communications as described herein. For example, the communications manager 1320 may include a control message transmission component 1325, a downlink cancellation component 1330, an uplink transmission receiving component 1335, a downlink transmission component 1340, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. The control message transmission component 1325 may be configured as or otherwise support a means for transmitting, to a UE, a first control message scheduling a downlink transmission to the UE in a shared radio frequency spectrum band. The control message transmission component 1325 may be configured as or otherwise support a means for transmitting a second control message from the base station scheduling an uplink transmission in the shared radio frequency spectrum band, the second control message indicating that at least a portion of the downlink transmission scheduled for transmission during CCA resources associated with the uplink transmission is canceled. The downlink cancellation component 1330 may be configured as or otherwise support a means for cancelling at least the portion of the downlink transmission in the shared radio frequency spectrum band scheduled during the CCA resources. The uplink transmission receiving component 1335 may be configured as or otherwise support a means for receiving, in the shared radio frequency spectrum band, the uplink transmission.

Additionally or alternatively, the communications manager 1320 may support wireless communications at a base station in accordance with examples as disclosed herein. The control message transmission component 1325 may be configured as or otherwise support a means for transmitting a control message to a UE indicating a rate matching resource corresponding to CCA resources for a shared radio frequency spectrum band. The downlink transmission component 1340 may be configured as or otherwise support a means for transmitting, in the shared radio frequency spectrum band, a downlink transmission that is rate matched around the rate matching resource concurrent with receiving, in the shared radio frequency spectrum band, an uplink transmission from the UE.

Figure 14:
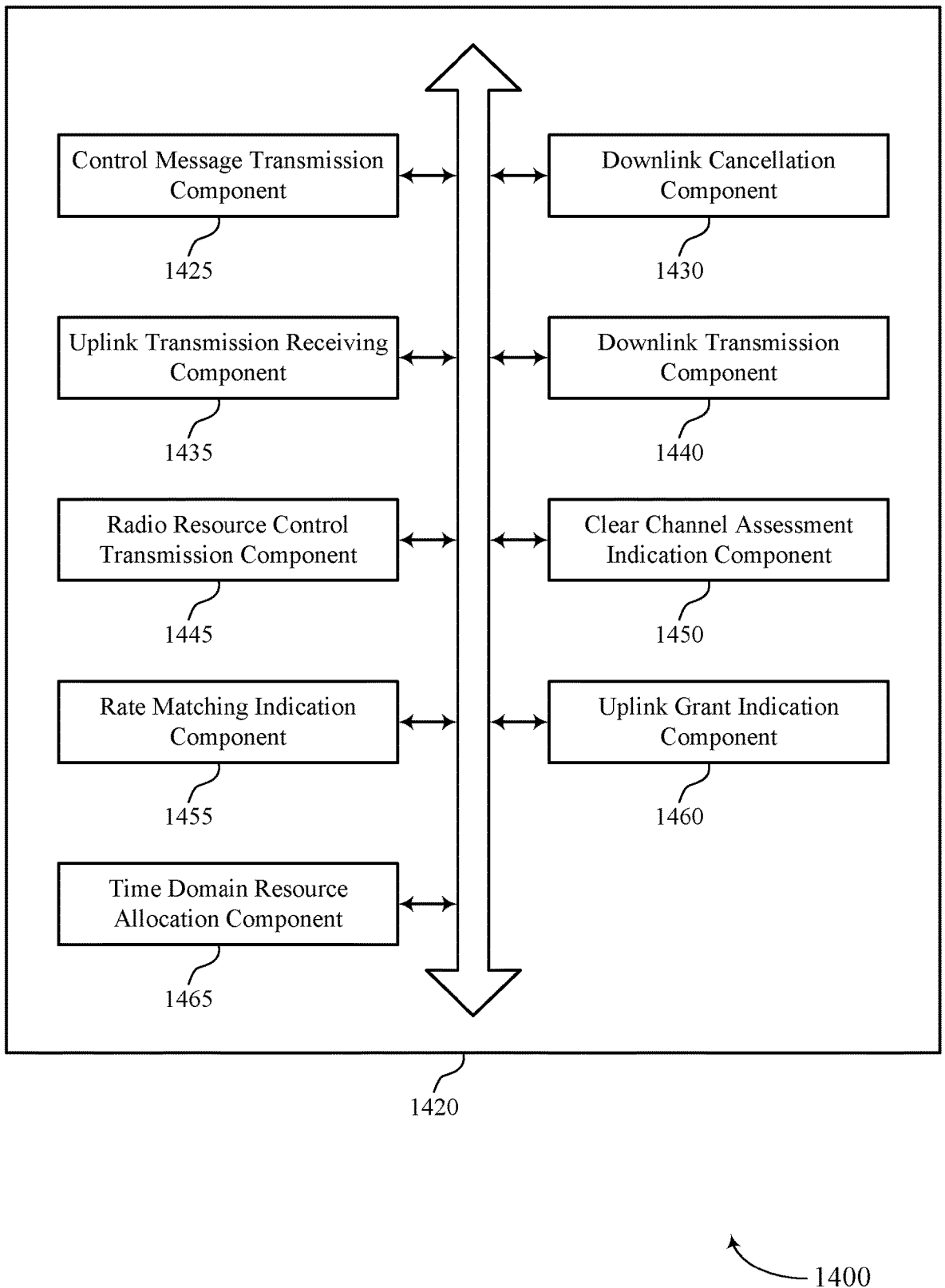
FIG. 14 shows a block diagram of a communications manager in accordance with aspects of the present disclosure.

FIG. 14 shows a block diagram 1400 of a communications manager 1420 that supports LBT techniques for full-duplex communications in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of LBT techniques for full-duplex communications as described herein. For example, the communications manager 1420 may include a control message transmission component 1425, a downlink cancellation component 1430, an uplink transmission receiving component 1435, a downlink transmission component 1440, an RRC transmission component 1445, a CCA indication component 1450, a rate matching indication component 1455, an uplink grant indication component 1460, a time domain resource allocation component 1465, or any combination thereof. Each of these components may communicate, directly or indirectly, with one another (e.g., via one or more buses).

The communications manager 1420 may support wireless communications at a base station in accordance with examples as disclosed herein. The control message transmission component 1425 may be configured as or otherwise support a means for transmitting, to a UE, a first control message scheduling a downlink transmission to the UE in a shared radio frequency spectrum band. In some examples, the control message transmission component 1425 may be configured as or otherwise support a means for transmitting a second control message from the base station scheduling an uplink transmission in the shared radio frequency spectrum band, the second control message indicating that at least a portion of the downlink transmission scheduled for transmission during CCA resources associated with the uplink transmission is canceled. The downlink cancellation component 1430 may be configured as or otherwise support a means for cancelling at least the portion of the downlink transmission in the shared radio frequency spectrum band scheduled during the CCA resources. The uplink transmission receiving component 1435 may be configured as or otherwise support a means for receiving, in the shared radio frequency spectrum band, the uplink transmission.

In some examples, the RRC transmission component 1445 may be configured as or otherwise support a means for transmitting an RRC message indicating one or more downlink transmission cancellation configurations, where the second control message implicitly indicates a first configuration from the one or more downlink transmission cancellation configurations that indicates the at least the portion of the downlink transmission that is canceled.

In some examples, the RRC transmission component 1445 may be configured as or otherwise support a means for transmitting an RRC message including one or more downlink transmission cancellation configurations. In some examples, the control message transmission component 1425 may be configured as or otherwise support a means for transmitting the second control message indicating a first configuration from the one or more downlink transmission cancellation configurations that indicates the at least the portion of the downlink transmission that is canceled.

In some examples, to support transmitting the second control message, the CCA indication component 1450 may be configured as or otherwise support a means for transmitting the second control message that indicates a type of the CCA procedure, where the downlink transmission is canceled during at least a portion of the CCA resources based on the indicated type of the CCA procedure.

In some examples, to support transmitting the second control message, the downlink cancellation component 1430 may be configured as or otherwise support a means for transmitting the second control message indicating that the downlink transmission is at least partially canceled on time resources overlapping with the CCA resources, partially canceled in frequency resources overlapping with the CCA resources, or both.

In some examples, to support transmitting the second control message, the downlink cancellation component 1430 may be configured as or otherwise support a means for transmitting the second control message indicating that the downlink transmission is fully canceled starting from a first symbol overlapping the CCA resources or fully canceled.

Additionally or alternatively, the communications manager 1420 may support wireless communications at a base station in accordance with examples as disclosed herein. In some examples, the control message transmission component 1425 may be configured as or otherwise support a means for transmitting a control message to a UE indicating a rate matching resource corresponding to CCA resources for a shared radio frequency spectrum band. The downlink transmission component 1440 may be configured as or otherwise support a means for transmitting, in the shared radio frequency spectrum band, a downlink transmission that is rate matched around the rate matching resource concurrent with receiving, in the shared radio frequency spectrum band, an uplink transmission from the UE.

In some examples, to support transmitting the control message, the rate matching indication component 1455 may be configured as or otherwise support a means for transmitting the control message indicating the rate matching resource via RRC signaling.

In some examples, to support transmitting the control message, the rate matching indication component 1455 may be configured as or otherwise support a means for transmitting the control message indicating the rate matching resource via downlink control information.

In some examples, to support transmitting the control message, the uplink grant indication component 1460 may be configured as or otherwise support a means for transmitting the control message via the downlink control information that indicates an uplink grant for the uplink transmission.

In some examples, to support transmitting the control message, the time domain resource allocation component 1465 may be configured as or otherwise support a means for transmitting the control message indicating a time domain resource allocation indication for the rate matching resource, a frequency domain resource allocation indication for the rate matching resource, or both.

In some examples, to support receiving the control message, the rate matching indication component 1455 may be configured as or otherwise support a means for transmitting the control message indicating a start and length indicator value for the rate matching resource, an index to a table of rate matching resource configurations, or both.

Figure 15:
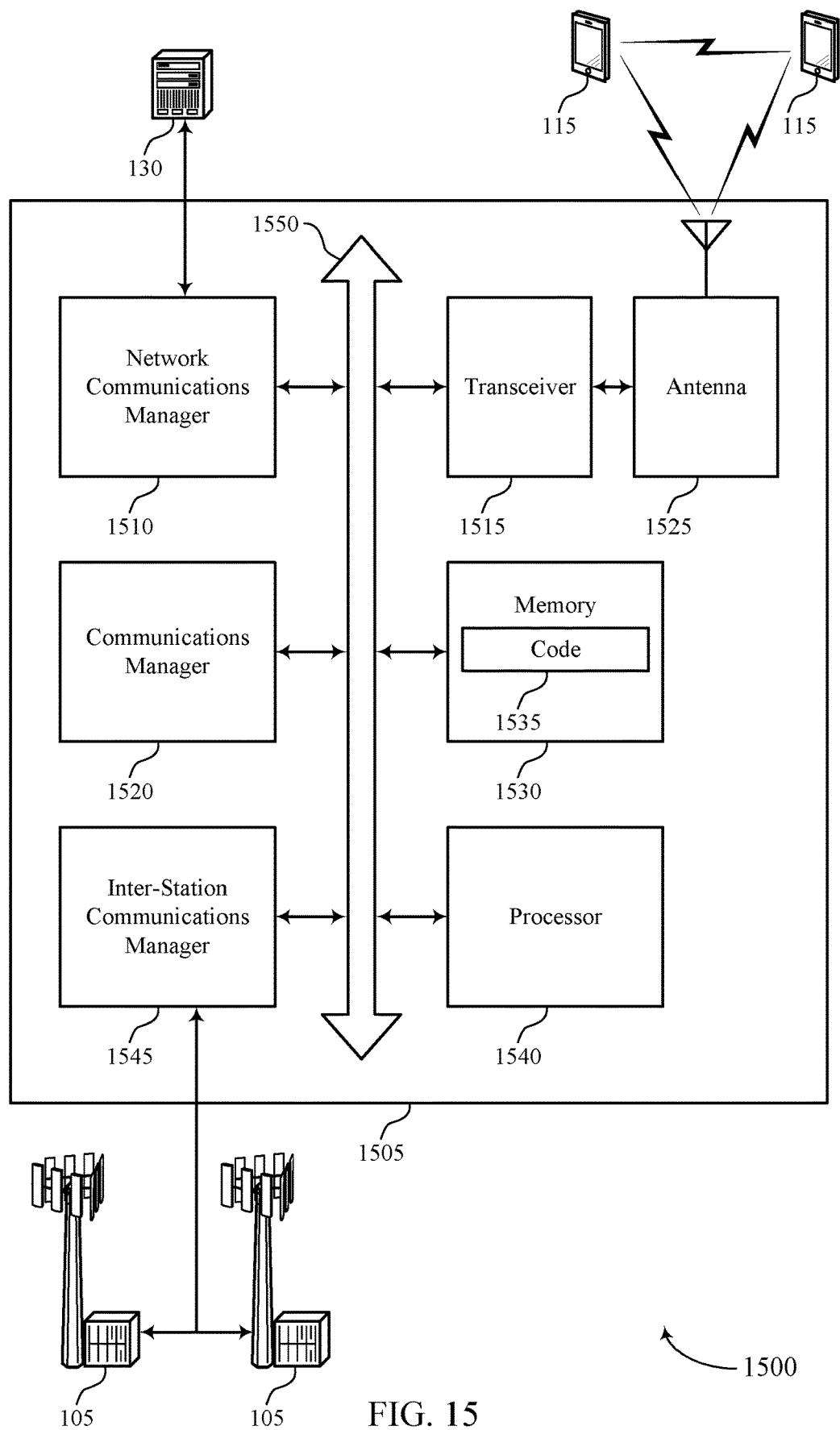
FIG. 15 shows a diagram of a system including a device in accordance with aspects of the present disclosure.

FIG. 15 shows a diagram of a system 1500 including a device 1505 that supports LBT techniques for full-duplex communications in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 110 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting LBT techniques for full-duplex communications). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communications at a base station in accordance with examples as disclosed herein. For example, the communications manager 1520 may be configured as or otherwise support a means for transmitting, to a UE, a first control message scheduling a downlink transmission to the UE in a shared radio frequency spectrum band. The communications manager 1520 may be configured as or otherwise support a means for transmitting a second control message from the base station scheduling an uplink transmission in the shared radio frequency spectrum band, the second control message indicating that at least a portion of the downlink transmission scheduled for transmission during CCA resources associated with the uplink transmission is canceled. The communications manager 1520 may be configured as or otherwise support a means for cancelling at least the portion of the downlink transmission in the shared radio frequency spectrum band scheduled during the CCA resources. The communications manager 1520 may be configured as or otherwise support a means for receiving, in the shared radio frequency spectrum band, the uplink transmission.

Additionally or alternatively, the communications manager 1520 may support wireless communications at a base station in accordance with examples as disclosed herein. For example, the communications manager 1520 may be configured as or otherwise support a means for transmitting a control message to a UE indicating a rate matching resource corresponding to CCA resources for a shared radio frequency spectrum band. The communications manager 1520 may be configured as or otherwise support a means for transmitting, in the shared radio frequency spectrum band, a downlink transmission that is rate matched around the rate matching resource concurrent with receiving, in the shared radio frequency spectrum band, an uplink transmission from the UE.

By including or configuring the communications manager 1520 in accordance with examples as described herein, the device 1505 may support techniques for improved communication reliability, improved coordination between devices, and improved utilization of processing capability.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of LBT techniques for full-duplex communications as described herein, or the processor 1540 and the memory 1530 may be otherwise configured to perform or support such operations.

Figure 16:
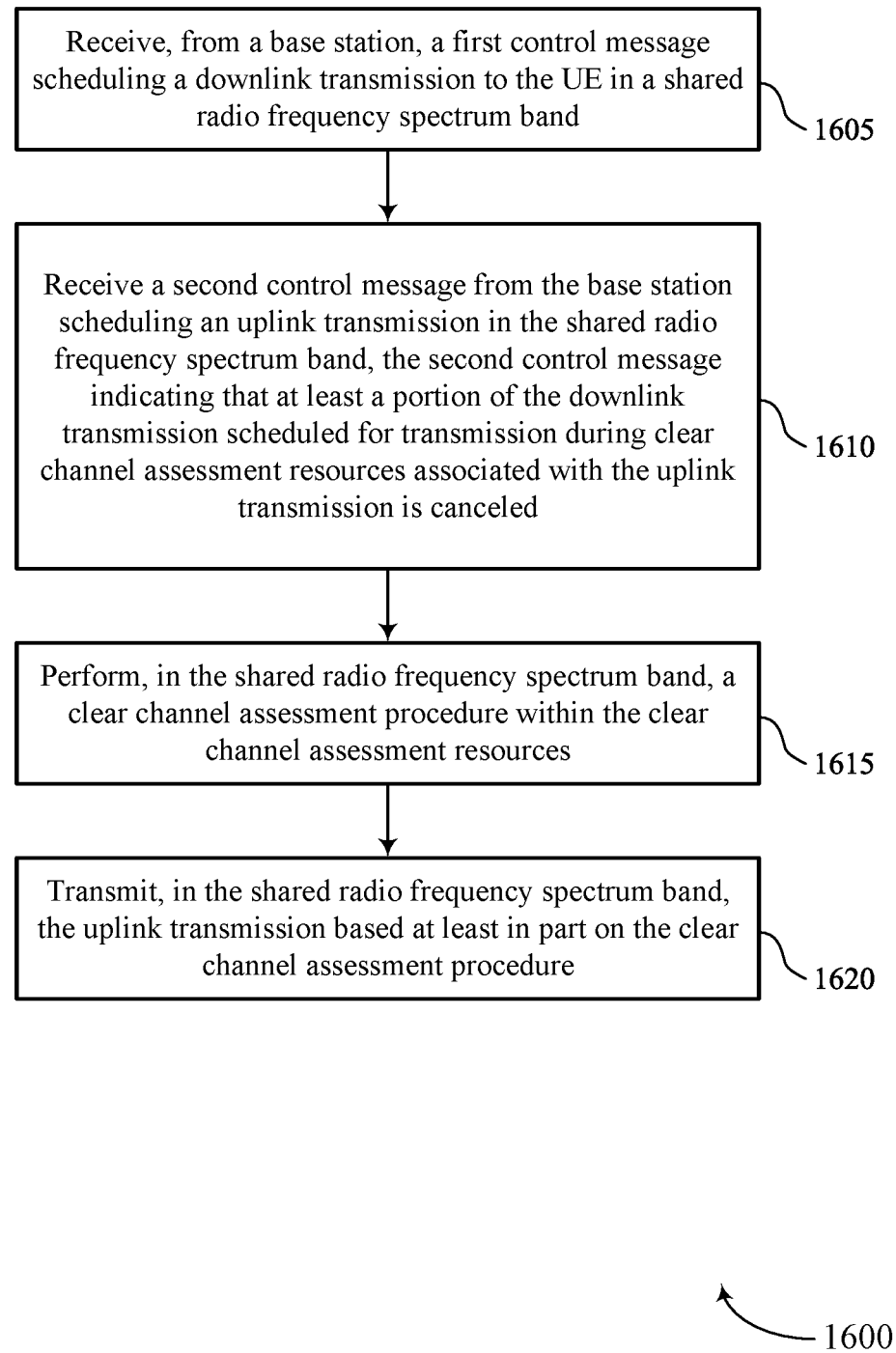
FIGS. 16 through 25 show flowcharts illustrating methods in accordance with aspects of the present disclosure.

FIG. 16 shows a flowchart illustrating a method 1600 that supports LBT techniques for full-duplex communications in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a first control message scheduling a downlink transmission to the UE in a shared radio frequency spectrum band. The operations of 1605 may be performed in accordance with examples as disclosed herein. In some examples, aspects of the operations of 1605 may be performed by a control message receiving component 1025 as described with reference to FIG. 10.

At 1610, the method may include receiving a second control message from the base station scheduling an uplink transmission in the shared radio frequency spectrum band, the second control message indicating that at least a portion of the downlink transmission scheduled for transmission during CCA resources associated with the uplink transmission is canceled. The operations of 1610 may be performed in accordance with examples as disclosed herein. In some examples, aspects of the operations of 1610 may be performed by a control message receiving component 1025 as described with reference to FIG. 10.

At 1615, the method may include performing, in the shared radio frequency spectrum band, a CCA procedure within the CCA resources. The operations of 1615 may be performed in accordance with examples as disclosed herein. In some examples, aspects of the operations of 1615 may be performed by a CCA component 1030 as described with reference to FIG. 10.

At 1620, the method may include transmitting, in the shared radio frequency spectrum band, the uplink transmission based on the CCA procedure. The operations of 1620 may be performed in accordance with examples as disclosed herein. In some examples, aspects of the operations of 1620 may be performed by an uplink transmission component 1035 as described with reference to FIG. 10.

Figure 17:
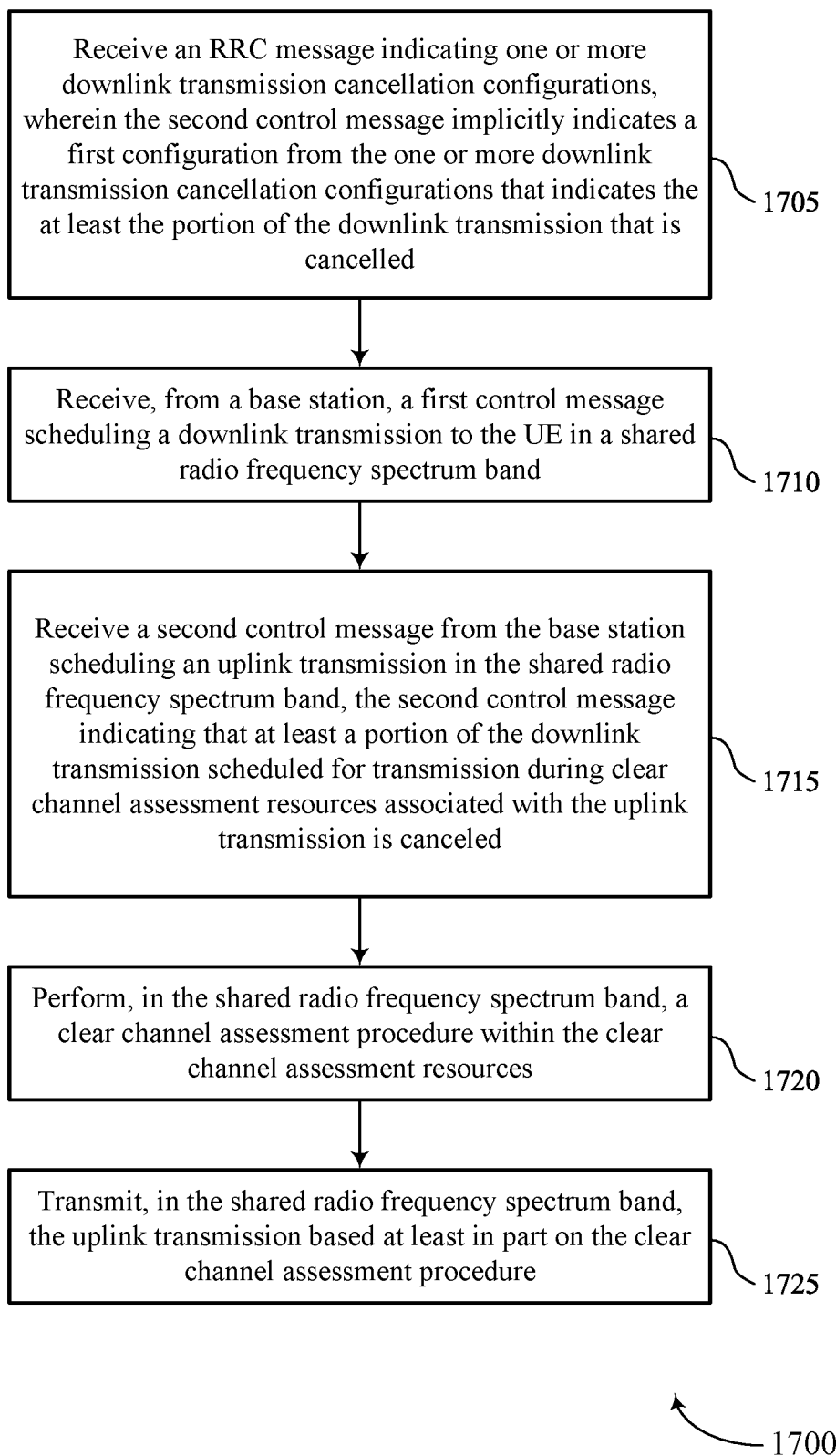

FIG. 17 shows a flowchart illustrating a method 1700 that supports LBT techniques for full-duplex communications in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include receiving an RRC message indicating one or more downlink transmission cancellation configurations, where the second control message implicitly indicates a first configuration from the one or more downlink transmission cancellation configurations that indicates the at least the portion of the downlink transmission that is canceled. The operations of 1705 may be performed in accordance with examples as disclosed herein. In some examples, aspects of the operations of 1705 may be performed by an RRC receiving component 1045 as described with reference to FIG. 10.

At 1710, the method may include receiving, from a base station, a first control message scheduling a downlink transmission to the UE in a shared radio frequency spectrum band. The operations of 1710 may be performed in accordance with examples as disclosed herein. In some examples, aspects of the operations of 1710 may be performed by a control message receiving component 1025 as described with reference to FIG. 10.

At 1715, the method may include receiving a second control message from the base station scheduling an uplink transmission in the shared radio frequency spectrum band, the second control message indicating that at least a portion of the downlink transmission scheduled for transmission during CCA resources associated with the uplink transmission is canceled. The operations of 1715 may be performed in accordance with examples as disclosed herein. In some examples, aspects of the operations of 1715 may be performed by a control message receiving component 1025 as described with reference to FIG. 10.

At 1720, the method may include performing, in the shared radio frequency spectrum band, a CCA procedure within the CCA resources. The operations of 1720 may be performed in accordance with examples as disclosed herein. In some examples, aspects of the operations of 1720 may be performed by a CCA component 1030 as described with reference to FIG. 10.

At 1725, the method may include transmitting, in the shared radio frequency spectrum band, the uplink transmission based on the CCA procedure. The operations of 1725 may be performed in accordance with examples as disclosed herein. In some examples, aspects of the operations of 1725 may be performed by an uplink transmission component 1035 as described with reference to FIG. 10.

Figure 18:
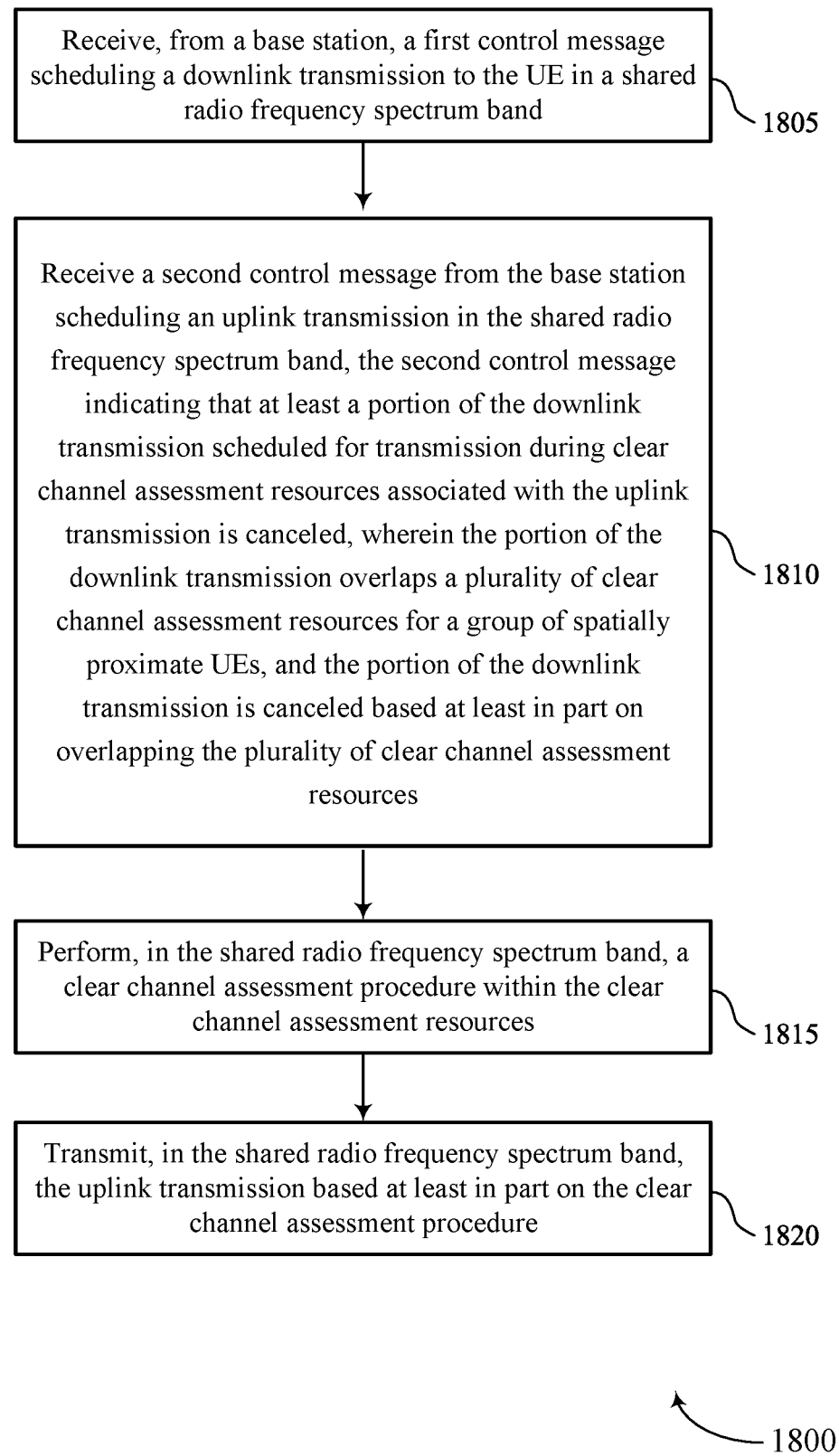

FIG. 18 shows a flowchart illustrating a method 1800 that supports LBT techniques for full-duplex communications in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, a first control message scheduling a downlink transmission to the UE in a shared radio frequency spectrum band. The operations of 1805 may be performed in accordance with examples as disclosed herein. In some examples, aspects of the operations of 1805 may be performed by a control message receiving component 1025 as described with reference to FIG. 10.

At 1810, the method may include receiving a second control message from the base station scheduling an uplink transmission in the shared radio frequency spectrum band, the second control message indicating that at least a portion of the downlink transmission scheduled for transmission during CCA resources associated with the uplink transmission is canceled, where the portion of the downlink transmission overlaps a set of multiple CCA resources for a group of spatially proximate UEs, and the portion of the downlink transmission is canceled based on overlapping the set of multiple CCA resources. The operations of 1810 may be performed in accordance with examples as disclosed herein. In some examples, aspects of the operations of 1810 may be performed by a control message receiving component 1025 as described with reference to FIG. 10.

At 1815, the method may include performing, in the shared radio frequency spectrum band, a CCA procedure within the CCA resources. The operations of 1815 may be performed in accordance with examples as disclosed herein. In some examples, aspects of the operations of 1815 may be performed by a CCA component 1030 as described with reference to FIG. 10.

At 1820, the method may include transmitting, in the shared radio frequency spectrum band, the uplink transmission based on the CCA procedure. The operations of 1820 may be performed in accordance with examples as disclosed herein. In some examples, aspects of the operations of 1820 may be performed by an uplink transmission component 1035 as described with reference to FIG. 10.

Figure 19:
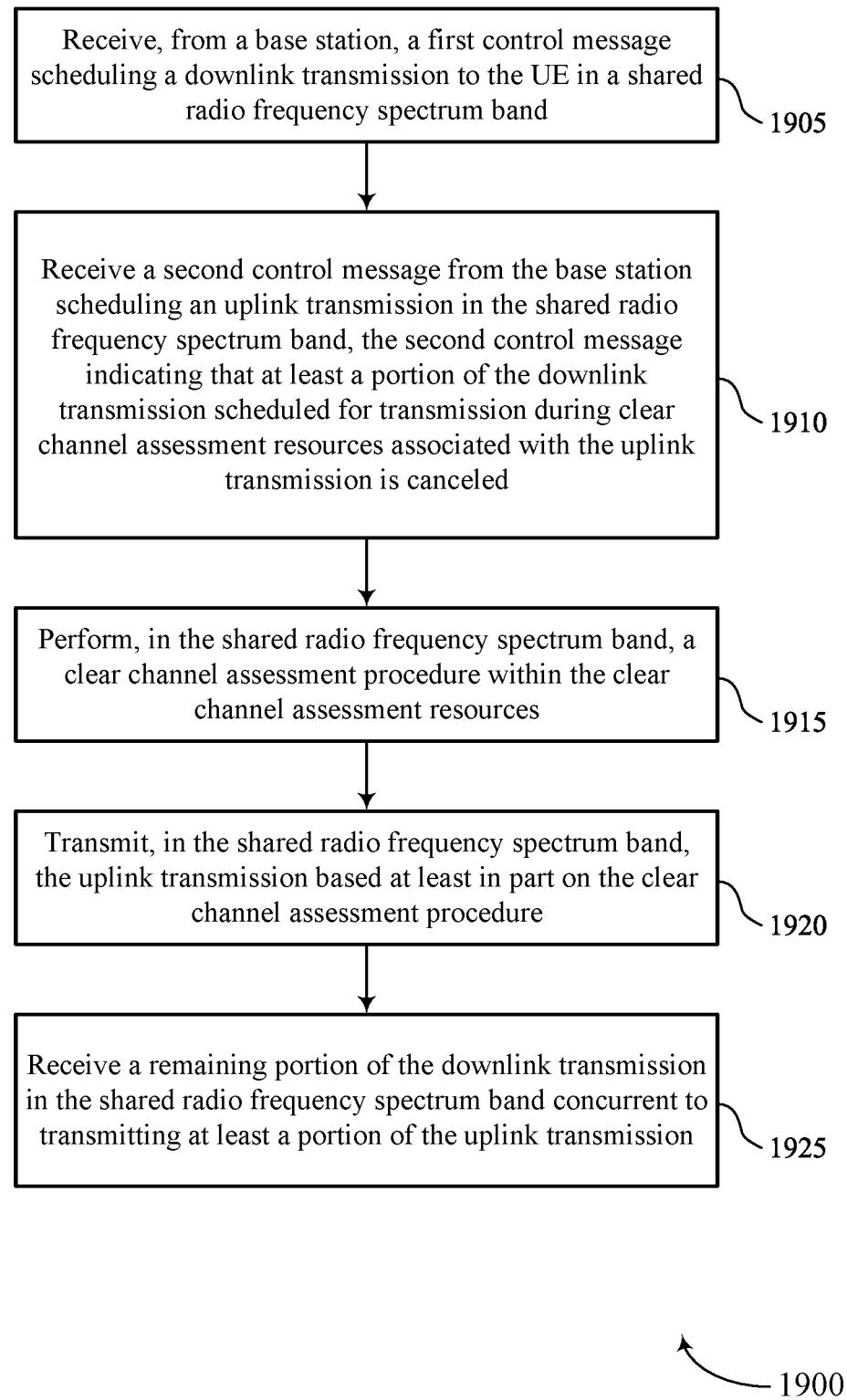

FIG. 19 shows a flowchart illustrating a method 1900 that supports LBT techniques for full-duplex communications in accordance with aspects of the present disclosure. The operations of the method 1900 may be implemented by a UE or its components as described herein. For example, the operations of the method 1900 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, a first control message scheduling a downlink transmission to the UE in a shared radio frequency spectrum band. The operations of 1905 may be performed in accordance with examples as disclosed herein. In some examples, aspects of the operations of 1905 may be performed by a control message receiving component 1025 as described with reference to FIG. 10.

At 1910, the method may include receiving a second control message from the base station scheduling an uplink transmission in the shared radio frequency spectrum band, the second control message indicating that at least a portion of the downlink transmission scheduled for transmission during CCA resources associated with the uplink transmission is canceled. The operations of 1910 may be performed in accordance with examples as disclosed herein. In some examples, aspects of the operations of 1910 may be performed by a control message receiving component 1025 as described with reference to FIG. 10.

At 1915, the method may include performing, in the shared radio frequency spectrum band, a CCA procedure within the CCA resources. The operations of 1915 may be performed in accordance with examples as disclosed herein. In some examples, aspects of the operations of 1915 may be performed by a CCA component 1030 as described with reference to FIG. 10.

At 1920, the method may include transmitting, in the shared radio frequency spectrum band, the uplink transmission based on the CCA procedure. The operations of 1920 may be performed in accordance with examples as disclosed herein. In some examples, aspects of the operations of 1920 may be performed by an uplink transmission component 1035 as described with reference to FIG. 10.

At 1925, the method may include receiving a remaining portion of the downlink transmission in the shared radio frequency spectrum band concurrent to transmitting at least a portion of the uplink transmission. The operations of 1925 may be performed in accordance with examples as disclosed herein. In some examples, aspects of the operations of 1925 may be performed by a downlink receiving component 1040 as described with reference to FIG. 10.

Figure 20:
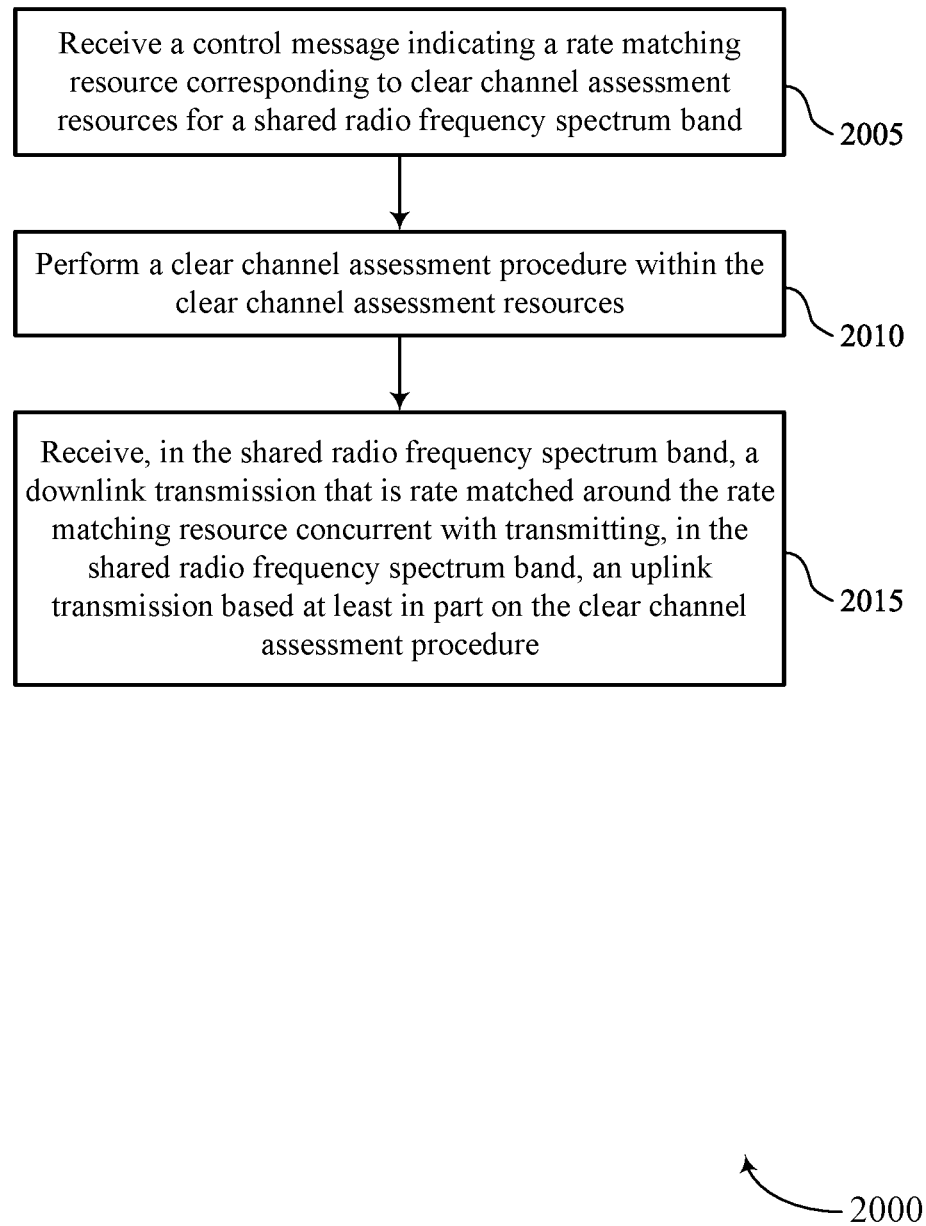

FIG. 20 shows a flowchart illustrating a method 2000 that supports LBT techniques for full-duplex communications in accordance with aspects of the present disclosure. The operations of the method 2000 may be implemented by a UE or its components as described herein. For example, the operations of the method 2000 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 2005, the method may include receiving a control message indicating a rate matching resource corresponding to CCA resources for a shared radio frequency spectrum band. The operations of 2005 may be performed in accordance with examples as disclosed herein. In some examples, aspects of the operations of 2005 may be performed by a control message receiving component 1025 as described with reference to FIG. 10.

At 2010, the method may include performing a CCA procedure within the CCA resources. The operations of 2010 may be performed in accordance with examples as disclosed herein. In some examples, aspects of the operations of 2010 may be performed by a CCA component 1030 as described with reference to FIG. 10.

At 2015, the method may include receiving, in the shared radio frequency spectrum band, a downlink transmission that is rate matched around the rate matching resource concurrent with transmitting, in the shared radio frequency spectrum band, an uplink transmission based on the CCA procedure. The operations of 2015 may be performed in accordance with examples as disclosed herein. In some examples, aspects of the operations of 2015 may be performed by a downlink receiving component 1040 as described with reference to FIG. 10.

Figure 21:
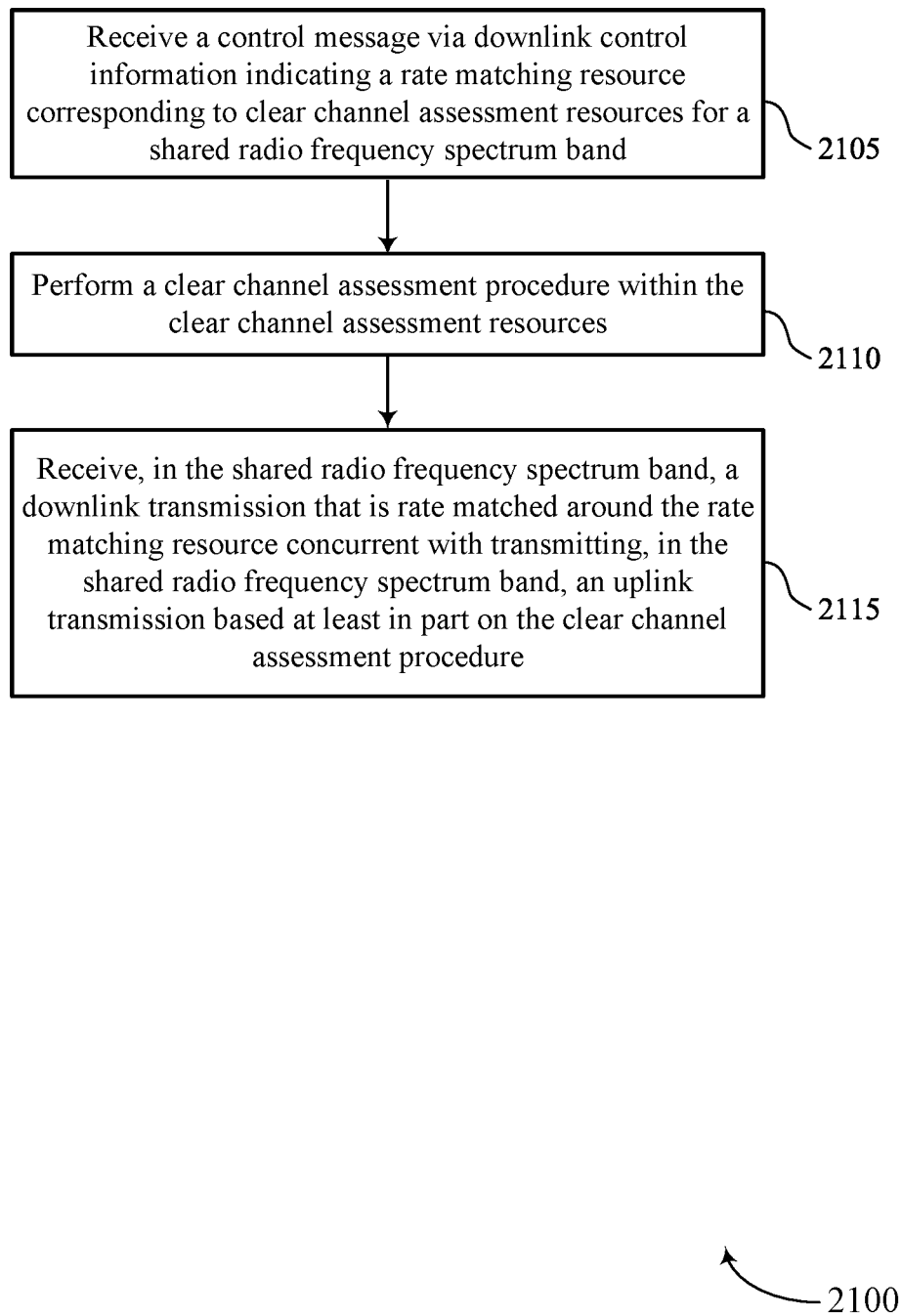

FIG. 21 shows a flowchart illustrating a method 2100 that supports LBT techniques for full-duplex communications in accordance with aspects of the present disclosure. The operations of the method 2100 may be implemented by a UE or its components as described herein. For example, the operations of the method 2100 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 2105, the method may include receiving a control message via downlink control information indicating a rate matching resource corresponding to CCA resources for a shared radio frequency spectrum band. The operations of 2105 may be performed in accordance with examples as disclosed herein. In some examples, aspects of the operations of 2105 may be performed by a control message receiving component 1025 as described with reference to FIG. 10.

At 2110, the method may include performing a CCA procedure within the CCA resources. The operations of 2110 may be performed in accordance with examples as disclosed herein. In some examples, aspects of the operations of 2110 may be performed by a CCA component 1030 as described with reference to FIG. 10.

At 2115, the method may include receiving, in the shared radio frequency spectrum band, a downlink transmission that is rate matched around the rate matching resource concurrent with transmitting, in the shared radio frequency spectrum band, an uplink transmission based on the CCA procedure. The operations of 2115 may be performed in accordance with examples as disclosed herein. In some examples, aspects of the operations of 2115 may be performed by a downlink receiving component 1040 as described with reference to FIG. 10.

Figure 22:
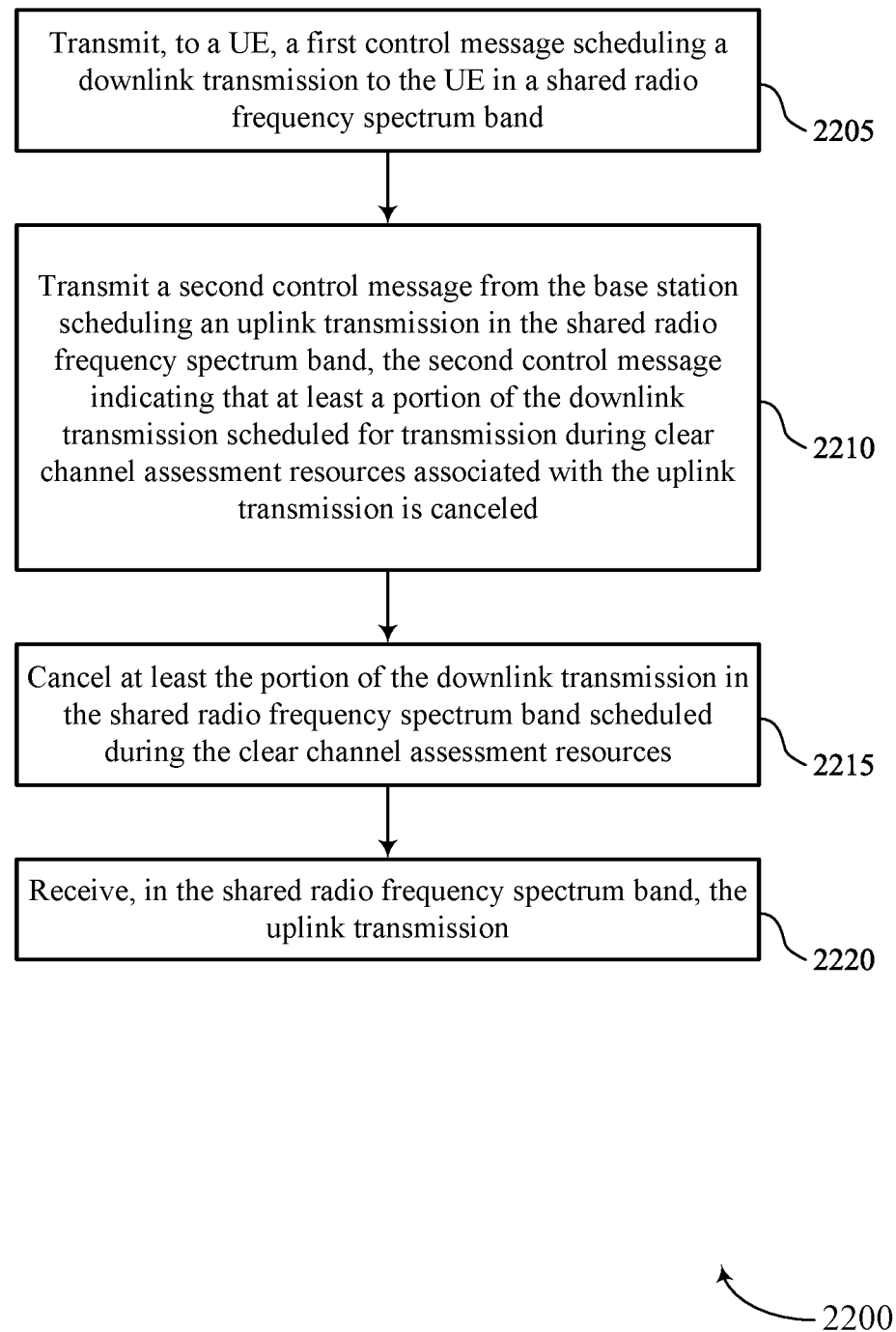

FIG. 22 shows a flowchart illustrating a method 2200 that supports LBT techniques for full-duplex communications in accordance with aspects of the present disclosure. The operations of the method 2200 may be implemented by a base station or its components as described herein. For example, the operations of the method 2200 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 2205, the method may include transmitting, to a UE, a first control message scheduling a downlink transmission to the UE in a shared radio frequency spectrum band. The operations of 2205 may be performed in accordance with examples as disclosed herein. In some examples, aspects of the operations of 2205 may be performed by a control message transmission component 1425 as described with reference to FIG. 14.

At 2210, the method may include transmitting a second control message from the base station scheduling an uplink transmission in the shared radio frequency spectrum band, the second control message indicating that at least a portion of the downlink transmission scheduled for transmission during CCA resources associated with the uplink transmission is canceled. The operations of 2210 may be performed in accordance with examples as disclosed herein. In some examples, aspects of the operations of 2210 may be performed by a control message transmission component 1425 as described with reference to FIG. 14.

At 2215, the method may include cancelling at least the portion of the downlink transmission in the shared radio frequency spectrum band scheduled during the CCA resources. The operations of 2215 may be performed in accordance with examples as disclosed herein. In some examples, aspects of the operations of 2215 may be performed by a downlink cancellation component 1430 as described with reference to FIG. 14.

At 2220, the method may include receiving, in the shared radio frequency spectrum band, the uplink transmission. The operations of 2220 may be performed in accordance with examples as disclosed herein. In some examples, aspects of the operations of 2220 may be performed by an uplink transmission receiving component 1435 as described with reference to FIG. 14.

Figure 23:
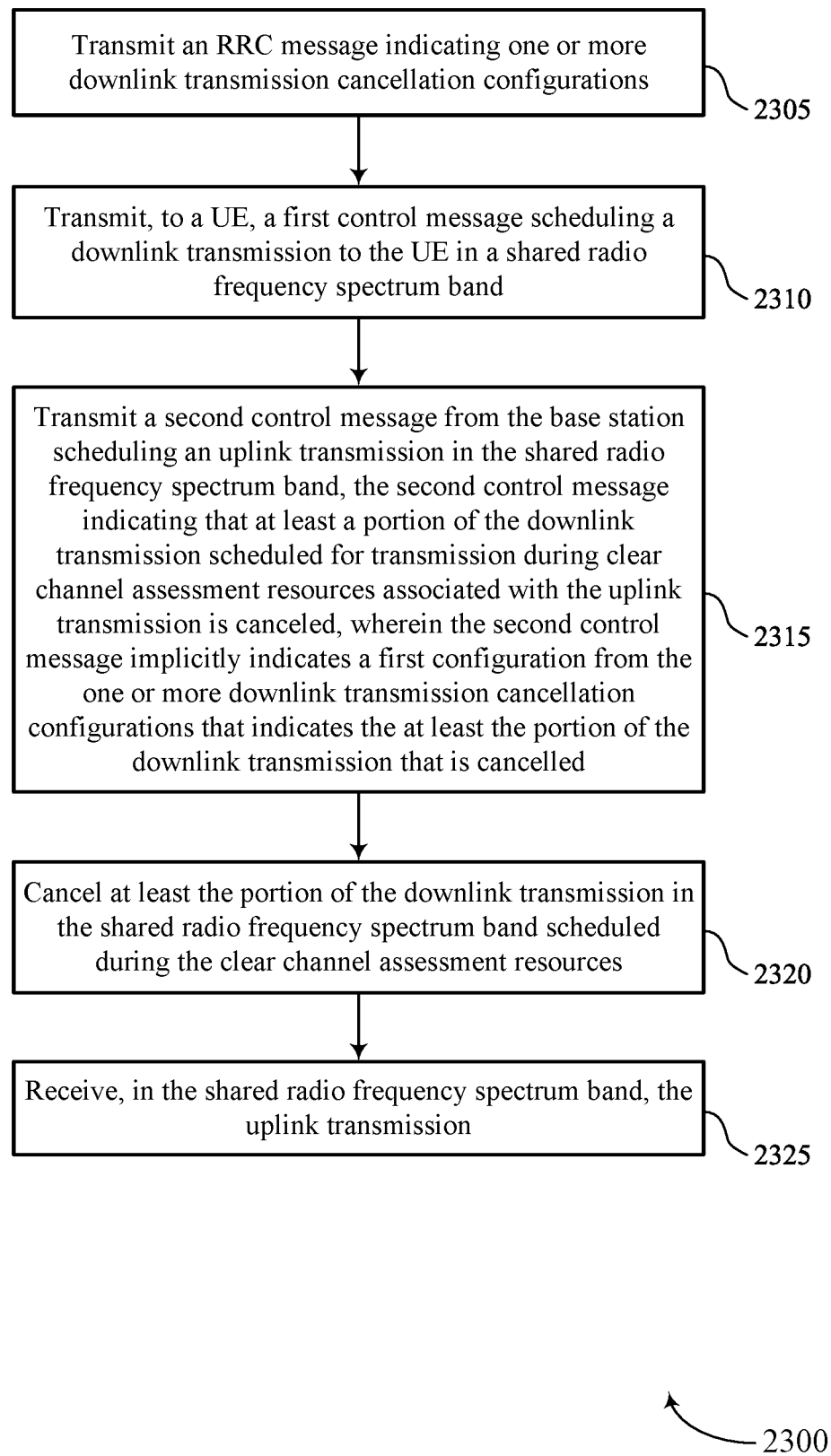

FIG. 23 shows a flowchart illustrating a method 2300 that supports LBT techniques for full-duplex communications in accordance with aspects of the present disclosure. The operations of the method 2300 may be implemented by a base station or its components as described herein. For example, the operations of the method 2300 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 2305, the method may include transmitting an RRC message indicating one or more downlink transmission cancellation configurations. The operations of 2305 may be performed in accordance with examples as disclosed herein. In some examples, aspects of the operations of 2305 may be performed by an RRC transmission component 1445 as described with reference to FIG. 14.

At 2310, the method may include transmitting, to a UE, a first control message scheduling a downlink transmission to the UE in a shared radio frequency spectrum band.

The operations of 2310 may be performed in accordance with examples as disclosed herein. In some examples, aspects of the operations of 2310 may be performed by a control message transmission component 1425 as described with reference to FIG. 14.

At 2315, the method may include transmitting a second control message from the base station scheduling an uplink transmission in the shared radio frequency spectrum band, the second control message indicating that at least a portion of the downlink transmission scheduled for transmission during CCA resources associated with the uplink transmission is canceled, where the second control message implicitly indicates a first configuration from the one or more downlink transmission cancellation configurations that indicates the at least the portion of the downlink transmission that is canceled. The operations of 2315 may be performed in accordance with examples as disclosed herein. In some examples, aspects of the operations of 2315 may be performed by a control message transmission component 1425 as described with reference to FIG. 14.

At 2320, the method may include cancelling at least the portion of the downlink transmission in the shared radio frequency spectrum band scheduled during the CCA resources. The operations of 2320 may be performed in accordance with examples as disclosed herein. In some examples, aspects of the operations of 2320 may be performed by a downlink cancellation component 1430 as described with reference to FIG. 14.

At 2325, the method may include receiving, in the shared radio frequency spectrum band, the uplink transmission. The operations of 2325 may be performed in accordance with examples as disclosed herein. In some examples, aspects of the operations of 2325 may be performed by an uplink transmission receiving component 1435 as described with reference to FIG. 14.

Figure 24:
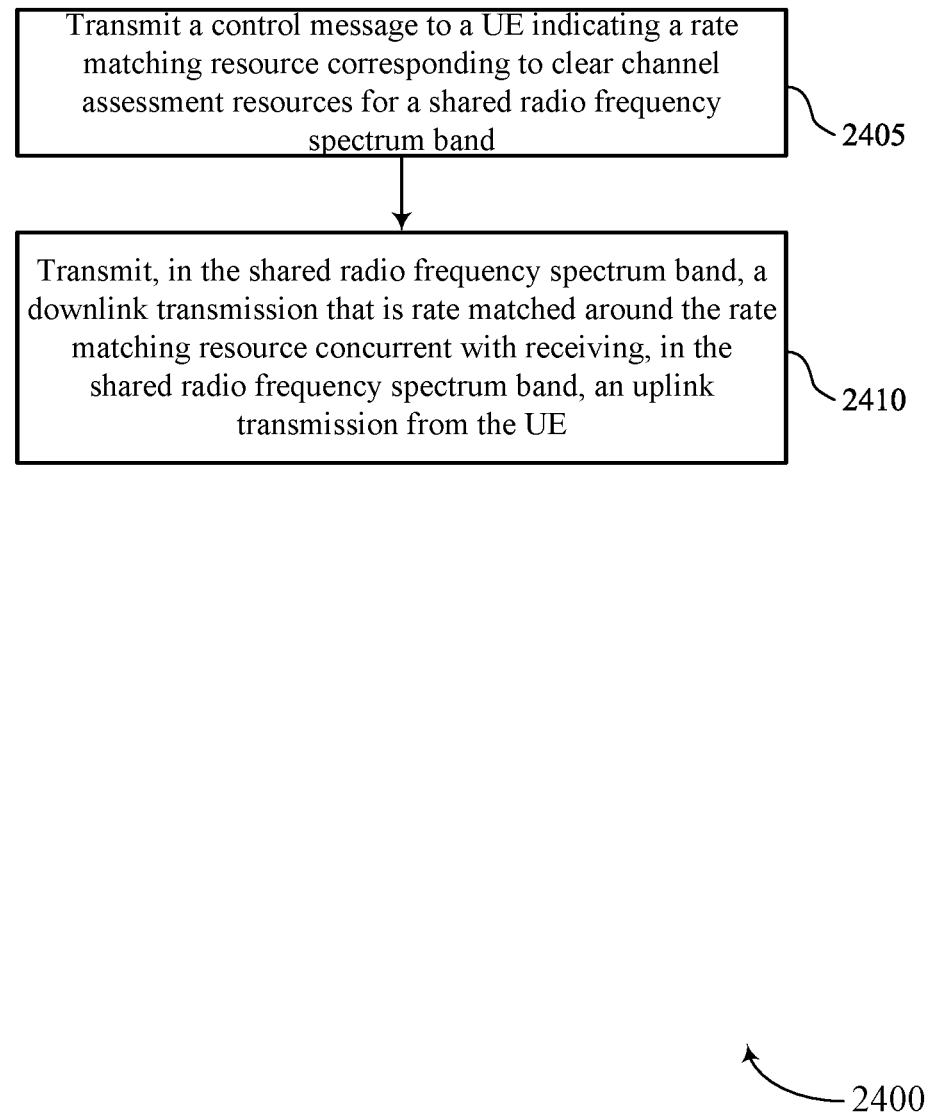

FIG. 24 shows a flowchart illustrating a method 2400 that supports LBT techniques for full-duplex communications in accordance with aspects of the present disclosure. The operations of the method 2400 may be implemented by a base station or its components as described herein. For example, the operations of the method 2400 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 2405, the method may include transmitting a control message to a UE indicating a rate matching resource corresponding to CCA resources for a shared radio frequency spectrum band. The operations of 2405 may be performed in accordance with examples as disclosed herein. In some examples, aspects of the operations of 2405 may be performed by a control message transmission component 1425 as described with reference to FIG. 14.

At 2410, the method may include transmitting, in the shared radio frequency spectrum band, a downlink transmission that is rate matched around the rate matching resource concurrent with receiving, in the shared radio frequency spectrum band, an uplink transmission from the UE. The operations of 2410 may be performed in accordance with examples as disclosed herein. In some examples, aspects of the operations of 2410 may be performed by a downlink transmission component 1440 as described with reference to FIG. 14.

Figure 25:
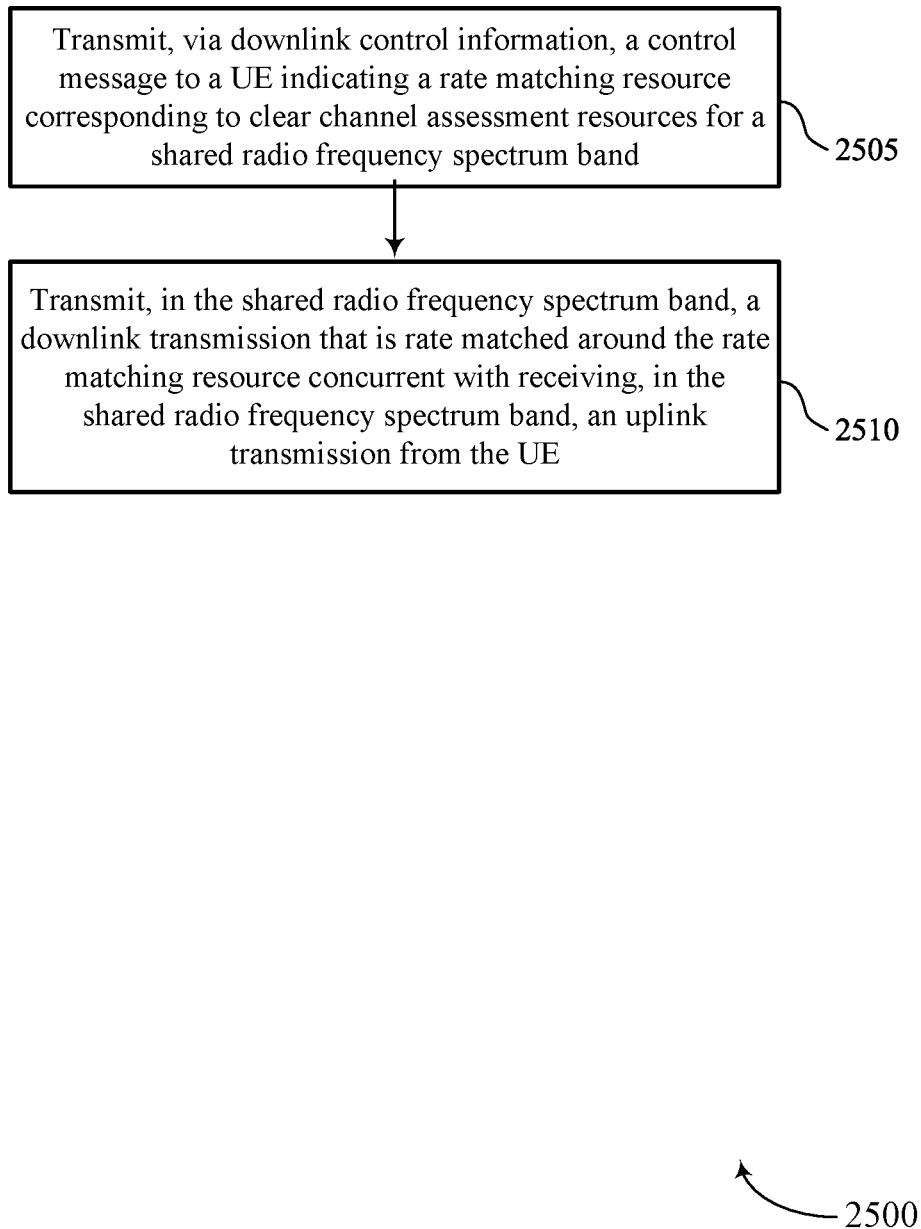

FIG. 25 shows a flowchart illustrating a method 2500 that supports LBT techniques for full-duplex communications in accordance with aspects of the present disclosure. The operations of the method 2500 may be implemented by a base station or its components as described herein. For example, the operations of the method 2500 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 2505, the method may include transmitting, via downlink control information, a control message to a UE indicating a rate matching resource corresponding to CCA resources for a shared radio frequency spectrum band. The operations of 2505 may be performed in accordance with examples as disclosed herein. In some examples, aspects of the operations of 2505 may be performed by a control message transmission component 1425 as described with reference to FIG. 14.

At 2510, the method may include transmitting, in the shared radio frequency spectrum band, a downlink transmission that is rate matched around the rate matching resource concurrent with receiving, in the shared radio frequency spectrum band, an uplink transmission from the UE. The operations of 2510 may be performed in accordance with examples as disclosed herein. In some examples, aspects of the operations of 2510 may be performed by a downlink transmission component 1440 as described with reference to FIG. 14.

The following provides an overview of aspects of the present disclosure:

Aspect 1: A method for wireless communications at a UE, comprising: receiving, from a base station, a first control message scheduling a downlink transmission to the UE in a shared radio frequency spectrum band; receiving a second control message from the base station scheduling an uplink transmission in the shared radio frequency spectrum band, the second control message indicating that at least a portion of the downlink transmission scheduled for transmission during CCA resources associated with the uplink transmission is cancelled; performing, in the shared radio frequency spectrum band, a CCA procedure within the CCA resources; and transmitting, in the shared radio frequency spectrum band, the uplink transmission based at least in part on the CCA procedure.

Aspect 2: The method of aspect 1, further comprising: receiving an RRC message indicating one or more downlink transmission cancellation configurations, wherein the second control message implicitly indicates a first configuration from the one or more downlink transmission cancellation configurations that indicates the at least the portion of the downlink transmission that is cancelled.

Aspect 3: The method of any of aspects 1 through 2, further comprising: receiving an RRC message including one or more downlink transmission cancellation configurations; and receiving the second control message indicating a first configuration from the one or more downlink transmission cancellation configurations that indicates the at least the portion of the downlink transmission that is cancelled.

Aspect 4: The method of any of aspects 1 through 3, wherein receiving the second control message comprises: receiving the second control message that indicates a type of the CCA procedure, wherein the downlink transmission is cancelled during at least a portion of the CCA resources based at least in part on the indicated type of the CCA procedure.

Aspect 5: The method of any of aspects 1 through 4, wherein receiving the second control message comprises: receiving the second control message indicating that the downlink transmission is at least partially cancelled on time resources overlapping with the CCA resources, partially cancelled in frequency resources overlapping with the CCA resources, or both.

Aspect 6: The method of any of aspects 1 through 5, wherein receiving the second control message comprises: receiving the second control message indicating that the downlink transmission is fully cancelled starting from a first symbol overlapping the CCA resources or fully cancelled.

Aspect 7: The method of any of aspects 1 through 5, further comprising: receiving a remaining portion of the downlink transmission in the shared radio frequency spectrum band concurrent to transmitting at least a portion of the uplink transmission.

Aspect 8: The method of any of aspects 1 through 7, wherein the portion of the downlink transmission overlaps a plurality of CCA resources for a group of spatially proximate UEs, and the portion of the downlink transmission is cancelled based at least in part on overlapping the plurality of CCA resources.

Aspect 9: A method for wireless communications at a UE, comprising: receiving a control message indicating a rate matching resource corresponding to CCA resources for a shared radio frequency spectrum band; performing a CCA procedure within the CCA resources; receiving, in the shared radio frequency spectrum band, a downlink transmission that is rate matched around the rate matching resource concurrent with transmitting, in the shared radio frequency spectrum band, an uplink transmission based at least in part on the CCA procedure.

Aspect 10: The method of aspect 9, wherein receiving the control message comprises: receiving the control message indicating the rate matching resource via RRC signaling.

Aspect 11: The method of aspect 10, wherein receiving the control message comprises: receiving the control message via the RRC that semi-statically configures a plurality of CCA resources including the CCA resources, wherein the downlink transmission that is rate matched around the rate matching resource that corresponds to the plurality of CCA resources.

Aspect 12: The method of any of aspects 9 through 11, wherein receiving the control message comprises: receiving the control message indicating the rate matching resource via downlink control information.

Aspect 13: The method of aspect 12, wherein receiving the control message comprises: receiving the control message via the downlink control information that indicates an uplink grant for the uplink transmission.

Aspect 14: The method of any of aspects 12 through 13, wherein receiving the control message comprises: receiving the control message indicating a time domain resource allocation indication for the rate matching resource, a frequency domain resource allocation indication for the rate matching resource, or both.

Aspect 15: The method of any of aspects 12 through 14, wherein receiving the control message comprises: receiving the control message indicating a start and length indicator value for the rate matching resource, an index to a table of rate matching resource configurations, or both.

Aspect 16: The method of any of aspects 12 through 15, wherein receiving the control message comprises: receiving the control message via the downlink control information that is a group common downlink control information.

Aspect 17: The method of any of aspects 9 through 16, wherein receiving the control message comprises: receiving the control message indicating the rate matching resource that corresponds to a plurality of CCA resources for a group of spatially proximate UEs.

Aspect 18: The method of any of aspects 9 through 17, further comprising: receiving the downlink transmission having a transport block size that is calculated based at least in part on a set of resources for the downlink transmission excluding the rate matching resource.

Aspect 19: A method for wireless communications at a base station, comprising: transmitting, to a UE, a first control message scheduling a downlink transmission to the UE in a shared radio frequency spectrum band; transmitting a second control message to the UE scheduling an uplink transmission in the shared radio frequency spectrum band, the second control message indicating that at least a portion of the downlink transmission scheduled for transmission during CCA resources associated with the uplink transmission is cancelled; cancelling at least the portion of the downlink transmission in the shared radio frequency spectrum band scheduled during the CCA resources; and receiving, in the shared radio frequency spectrum band, the uplink transmission.

Aspect 20: The method of aspect 19, further comprising: transmitting an RRC message indicating one or more downlink transmission cancellation configurations, wherein the second control message implicitly indicates a first configuration from the one or more downlink transmission cancellation configurations that indicates the at least the portion of the downlink transmission that is cancelled.

Aspect 21: The method of any of aspects 19 through 20, further comprising: transmitting an RRC message including one or more downlink transmission cancellation configurations; and transmitting the second control message indicating a first configuration from the one or more downlink transmission cancellation configurations that indicates the at least the portion of the downlink transmission that is cancelled.

Aspect 22: The method of any of aspects 19 through 21, wherein transmitting the second control message comprises: transmitting the second control message that indicates a type of the CCA procedure, wherein the downlink transmission is cancelled during at least a portion of the CCA resources based at least in part on the indicated type of the CCA procedure.

Aspect 23: The method of any of aspects 19 through 22, wherein transmitting the second control message comprises: transmitting the second control message indicating that the downlink transmission is at least partially cancelled on time resources overlapping with the CCA resources, partially cancelled in frequency resources overlapping with the CCA resources, or both.

Aspect 24: The method of any of aspects 19 through 23, wherein transmitting the second control message comprises: transmitting the second control message indicating that the downlink transmission is fully cancelled starting from a first symbol overlapping the CCA resources or fully cancelled.

Aspect 25: A method for wireless communications at a base station, comprising: transmitting a control message to a UE indicating a rate matching resource corresponding to CCA resources for a shared radio frequency spectrum band; transmitting, in the shared radio frequency spectrum band, a downlink transmission that is rate matched around the rate matching resource concurrent with receiving, in the shared radio frequency spectrum band, an uplink transmission from the UE.

Aspect 26: The method of aspect 25, wherein transmitting the control message comprises: transmitting the control message indicating the rate matching resource via RRC signaling.

Aspect 27: The method of any of aspects 25 through 26, wherein transmitting the control message comprises: transmitting the control message indicating the rate matching resource via downlink control information.

Aspect 28: The method of aspect 27, wherein transmitting the control message comprises: transmitting the control message via the downlink control information that indicates an uplink grant for the uplink transmission.

Aspect 29: The method of any of aspects 27 through 28, wherein transmitting the control message comprises: transmitting the control message indicating a time domain resource allocation indication for the rate matching resource, a frequency domain resource allocation indication for the rate matching resource, or both.

Aspect 30: The method of any of aspects 27 through 29, wherein receiving the control message comprises: transmitting the control message indicating a start and length indicator value for the rate matching resource, an index to a table of rate matching resource configurations, or both.

Aspect 31: An apparatus for wireless communications at a UE, comprising a processor; memory coupled with the processor; and instructions stored in the memory and executable by the processor to cause the apparatus to perform a method of any of aspects 1 through 8.

Aspect 32: An apparatus for wireless communications at a UE, comprising at least one means for performing a method of any of aspects 1 through 8.

Aspect 33: A non-transitory computer-readable medium storing code for wireless communications at a UE, the code comprising instructions executable by a processor to perform a method of any of aspects 1 through 8.

Aspect 34: An apparatus for wireless communications at a UE, comprising a processor; memory coupled with the processor; and instructions stored in the memory and executable by the processor to cause the apparatus to perform a method of any of aspects 9 through 18.

Aspect 35: An apparatus for wireless communications at a UE, comprising at least one means for performing a method of any of aspects 9 through 18.

Aspect 36: A non-transitory computer-readable medium storing code for wireless communications at a UE, the code comprising instructions executable by a processor to perform a method of any of aspects 9 through 18.

Aspect 37: An apparatus for wireless communications at a base station, comprising a processor; memory coupled with the processor; and instructions stored in the memory and executable by the processor to cause the apparatus to perform a method of any of aspects 19 through 24.

Aspect 38: An apparatus for wireless communications at a base station, comprising at least one means for performing a method of any of aspects 19 through 24.

Aspect 39: A non-transitory computer-readable medium storing code for wireless communications at a base station, the code comprising instructions executable by a processor to perform a method of any of aspects 19 through 24.

Aspect 40: An apparatus for wireless communications at a base station, comprising a processor; memory coupled with the processor; and instructions stored in the memory and executable by the processor to cause the apparatus to perform a method of any of aspects 25 through 30.

Aspect 41: An apparatus for wireless communications at a base station, comprising at least one means for performing a method of any of aspects 25 through 30.

Aspect 42: A non-transitory computer-readable medium storing code for wireless communications at a base station, the code comprising instructions executable by a processor to perform a method of any of aspects 25 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a configuration message indicating a plurality of downlink transmission cancellation configurations;
   receiving, from a network device, a first control message scheduling a downlink transmission to the UE in a shared radio frequency spectrum band;
   receiving a second control message from the network device, the second control message indicating a first downlink transmission cancellation configuration of the plurality of downlink transmission cancellation configurations, the second control message scheduling an uplink transmission in the shared radio frequency spectrum band, and the first downlink transmission cancellation configuration indicating that at least a portion of the downlink transmission scheduled for transmission during clear channel assessment resources associated with the uplink transmission is canceled;
   performing, in the shared radio frequency spectrum band, a clear channel assessment procedure during a portion of the clear channel assessment resources that corresponds to the portion of the downlink transmission that is canceled by the second control message; and transmitting, in the shared radio frequency spectrum band, the uplink transmission based at least in part on the clear channel assessment procedure.

2. The method of claim 1, wherein receiving the configuration message comprises:

receiving a radio resource control (RRC) message indicating the plurality of downlink transmission cancellation configurations, wherein the second control message implicitly indicates the first downlink transmission cancellation configuration from the plurality of downlink transmission cancellation configurations that indicates the at least the portion of the downlink transmission that is canceled.

3. The method of claim 1, wherein receiving the configuration message comprises:

receiving a radio resource control (RRC) message including the plurality of downlink transmission cancellation configurations, wherein the second control message explicitly indicates the first downlink transmission cancellation configuration from the plurality of downlink transmission cancellation configurations that indicates the at least the portion of the downlink transmission that is canceled.

4. The method of claim 1, wherein receiving the second control message comprises:

receiving the second control message that indicates a type of the clear channel assessment procedure, wherein the downlink transmission is canceled during at least a portion of the clear channel assessment resources based at least in part on the indicated type of the clear channel assessment procedure.

5. The method of claim 1, wherein receiving the second control message comprises:

receiving the second control message indicating that the downlink transmission is at least partially canceled on time resources overlapping with the clear channel assessment resources, partially canceled in frequency resources overlapping with the clear channel assessment resources, or both.

6. The method of claim 1, wherein receiving the second control message comprises:

receiving the second control message indicating that the downlink transmission is fully canceled starting from a first symbol overlapping the clear channel assessment resources or fully canceled.

7. The method of claim 1, further comprising:

receiving a remaining portion of the downlink transmission in the shared radio frequency spectrum band concurrent to transmitting at least a portion of the uplink transmission.

8. The method of claim 1, wherein:

the portion of the downlink transmission overlaps a plurality of clear channel assessment resources for a group of UEs, and the portion of the downlink transmission is canceled based at least in part on overlapping the plurality of clear channel assessment resources.

9. A method for wireless communications at a network device, comprising:

transmitting a configuration message indicating a plurality of downlink transmission cancellation configurations;

transmitting, to a user equipment (UE), a first control message scheduling a downlink transmission to the UE in a shared radio frequency spectrum band;

transmitting a second control message to the UE, the second control message indicating a first downlink transmission cancellation configuration of the plurality of downlink transmission cancellation configurations, the second control message scheduling an uplink transmission in the shared radio frequency spectrum band, and the first downlink transmission cancellation configuration indicating that at least a portion of the downlink transmission scheduled for transmission during clear channel assessment resources associated with the uplink transmission is canceled;

cancelling, in accordance with the second control message, at least the portion of the downlink transmission in the shared radio frequency spectrum band scheduled during the clear channel assessment resources; and receiving, in the shared radio frequency spectrum band, the uplink transmission.

10. The method of claim 9, wherein transmitting the configuration message comprises:

transmitting a radio resource control (RRC) message indicating the plurality of downlink transmission cancellation configurations, wherein the second control message implicitly indicates the first downlink transmission cancellation configuration from the plurality of downlink transmission cancellation configurations that indicates the at least the portion of the downlink transmission that is canceled.

11. The method of claim 9, wherein transmitting the configuration message comprises:

transmitting a radio resource control (RRC) message including the plurality of downlink transmission cancellation configurations; and transmitting, wherein the second control message explicitly indicates the first downlink transmission cancellation configuration from the plurality of downlink transmission cancellation configurations that indicates the at least the portion of the downlink transmission that is canceled.

12. The method of claim 9, wherein transmitting the second control message comprises:

transmitting the second control message that indicates a type of clear channel assessment procedure associated with the clear channel assessment resources, wherein the downlink transmission is canceled during at least a portion of the clear channel assessment resources based at least in part on the indicated type of the clear channel assessment procedure.

13. The method of claim 9, wherein transmitting the second control message comprises:

transmitting the second control message indicating that the downlink transmission is at least partially canceled on time resources overlapping with the clear channel assessment resources, partially canceled in frequency resources overlapping with the clear channel assessment resources, or both.

14. The method of claim 9, wherein transmitting the second control message comprises:

transmitting the second control message indicating that the downlink transmission is fully canceled starting from a first symbol overlapping the clear channel assessment resources or fully canceled.

15. An apparatus for wireless communications at a user equipment (UE), comprising:

one or more processors;

memory coupled with the one or more processors; and instructions stored in the memory and executable by the one or more processors to cause the apparatus to:

receive a configuration message indicating a plurality of downlink transmission cancellation configurations;

receive, from a network device, a first control message scheduling a downlink transmission to the UE in a shared radio frequency spectrum band;

receive a second control message from the network device, the second control message indicating a first downlink transmission cancellation configuration of the plurality of downlink transmission cancellation configurations, the second control message scheduling an uplink transmission in the shared radio frequency spectrum band, and the first downlink transmission cancellation configuration indicating that at least a portion of the downlink transmission scheduled for transmission during clear channel assessment resources associated with the uplink transmission is canceled;

perform, in the shared radio frequency spectrum band, a clear channel assessment procedure during a portion of the clear channel assessment resources that corresponds to the portion of the downlink transmission that is canceled by the second control message; and transmit, in the shared radio frequency spectrum band, the uplink transmission based at least in part on the clear channel assessment procedure.

16. The apparatus of claim 15, wherein, to receive the configuration message, the instructions are further executable by the one or more processors to cause the apparatus to:
receive a radio resource control (RRC) message indicating the plurality of downlink transmission cancellation configurations, wherein the second control message implicitly indicates the first downlink transmission cancellation configuration from the plurality of downlink transmission cancellation configurations that indicates the at least the portion of the downlink transmission that is canceled.

17. The apparatus of claim 15, wherein, to receive the configuration message, the instructions are further executable by the one or more processors to cause the apparatus to:
receive a radio resource control (RRC) message including the plurality of downlink transmission cancellation configurations, wherein the second control message explicitly indicates the first downlink transmission cancellation configuration from the plurality of downlink transmission cancellation configurations that indicates the at least the portion of the downlink transmission that is canceled.

18. The apparatus of claim 15, wherein the instructions to receive the second control message are executable by the one or more processors to cause the apparatus to:
receive the second control message that indicates a type of the clear channel assessment procedure, wherein the downlink transmission is canceled during at least a portion of the clear channel assessment resources based at least in part on the indicated type of the clear channel assessment procedure.

19. The apparatus of claim 15, wherein the instructions to receive the second control message are executable by the one or more processors to cause the apparatus to:
receive the second control message indicating that the downlink transmission is at least partially canceled on time resources overlapping with the clear channel assessment resources, partially canceled in frequency resources overlapping with the clear channel assessment resources, or both.

20. The apparatus of claim 15, wherein the instructions to receive the second control message are executable by the one or more processors to cause the apparatus to:
receive the second control message indicating that the downlink transmission is fully canceled starting from a first symbol overlapping the clear channel assessment resources or fully canceled.

21. The apparatus of claim 15, wherein the instructions are further executable by the one or more processors to cause the apparatus to:
receive a remaining portion of the downlink transmission in the shared radio frequency spectrum band concurrent to transmitting at least a portion of the uplink transmission.

22. The apparatus of claim 15, wherein:
the portion of the downlink transmission overlaps a plurality of clear channel assessment resources for a group of UEs, and
the portion of the downlink transmission is canceled based at least in part on overlapping the plurality of clear channel assessment resources.

23. An apparatus for wireless communications at a network device, comprising:
one or more processors;
memory coupled with the one or more processors; and
instructions stored in the memory and executable by the one or more processors to cause the apparatus to:
transmit a configuration message indicating a plurality of downlink transmission cancellation configurations;
transmit, to a user equipment (UE), a first control message scheduling a downlink transmission to the UE in a shared radio frequency spectrum band;
transmit a second control message to the UE, the second control message indicating a first downlink transmission cancellation configuration of the plurality of downlink transmission cancellation configurations, the second control message scheduling an uplink transmission in the shared radio frequency spectrum band, and the first downlink transmission cancellation configuration indicating that at least a portion of the downlink transmission scheduled for transmission during clear channel assessment resources associated with the uplink transmission is canceled;
cancel, in accordance with the second control message, at least the portion of the downlink transmission in the shared radio frequency spectrum band scheduled during the clear channel assessment resources; and
receive, in the shared radio frequency spectrum band, the uplink transmission.

24. The apparatus of claim 23, wherein, to transmit the configuration message, the instructions are further executable by the one or more processors to cause the apparatus to:
transmit a radio resource control (RRC) message indicating the plurality of downlink transmission cancellation configurations, wherein the second control message implicitly indicates the first downlink transmission cancellation configuration from the plurality of downlink transmission cancellation configurations that indicates the at least the portion of the downlink transmission that is canceled.

25. The apparatus of claim 23, wherein, to transmit the configuration message, the instructions are further executable by the one or more processors to cause the apparatus to:
transmit a radio resource control (RRC) message including the plurality downlink transmission cancellation configurations, wherein the second control message explicitly indicates the first downlink transmission cancellation configuration from the plurality of downlink transmission cancellation configurations that indicates the at least the portion of the downlink transmission that is canceled.

26. The apparatus of claim 23, wherein the instructions to transmit the second control message are executable by the one or more processors to cause the apparatus to:
   transmit the second control message that indicates a type of clear channel assessment procedure associated with the clear channel assessment resources, wherein the downlink transmission is canceled during at least a portion of the clear channel assessment resources based at least in part on the indicated type of the clear channel assessment procedure.

27. The apparatus of claim 23, wherein the instructions to transmit the second control message are executable by the one or more processors to cause the apparatus to:
   transmit the second control message indicating that the downlink transmission is at least partially canceled on time resources overlapping with the clear channel assessment resources, partially canceled in frequency resources overlapping with the clear channel assessment resources, or both.

28. The apparatus of claim 23, wherein the instructions to transmit the second control message are executable by the one or more processors to cause the apparatus to:
   transmit the second control message indicating that the downlink transmission is fully canceled starting from a first symbol overlapping the clear channel assessment resources or fully canceled.

\* \* \* \* \*